(12) United States Patent  (10) Patent No.: US 8,496,745 B2
Katsumata  (45) Date of Patent: Jul. 30, 2013

(54) INK

(75) Inventor: Atsuhiro Katsumata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 13/221,249

(22) Filed: Aug. 30, 2011

(65) Prior Publication Data

US 2012/0048143 A1  Mar. 1, 2012

(30) Foreign Application Priority Data

Aug. 31, 2010  (JP) .................................. 2010-195216

(51) Int. Cl.
C09D 11/02  (2006.01)
(52) U.S. Cl.
USPC ...................................... 106/31.48; 106/31.5
(58) Field of Classification Search
USPC ............................................ 106/31.48, 31.5
See application file for complete search history.

(56) References Cited

U.S. PATENT DOCUMENTS

| | | | | |
|---|---|---|---|---|
| 6,923,855 B2* | 8/2005 | Harada et al. | ............... | 106/31.48 |
| 7,252,707 B2* | 8/2007 | Ozawa et al. | ............... | 106/31.48 |
| 7,465,346 B2* | 12/2008 | Fukumoto et al. | ......... | 106/31.48 |
| 7,491,266 B2* | 2/2009 | Taguchi et al. | ............. | 106/31.48 |
| 7,507,282 B2* | 3/2009 | Ozawa et al. | ............... | 106/31.48 |
| 7,540,910 B2* | 6/2009 | Ogawa | ........................ | 106/31.5 |
| 7,550,037 B2* | 6/2009 | Mafune et al. | .............. | 106/31.48 |
| 7,731,788 B2* | 6/2010 | Kitamura et al. | .......... | 106/31.48 |
| 7,736,427 B2* | 6/2010 | Kitamura et al. | .......... | 106/31.48 |
| 8,029,612 B2* | 10/2011 | Ishii et al. | .................. | 106/31.48 |

(Continued)

FOREIGN PATENT DOCUMENTS

| JP | 2009-030023 A | 2/2009 |
|---|---|---|
| JP | 2009-185133 A | 8/2009 |

OTHER PUBLICATIONS

Extended European Search Report dated Dec. 2, 2011, issued in counterpart European Application No. 11179520.9.

*Primary Examiner* — Helene Klemanski
(74) *Attorney, Agent, or Firm* — Sughrue Mion, PLLC

(57) ABSTRACT

An ink having: a first coloring material; a second coloring material; and a third coloring material, wherein the first coloring material is a compound represented by the following general formula (BkI-1), the second coloring material is a compound different from the first coloring material and is represented by the following general formula (BkI-1) or (BkII-2), and the third coloring material is a compound represented by the following general formula (Y-1).

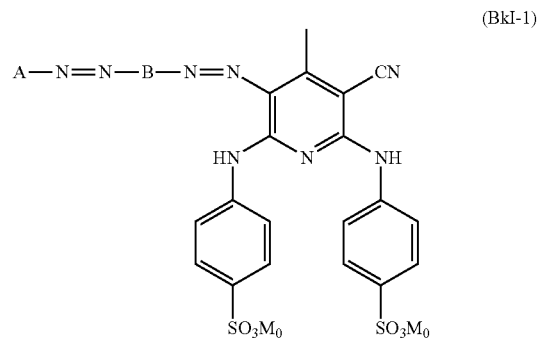

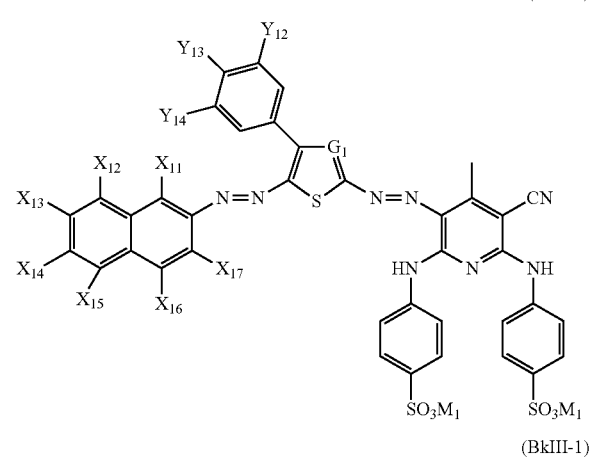

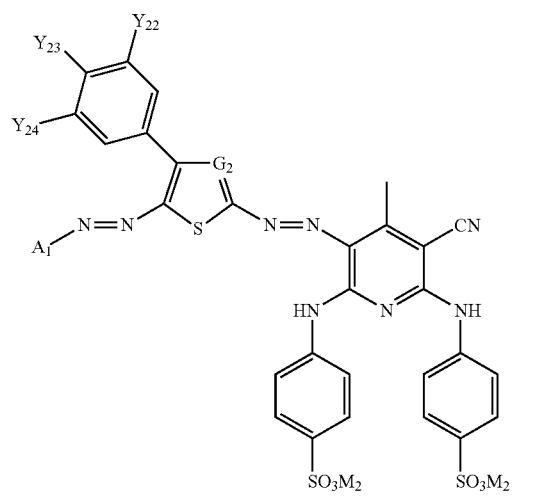

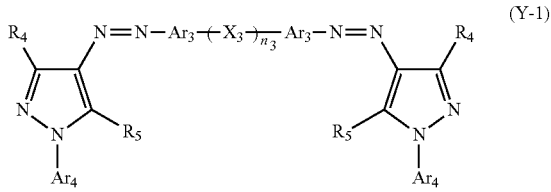

7 Claims, No Drawings

U.S. PATENT DOCUMENTS

| | | |
|---|---|---|
| 2004/0129172 A1* | 7/2004 | Harada et al. .............. 106/31.48 |
| 2004/0187738 A1 | 9/2004 | Taguchi et al. |
| 2005/0004260 A1 | 1/2005 | Taguchi |
| 2007/0120920 A1 | 5/2007 | Taguchi et al. |
| 2012/0050382 A1* | 3/2012 | Tanaka et al. .............. 106/31.48 |
| 2012/0075393 A1* | 3/2012 | Ishida ......................... 106/31.5 |

* cited by examiner

INK

CROSS-REFERENCE TO RELATED APPLICATION(S)

The present application claims priority from Japanese Patent Application No. 2010-195216 filed on Aug. 31, 2010, the entire content of which is incorporated herein by reference.

BACKGROUND

1. Field

The present invention relates to an ink.

2. Description of the Related Art

An inkjet recording method is a recording method of forming an image by applying ink droplets to a recording medium such as plain paper or a lustrous medium, and is rapidly spreading due to reduction of the cost on the method and improvement of recording speed. Also, with rapid spread of digital cameras in addition to image quality enhancement of an image obtained by the inkjet recording method, the inkjet recording method has become widely popular as a method for outputting an image comparable to a silver salt photograph.

As one problem with the inkjet recording method, there is illustrated a problem with image preservability of an obtained recorded product. In general, a recorded product obtained by the inkjet recording method involves the problem that its image preservability is poor in comparison with a silver salt photograph. More specifically, there is a problem that, when exposed to light, moisture, heat, or environmental gases existing in the air for a long time, the recorded product suffers deterioration of coloring materials on the recorded product, which is liable to cause color change or color fading of the image. An image formed by a black ink often undergoes change in color tone due to deterioration of coloring materials and is recognized to undergo particularly serious deterioration in light fastness. Hence, this has so far been recognized as a problem to be solved, and many proposals have been made.

For such problem, it has been proposed in JP-A-2009-30023 and JP-A-2009-185133 to improve light fastness of an image by using an ink having a structure showing excellent light fastness.

On the other hand, ink compositions to be used for forming the above-described color image are required so that a recorded product obtained by a combination of plural color ink compositions will not undergo color change or color fading during storage and that bronzing will not occur in addition to that each ink composition itself for each color has good color-forming properties.

With an ink set, when a particular ink composition has a seriously poor light fastness or ozone fastness than other ink compositions have, the color formed by the particular ink undergoes color fading or color change faster than other colors, leading to poor balance of color tone of the entire image. Therefore, it is preferred to improve light fastness and ozone fastness of respective ink compositions constituting an ink set and, at the same time, to synchronize the speed of deterioration such as fading of respective images formed by corresponding ink compositions as much as possible. In other words, it is preferred that respective inks constituting an ink set have excellent light fastness and excellent ozone fastness and that difference in light fastness and ozone fastness between the inks is small.

Also, in the case where a recorded image with a high optical density is formed, there has been a problem that crystals of dyes are precipitated on the surface of an image-receiving material as drying advances, leading to reflection of light by the recorded image to give metal luster, which is called bronzing phenomenon. This phenomenon is considered to be liable to occur as a result of enhancement of associative properties (aggregation properties) of dyes which is caused by decreasing water solubility of the dyes or introducing a hydrogen-binding amino group into the dye structure for the purpose of improving water resistance. Since light is reflected due to occurrence of bronzing phenomenon, not only optical density of the recorded image is reduced, but color hue of the recorded image becomes seriously different from desired color hue. Accordingly, suppression of bronzing phenomenon is one of important things required for an inkjet ink.

SUMMARY

Many of known black dyes tend to undergo change in color tone of image to yellowish tone after light fastness test of irradiating the image with light. That is, an image formed by using an ink containing a known black dye tends to suffer serious reduction of optical density in magenta wavelength region or, in particular, cyan wavelength region in comparison with optical density in yellow wavelength region. Additionally, optical density in each wavelength region can be determined by measuring optical density of each of yellow component, magenta component, and cyan component using a spectrophotometer (spectral sensitivity characteristics: using ISO status A).

To the contrary, compounds represented by the general formula (BkII-1) or (BkIII-1) are found to have the properties of being difficult to undergo change in color tone (tint) in the light fastness test. Color tone of an image formed by using an ink containing a compound represented by the general formula (BkII-1) or (BkIII-1) is black, and is found to be applicable to a black ink.

Thus, the inventors have made investigation on adjustment of color tone of an ink using, in combination, a compound represented by the general formula (BkI-1), a compound represented by the general formula (BkII-1) or (BkIII-1), and a compound having a yellowish color tone and, as a result, have found that an image suppressing bronzing phenomenon and showing fastness to light and ozone an be obtained by using a compound represented by the general formula (Y-1) as the compound having a yellowish color tone.

An object of the present invention is to solve at least one of the above-described problems and, specifically, to provide an ink capable of forming an image showing fastness to light and ozone.

A further object of the invention is to provide an ink which can provide an ink set wherein respective inks constituting the ink set show good balance between them in light fastness and ozone fastness and which provide a color image (color-mixing portion) not causing bronzing phenomenon, said image being formed by a combination of plural color inks.

The above-described objects can be attained by the following present invention.

(1) An ink including: a first coloring material; a second coloring material; and a third coloring material, wherein the first coloring material is a compound represented by the following general formula (BkI-1), the second coloring material is a compound different from the first coloring material and is represented by the following general formula (BkII-1) or (BkIII-1), and the third coloring material is a compound represented by the following general formula (Y-1).

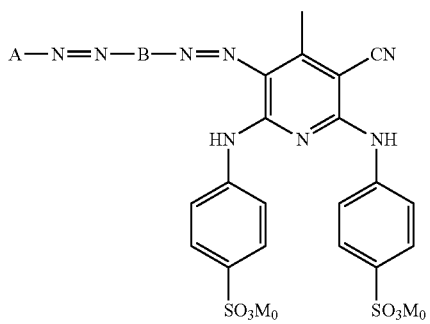

(BkI-1)

In formula (BkI-1), A represents an aromatic or heterocyclic group which may be substituted, Mo each independently represents a hydrogen atom, an alkali metal, ammonium, or an organic ammonium; and B represents any one of the groups represented by the following general formulae (1) to (5).

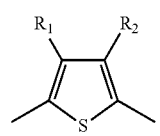

general formula (1)

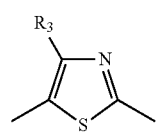

general formula (2)

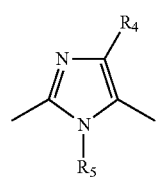

general formula (3)

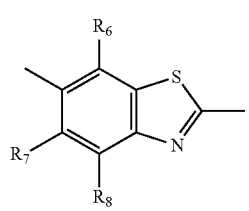

general formula (4)

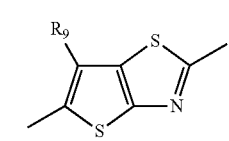

general formula (5)

In general formulae (1) to (5), $R_1$ to $R_9$ each independently represent a hydrogen atom, a halogen atom, an aliphatic group, an aromatic group, a heterocyclic group, a carboxylic group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group including an anilino group and a heterocyclic amino group, an acylamino group, a ureido group, a sulfamoylamino group, an alkoxycarbonylamino group, an aryloxycarbonylamino group, an alkyl- or aryl-sulfonylamino group, a heterocyclic sulfonylamino group, a cyano group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfonic acid group, each group optionally further having a substituent.

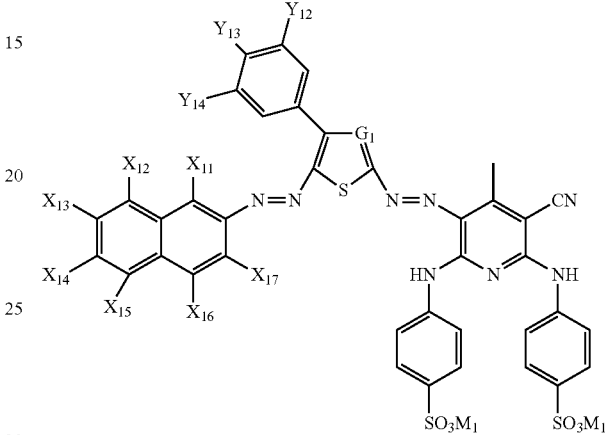

(BkII-1)

In formula (BkII-1), $G_1$ represents a nitrogen atom or $-C(R_{12})=$, $R_{12}$ represents a hydrogen atom, a sulfo group, a carboxyl group, a substituted or unsubstituted carbamoyl group, or a cyano group, $X_{11}$, $X_{12}$, $X_{13}$, $X_{14}$, $X_{15}$, $X_{16}$, and $X_{17}$ each independently represent a hydrogen atom or a monovalent substituent, $Y_{12}$, $Y_{13}$, and $Y_{14}$ each independently represent a hydrogen atom or a monovalent substituent, $Y_{12}$, $Y_{13}$, and $Y_{14}$ may be connected to each other to form a ring, and $M_1$ each independently represents a hydrogen atom or a monovalent counter cation.

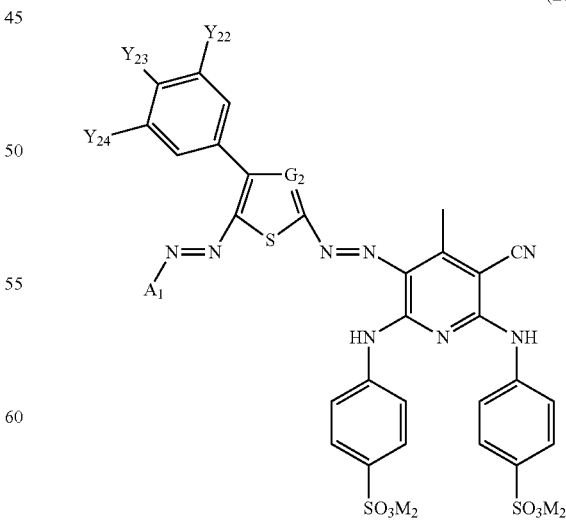

(BkIII-1)

In formula (BkIII-1), $A_1$ represents an aryl group or a nitrogen-containing 5-membered heterocyclic group, $G_2$ represents a nitrogen atom or —C(R$_{22}$)═, R$_{22}$ represents a hydrogen atom, a sulfo group, a carboxyl group, a substituted or unsubstituted carbamoyl group, or a cyano group, Y$_{22}$, Y$_{23}$, and Y$_{24}$ each independently represent a hydrogen atom or a monovalent substituent, Y$_{22}$, Y$_{23}$, and Y$_{24}$ may be connected to each other to form a ring, and M$_2$ each independently represents a hydrogen atom or a monovalent counter cation.

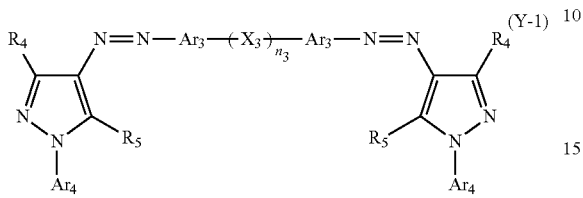

(Y-1)

In formula (Y-1), R$_4$ each independently represents a monovalent group, R$_5$ each independently represents —OR$_6$ or —NHR$_7$, R$_6$ and R$_7$ each independently represent a hydrogen atom or a monovalent group, X$_3$ represents a divalent linking group, n$_3$ represents 0 or 1, Ar$_3$ each independently represents a divalent heterocyclic group, and Ar$_4$ each independently represents an alkyl group, an aryl group, or a monovalent triazine ring group.

(2) The ink according to (1), wherein A in the compound represented by the general formula (BkI-1) is a naphthyl group which may be substituted, and B is a group represented by the general formula (2).

(3) The ink according to (1), wherein the compound represented by the general formula (BkII-1) is a compound represented by the following general formula (BkII-2).

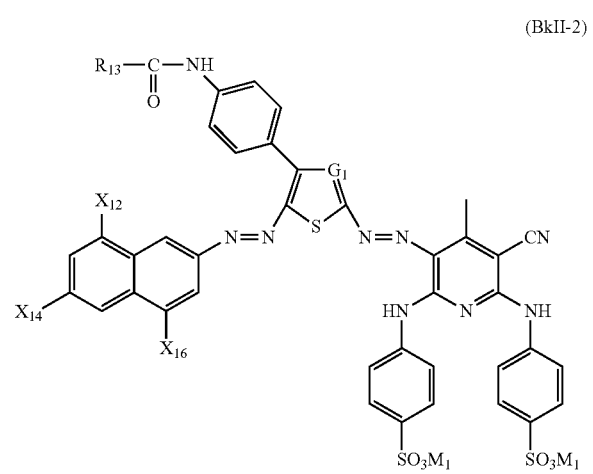

(BkII-2)

In formula (BkII-2), G$_1$ represents a nitrogen atom or —C(R$_{12}$)═, R$_{12}$ represents a hydrogen atom, a sulfo group, a carboxyl group, a substituted or unsubstituted carbamoyl group, or a cyano group, X$_{12}$, X$_{14}$, and X$_{16}$ each independently represent a hydrogen atom or a monovalent substituent, provided that at least one of X$_{12}$, X$_{14}$, and X$_{16}$ represents an electron-withdrawing group having a Hammett σp value of 0.3 or more, R$_{13}$ represents a monovalent substituent, and M$_1$ each independently represents a hydrogen atom or a monovalent counter cation.

(4) The ink according to (1), wherein the compound represented by the general formula (BkIII-1) is a compound represented by the general formula (BkIII-2).

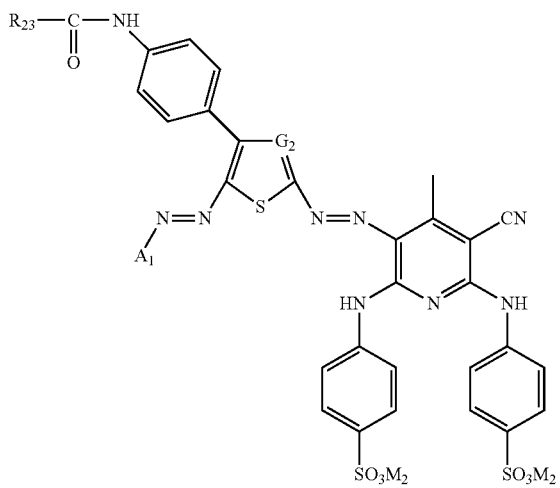

(BkIII-2)

In formula (BkIII-2), G$_2$ represents a nitrogen atom or —C(R$_{12}$)═, R$_{22}$ represents a hydrogen atom, a sulfo group, a carboxyl group, a substituted or unsubstituted carbamoyl group, or a cyano group, R$_{23}$ represents a monovalent substituent, A$_1$ represents an aryl group or a 5-membered, nitrogen-containing heterocyclic group, and M$_2$ each independently represents a hydrogen atom or a monovalent counter cation.

(5) The ink according to (1), wherein the content of the second coloring material is from 45% by weight to 75% by weight based on the total weight of all of the coloring materials in the ink.

(6) The ink according to (1), wherein the content of the third coloring material is from 20% by weight to 45% by weight based on the total weight of all of the coloring materials in the ink.

(7) The ink according to (1), wherein the content of the second coloring material is 60% by weight or more based on the total weight of all of the coloring materials in the ink, and the content of the third coloring material is 1 time or more in terms of weight ratio to the content of the first coloring material in the ink.

According to the invention, there can be provided an ink capable of forming an image showing fastness to light and ozone.

Further, there can be provided an ink which can provide an ink set wherein respective inks constituting the ink set show good balance between them in light fastness and ozone fastness and which provide a color image (color-mixing portion) not causing bronzing phenomenon, said image being formed by a combination of plural color inks.

DETAILED DESCRIPTION OF THE INVENTION

The present invention will be described in detail below by reference to preferred embodiments of the invention.

First, the terms "substituent group A", "substituent group J", "ionic hydrophilic group", and "Hammett substituent constant σp value" as used in the present invention will be defined below.

(Substituent Group A)

There are illustrated a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a cycloalkyl group containing from 3 to 12 carbon atoms, and a cycloalkenyl group containing from 3 to 12 carbon atoms (for example, methyl, ethyl, n-propyl, n-butyl, i-butyl, sec-butyl, t-butyl, 2-ethylhexyl, 2-methylsulfonylethyl, 3-phenoxypropyl, trifluoromethyl, or cyclopentyl); a halogen atom (for example, a chlorine atom or a bromine atom); an aryl group (for example, phenyl, 4-t-butylphenyl, or 2,4-di-t-amylphenyl); a heterocyclic group (for example, imidazolyl, pyrazolyl, triazolyl, 2-furyl, 2-thienyl, 2-pyrimidinyl, or 2-benzothiazolyl); a cyano group; a hydroxyl group; a nitro group; a carboxyl group, an amino group; an alkyloxy group (for example, methoxy, ethoxy, 2-methoxyethoxy, or 2-methylsulfonylethoxy); an aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy); an acylamino group (for example, acetamido, benzoamido, or 4-(3-t-butyl-4-hydroxyphenoxy)butanamido); an alkylamino group (for example, methylamino, butylamino, diethylamino, or methylbutylamino); an arylamino group (for example, phenylamino or 2-chloroanilio), a ureido group (for example, phenylureido, methylureido, or N,N-dibutylureido); a sulfamoylamino group (for example, N,N-dipropylsulfamoylamino); an alkylthio group (for example, methylthio, octylthio, or 2-phenoxyethylthio); an arylthio group (for example, phenylthio, 2-butoxy-5-t-octylphenylthio, or 2-carboxyphenylthio); an alkyloxycarbonylamino group (for example, methoxycarbonylamino); an alkylsulfonylamino or arylsulfonylamino group (for example, methylsulfonylamino, phenylsulfonylamaino, or p-toluenesulfonylamino); a carbamoyl group (for example, N-ethylcarbamoyl or N,N-dibutylcarbamoyl); a sulfamoyl group (for example, N-ethylsulfamoyl, N,N-dipropylsulfamoyl, or N-phenylsulfamoyl); a sulfonyl group (for example, methylsulfonyl, octylsulfonyl, phenylsulfonyl, or p-toluenesulfonyl); an alkyloxycarbonyl group (for example, methoxycarbonyl or butyloxycarbonyl); a heterocyclic oxy group (for example, 1-phenyltetrazol-5-oxy or 2-tetrahydropyranyloxy); an azo group (for example, phenylazo, 4-methoxyphenylazo, 4-pivaloylaminophenylazo, or 2-hydroxy-4-propanoylphenylazo); an acyloxy group (for example, acetoxy); a carbamoyloxy group (for example, N-methylcarbamoyloxy or N-phenylcarbamoyloxy); a silyloxy group (for example, trimethylsilyloxy or dibutylmethylsilyloxy); an aryloxycarbonylamino group (for example, phenoxycarbonylamino); an imido group (for example, N-succinimido or N-phthalimido); a heterocyclic thio group (for example, 2-benzothiazolylthio, 2,4-di-phenoxy-1,3,5-triazol-6-thio, or 2-pyridylthio); a sulfinyl group (for example, 3-phenoxypropylsulfinyl); a phosphoryl group (for example, phenoxyphosphonyl, octyloxyphosphonyl, or phenylphosphonyl); an aryloxycarbonyl group (for example, phenoxycarbonyl); an acyl group (for example, acetyl, 3-phenylpropanoyl, or benzoyl); and an ionic hydrophilic group (for example, a carboxyl group or a sulfo group). These substituents may further be substituted and, as such further substituent, there can be illustrated those groups which are selected from the above-described substituent group A.

(Substituent Group J)

There are illustrated, for example, a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aaryloxycarbonyl group, an alkoxycarbonyl group, a carbamoyl group, an aryl- or heterocyclic azo group, an imido group, a phosphino group, a phosphinyl group, a phosphinyloxy group, a phosphinyamino group, a silyl group, and an ionic hydrophilic group. These substituents may further be substituted and, as such further substituent, there can be illustrated those groups which are selected from the above-described substituent group J.

More specifically, as the halogen atom, there are illustrated, for example, a fluorine atom, a chlorine atom, a bromine atom, and an iodine atom.

As the alkyl group, there are illustrated straight, branched, or cyclic, substituted or unsubstituted alkyl groups, with a cycloalkyl group, a bicycloalkyl group, and a group of a tricyclic structure having more cyclic structure units being included as well. An alkyl group in the substituent to be described hereinafter (for example, an alkyl group in an alkoxy group or in an alkylthio group) also means the alkyl group of such concept. Specifically, preferred examples of the alkyl group include an alkyl group containing from 1 to 30 carbon atoms, such as a methyl group, an ethyl group, a n-propyl group, an i-propyl group, a t-butyl group, a n-octyl group, an eicosyl group, a 2-chloroethyl group, a 2-cyanoethyl group, and a 2-ethylhexyl group; preferred examples of the cycloalkyl group include a substituted or unsubstituted cycloalkyl group containing from 3 to 30 carbon atoms, such as a cyclohexyl group, a cyclopentyl group, and a 4-n-dodecylcyclohexyl group; and preferred examples of the bicycloalkyl group include a substituted or unsubstituted bicycloalkyl group containing from 5 to 30 carbon atoms, i.e., a monovalent group formed by removing one hydrogen atom from a bicycloalkane containing from 5 to 30 carbon atoms, e.g., bicyclo[1,2,2]heptan-2-yl group and a bicyclo[2,2,2]octan-3-yl group.

As the aralkyl group, there are illustrated substituted or unsubstituted aralkyl groups and, as the substituted or unsubstituted aralkyl group, an aralkyl group containing from 7 to 30 carbon atoms is preferred. Examples thereof include a benzyl group and a 2-phenethyl group.

As the alkenyl group, there are illustrated straight, branched, or cyclic, substituted or unsubstituted alkenyl groups, with a cycloalkenyl group and a bicycloalkenyl group being included. Specifically, the alkenyl group is preferably a substituted or unsubstituted alkenyl group containing from 2 to 30 carbon atoms, and examples thereof include a vinyl group, an allyl group, a prenyl group, a geranyl group, and an oleyl group, the cycloalkenyl group is preferably a substituted or unsubstituted cycloalkenyl group containing from 3 to 30 carbon atoms, i.e., a monovalent group formed by removing one hydrogen atom from a cycloalkene containing from 3 to 30 carbon atoms, e.g., a 2-cyclopenten-1-yl group or a 2-cyclohexen-1-yl group, and the bicycloalkenyl group is preferably a substituted or unsubstituted bicycloalkenyl group containing from 5 to 30 carbon atoms, i.e., a monovalent group formed by removing one hydrogen atom from a bicycloalkene containing one double bond, e.g., a bicyclo[2,2,1]hepten-1-yl group or a bicyclo[2,2,2]oct-2-en-4-yl group.

The alkynyl group is preferably a substituted or unsubstituted alkynyl group containing from 2 to 30 carbon atoms, and examples thereof include an ethynyl group, a propargyl group, and a trimethylsilylethynyl group.

The aryl group is preferably a substituted or unsubstituted aryl group containing from 6 to 30 carbon atoms, and examples thereof include a phenyl group, a p-tolyl group, a naphthyl group, a m-chlorophenyl group, and an o-hexadecanoylaminophenyl group.

The heterocyclic group is preferably a monovalent group formed by removing one hydrogen atom from a 5- or 6-membered, substituted or unsubstituted aromatic or non-aromatic heterocyclic compound, and is more preferably a 5- or 6-membered aromatic heterocyclic group containing from 3 to 30 carbon atoms. Examples thereof include a 2-furyl group, a 2-thienyl group, a 2-pyrimidinyl group, and a 2-benzothiazolyl group.

The alkoxy group is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The aryloxy group is preferably a substituted or unsubstituted aryloxy group containing from 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group containing from 0 to 20 carbon atoms, and examples thereof include a trimethylsilyloxy group and a diphenylmethylsilyloxy group.

The heterocyclic oxy group is preferably a substituted or unsubstituted heterocyclic oxy group containing from 2 to 30 carbon atoms, and examples thereof include a 1-phenyltetrazol-5-oxy group and a 2-tetrahydropyranyloxy group.

The acyloxy group is preferably a formyloxy group, a substituted or unsubstituted alkylcarbonyloxy group containing from 2 to 30 carbon atoms, or a substituted or unsubstituted aryloxycarbonyloxy group containing from 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group containing from 1 to 30 carbon atoms, and examples thereof include an N,N-dimethylcarbamoyloxy group, an N,N-diethylcarbamoyloxy group, a morpholinocarbamoyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group containing from 2 to 30 carbon atoms, and examples thereof include a methoxycarbonyloxy group, an ethoxycarbonyloxy group, a t-butoxycarbonyloxy group, and a n-octylcarbonyloxy group.

The aryloxycarbonyloxy group is preferably a substituted or unsubstituted aryloxycarbonyloxy group containing from 7 to 30 carbon atoms, and examples thereof include a phenoxycarbonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and is preferably an amino group, a substituted or unsubstituted alkylamino group containing from 1 to 30 carbon atoms, or a substituted or unsubstituted aniline group containing from 6 to 30 carbon atoms, with examples thereof including a methylamino group, a dimethylamino group, an aniline group, an N-methyl-anilino group, and a diphenylamino group.

The acylamino group is preferably a formylamino group, a substituted or unsubstituted alkylcarbonylamino group containing from 1 to 30 carbon atoms, or a substituted or unsubstituted arylcarbonylamino group containing from 6 to 30 carbon atoms, and examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group containing from 1 to 30 carbon atoms, and examples thereof include a carbamoylamino group, an N,N-dimethylaminocarbonylamino group, an N,N-diethylaminocarbonylamino group, and amorpholinocarbonylamino group.

The alkoxycarbonylamino group is preferably a substituted or unsubstituted alkoxycarbonylamino group containing from 2 to 30 carbon atoms, and examples thereof include a methoxycarbonylamino group, an ethoxycarbonylamino group, a t-butoxycarbonylamino group, a n-octadecyloxycarbonylamino group, and an N-methyl-methoxycarbonylamino group.

The aryloxycarbonylamino group is preferably a substituted or unsubstituted aryloxycarbonylamino group containing from 7 to 30 carbon atoms, and examples thereof include a phenoxycarbonylamino group, a p-chlorophenoxycarbonylamino group, and a m-n-octyloxyphenoxycarbonylamino group.

The sulfamoylamino group is preferably a substituted or unsubstituted sulfamoylamino group containing from 0 to 30 carbon atoms, and examples thereof include a sulfamoylamino group, an N,N-dimethylaminosulfonylamino group, and an N-n-octylaminosulfonylamino group.

The alkyl- or aryl-sulfonylamino group is preferably substituted or unsubstituted alkylsulfonylamino group containing from 1 to 30 carbon atoms or a substituted or unsubstituted arylsulfonylamino group containing from 6 to 30 carbon atoms, and examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group containing from 1 to 30 carbon atoms, and examples thereof include a methylthio group, an ethylthio group, and a n-hexadecylthio group.

The arylthio group is preferably a substituted or unsubstituted arylthio group containing from 6 to 30 carbon atoms, and examples thereof include a phenylthio group, a p-chlorophenylthio group, and a m-methoxyphenylthio group.

The heterocyclic thio group is preferably a substituted or unsubstituted heterocyclic thio group containing from 2 to 30 carbon atoms, and examples thereof include a 2-benzothiazolylthio group and a 1-phenyltetrazol-5-ylthio group.

The sulfamoyl group is preferably a substituted or unsubstituted sulfamoyl group containing from 0 to 30 carbon atoms, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkyl- or aryl-sulfinyl group is preferably a substituted or unsubstituted alkylsulfinyl group containing from 1 to 30 carbon atoms or a substituted or unsubstituted arylsulfinyl group containing from 6 to 30 carbon atoms, and examples thereof include a methylsulfinyl group, an ethylsulfinyl group, a phenylsulfinyl group, and a p-methylphenylsulfinyl group.

The alkyl- or aryl-sulfonyl group is preferably a substituted or unsubstituted alkylsulfonyl group containing from 1 to 30 carbon atoms or a substituted or unsubstituted arylsulfonyl group containing from 6 to 30 carbon atoms, and examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group containing from 2 to 30 carbon atoms, a substituted or unsubstituted arylcarbonyl group containing from 7 to 30 carbon atoms, or a substituted or unsubstituted heterocyclic carbonyl group containing from 2 to 30 carbon atoms wherein the carbonyl group is connected through carbon atom, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

The aryloxycarbonyl group is preferably a substituted or unsubstituted aryloxycarbonyl group containing from 7 to 30 carbon atoms, and examples thereof include a phenoxycarbonyl group, an o-chlorophenoxycarbonyl group, a m-nitrophenoxycarbonyl group, and a p-t-butylphenoxycarbonyl group.

The alkoxycarbonyl group is preferably a substituted or unsubstituted alkoxycarbonyl group containing from 2 to 30 carbon atoms, and examples thereof include a methoxycarbonyl group, an ethoxycarbonyl group, a t-butoxycarbonyl group, and a n-octadecyloxycarbonyl group.

The carbamoyl group is preferably a substituted or unsubstituted carbamoyl group containing from 1 to 30 carbon atoms, and examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted arylazo group containing from 6 to 30 carbon atoms or a substituted or unsubstituted heterocyclic azo group containing from 3 to 30 carbon atoms, and examples thereof include phenylazo, p-chlorophenylazo, and 5-ethylthio-1,3,4-thiadiazol-2-ylazo.

The imido group is preferably an N-succinimido group or an N-phthalimido group.

The phosphino group is preferably a substituted or unsubstituted phosphino group containing from 0 to 30 carbon atoms, and examples thereof include a dimethylphosphino group, a diphenylphosphino group, and a methylphenoxyphosphino group.

The phosphinyl group is preferably a substituted or unsubstituted phosphinyl group containing from 0 to 30 carbon atoms, and examples thereof include a phosphinyl group, a dioctyloxyphosphinyl group, and a diethoxyphosphinyl group.

The phosphinyloxy group is preferably a substituted or unsubstituted phosphinyloxy group containing from 0 to 30 carbon atoms, and examples thereof include a diphenoxyphosphinyloxy group and a dioctyloxyphosphinyloxy group.

The phosphinylamino group is preferably a substituted or unsubstituted phosphinylamino group containing from 0 to 30 carbon atoms, and examples thereof include a dimethoxyphosphinylamino group and a dimethylaminophosphinylamino group.

The silyl group is preferably a substituted or unsubstituted silyl group containing from 0 to 30 carbon atoms, and examples thereof include a trimethylsilyl group, a t-butyldimethylsilyl group, and a phenyldimethylsilyl group.

(Ionic Hydrophilic Group)

There are illustrated a sulfo group, a carboxyl group, a thiocarboxyl group, a sulfino group, a phosphono group, and a dihydroxyphosphino group, with a sulfo group and a carboxyl group being particularly preferred. Also, the carboxyl group, phosphono group, and sulfo group may be in a salt form, and examples of the counter ion for forming the salt include ammonium ion, an alkali metal ion (e.g., lithium ion, sodium ion, or potassium ion), and an organic cation (e.g., tetramethylammonium ion, tetramethylguanidium ion, or tetramethylphosphonium), with lithium salt and ammonium salt being preferred, and lithium salt being more preferred.

(Hammett Substituent Constant σp Value)

A Hammett substituent constant σp value to be used in this specification is briefly explained below.

The Hammett's rule is an empirical rule advocated by L. P. Hammett in 1935 in an attempt to quantitatively discuss the influences of a substituent of a benzene derivative on the reaction or equilibrium, the validity of which has been widely accepted nowadays. Substituent constants obtained by the Hammett's rule include σp and σm values. These values are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range in question when determined in accordance with the Hammett's rule. Although compounds of the invention are not benzene derivatives, σp values are referred to as a measure of the electron effect of their substituents irrespective of the position of substitution. In the invention, the σp value will be used in this sence.

Additionally, in the invention, in the case where the compounds are in salt form, expression of "containing a salt" is used for convenience's sake though the salts exist in an ink in a state of being dissociated into ions.

In the process of investigation on color tone and light fastness of an image obtained by using an ink containing the compound represented by the general formula (BkI-1) and the compound represented by the general formula (BkII-1) or (BkIII-1) to be described hereinafter, the inventors have newly paid attention to compounds represented by the general formula (Y-1) to be described hereinafter. According to the investigation of the inventors, an image obtained by using an ink containing only the compound represented by the general formula (BkI-1) have a bluish color tone. Also, it has been found that, though the degree of reduction of optical density in each wavelength region after light fastness test of an image formed by an ink containing only the compound represented by the general formula (BkII-1) or (BkIII-1) increases in the order of yellow wavelength region, magenta wavelength region, and cyan wavelength region, the residual ratio of optical density is high in every region.

Thus, the inventors have made detailed investigation on an ink containing, as coloring materials, the compound represented by the general formula (BkI-1), the compound represented by the general formula (BkII-1) or (BkIII-1), and, in addition to these compounds, the compound represented by the general formula (Y-1). As a result, it has been found that color tone of an image (initial image) formed by using an ink containing these three coloring materials with a recording duty of 100% is good. Also, with light fastness, it has been found that the aforesaid image undergoes about the same degree of reduction of optical density in yellow, magenta, and cyan wavelength regions, and that the image undergoes only a small change in color tone after light fastness test and shows high fastness. The invention has been made based on these findings.

Further, the inventors have made investigation on the content ratio of each of the compound represented by the general formula (BkI-1), the compound represented by the general formula (BkII-1) or (BkIII-1), and the compound represented by the general formula (Y-1). As a result, it has been found that color change after light fastness test can be made smaller and high fastness can be provided and, in addition, an image with suppressed bronzing can be obtained, by selecting the weight ratio of each of the three coloring materials in a certain range.

The ink of the invention is characterized in that it contains at least a compound of the general formula (BkI-1), a compound represented by the general formula (BkII-1) or (BkIII-1), and a compound represented by the general formula (Y-1). In an image formed by an ink containing these 3 compounds (coloring materials), an effect of suppressing color change after light fastness test and an effect of showing good balance in color tone change can be obtained.

<Ink>

The ink of the invention is an ink containing at least a first coloring material, a second coloring material, and a third coloring material and is characterized in that the aforesaid first coloring material is a compound represented by the following general formula (BkI-1), the aforesaid second coloring material is a compound which is different from the first coloring material and which is represented by the following general formula (BkII-1) or the following general formula (BkIII-1), and that the aforesaid third coloring material is a compound represented by the following general formula (Y-1).

The components constituting the ink in accordance with the invention and physical properties of the ink will be described in detail hereinafter.

(Coloring Materials)

[First Coloring Material: Compound Represented by the General Formula (BkI-1)]

It is necessary for the ink of the invention to contain the compound of the following general formula (BkI-1) as the first coloring material.

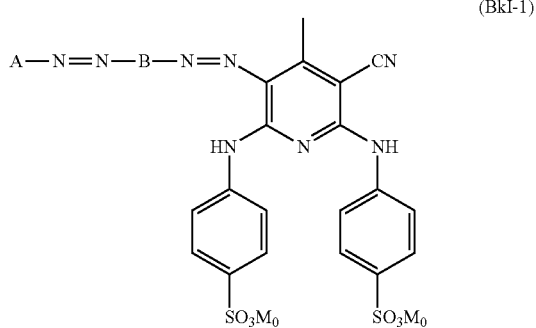

(BkI-1)

In the general formula (BkI-1), A represents an aromatic or heterocyclic group which may be substituted, B represents any one of the groups represented by the following general formulae (1) to (5), and Mos each independently represents a hydrogen atom, an alkali metal, ammonium, or an organic ammonium.

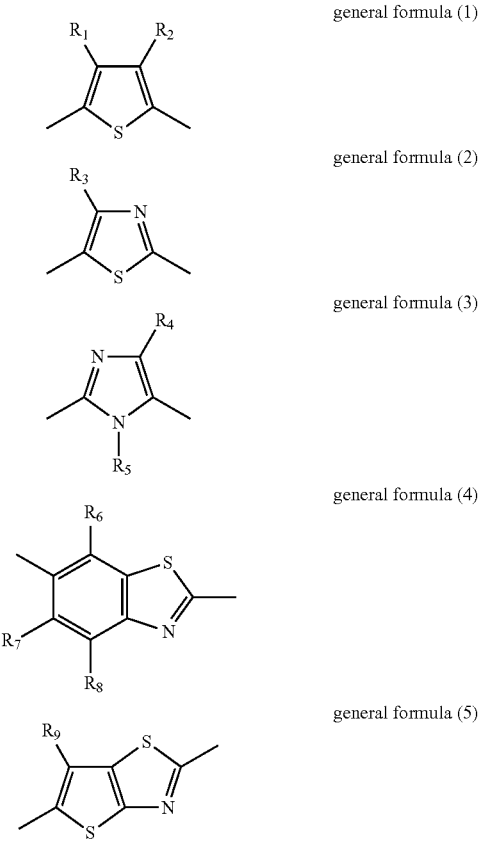

In the general formulae (1) to (5), $R_1$ to $R_9$ each independently represents a hydrogen atom, a halogen atom, an aliphatic group, an aromatic group, a heterocyclic group, a carboxylic group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group including an aniline group and a heterocyclic amino group, an acylamino group, a ureido group, a sulfamoylamino group, an alkoxycarbonylamino group, an aryloxycarbonylamino group, an alkyl- or aryl-sulfonylamino group, a heterocyclic sulfonylamino group, a cyano group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfonic acid group, with each group optionally further having a substituent.

A in the general formula (BkI-1) represents an aromatic or heterocyclic group which may be substituted and, specifically, A can be one of the following substituents. As A, there are illustrated a benzene ring, a naphthalene ring, a pyridine ring, an imidazole ring, a pyrazole ring, a thiazole ring, an isothiazole ring, a thiadiazole ring, a benzothiazole ring, and a benzoisothiazole ring. Of the above-described rings, a benzene ring, a naphthalene ring, a pyridine ring, a pyrazole ring, an imidazole ring, an isothiazole ring, and a benzothiazole ring are particularly preferred, with a benzene ring and a naphthalene ring being more preferred.

B in the general formula (BKI-1) is any one of the groups represented by the above-shown general formulae (1) to (5).

$R_1$ to $R_9$ in the general formulae (1) to (5) each independently represents a hydrogen atom, a halogen atom, an aliphatic group, an aromatic group, a heterocyclic group, a carboxylic group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group including an aniline group and a heterocyclic amino group, an acylamino group, a ureido group, a sulfamoylamino group, an alkoxycarbonylamino group, an aryloxycarbonylamino group, an alkyl- or aryl-sulfonylamino group, a heterocyclic sulfonylamino group, a cyano group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfonic acid group, with each group optionally further having a substituent. As these groups, there are illustrated the same groups as those groups in the aforesaid substituent group J, and preferred groups are also the same as are described there.

Mos in the general formula (BkI-1) each independently represent a hydrogen atom, an alkali metal, ammonium, or an organic ammonium. Specific examples of the aforesaid alkali metal include lithium, sodium, and potassium. Specific examples of the aforesaid organic ammonium include acetamide, benzamide, methylamino, butylamino, diethylamino, phenylamino, and triethanolamino.

In the compounds to be used in the invention which are represented by the general formula (BkI-1), A is preferably an optionally substituted naphthyl group, and B is preferably a group represented by the above-described general formula (2), with $R_3$ in the above-described general formula (2) being more preferably an aryl group or a pyridyl group. As the aryl group or pyridyl group, the following ones are specifically preferred: a phenyl group, a 2-methylphenyl group, a 3-methylphenyl group, a 4-methylphenyl group, etc.; a 2,3-dimethylphenyl group, a 2,4-dimethylphenyl group, a 2,5-dimethylphenyl group, a 3,4-dimethylphenyl group, a 2,6-dimethylphenyl group, a 3,5-dimethylphenyl group, etc.; a 2,4,6-trimethylphenyl group, a 2,3,4-trimethylphenyl group, a 2,3,5-trimethylphenyl group, a 2,3,6-trimethylphenyl group, etc.; a 2-chlorophenyl group, a 3-chlorophenyl group, a 4-chlorophenyl group, etc.; a 2-ethylphenyl group, a 3-ethylphenyl group, a 4-ethylphenyl group, etc.; and a 2-pyridyl group, a 3-pyridyl group, a 4-pyridyl group, a 1-naphthyl group, a 2-naphthyl group, etc. Of these, a phenyl group, a 3-methylphenyl group, a 4-methylphenyl group, a 2-chlorophenyl group, a 3-chlorophenyl group, a 2-pyridyl group, a 4-pyridyl group, a 1-naphthyl group, a 2-naphthyl group, etc. are particularly preferred.

A is preferably an unsubstituted aryl group or an aryl group substituted by a substituent having a Hammett substituent σp value of less than 0.3, more preferably an aryl group substituted by only an ionic hydrophilic group, still more preferably a naphthyl group substituted by only an ionic hydrophilic group. As the ionic hydrophilic group, —SO$_3$M or —CO$_2$M is preferred, —SO$_3$M is more preferred, and —SO$_3$Li is particularly preferred. M is the same as Mo in the general formula (BkI-1), and preferred examples thereof are also the same as those of Mo.

Also, the number of the ionic hydrophilic group which is a substituent on the naphthyl group is preferably from 1 to 3, more preferably 2 or 3, particularly preferably 3.

Specific examples of A are preferably those groups which are selected from the following substituents (A1) to (A5), more preferably those groups which are selected from the following substituents (A1) to (A4).

Also, in the case where A is a substituted phenyl group, $R_1$ to $R_9$ in the general formula (BkI-1) each independently represent a halogen atom, an aliphatic group, an aromatic group, a heterocyclic group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group including an aniline group and a heterocyclic amino group, an acylamino group, a ureido group, a sulfamoylamino group, an alkoxycarbonylamino group, an aryloxycarbonylamino group, an alkyl- or aryl-sulfonylamino group, a heterocyclic sulfonylamino group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, or a sulfamoyl group, with each group optionally further having a substituent.

In the following specific examples, M is the same as Mo in the general formula (BkI-1), and preferred examples thereof are also the same as those of Mo. * shows the point of attachment to the general formula (BkI-1).

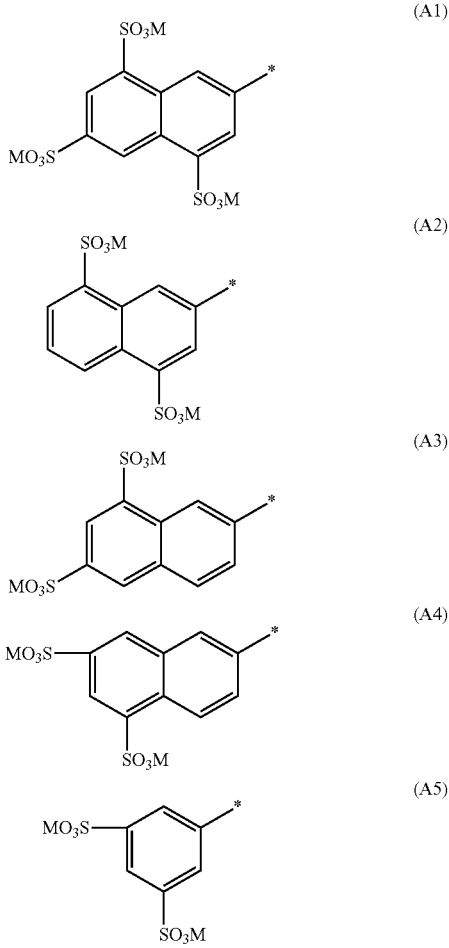

The compounds of the foregoing general formula (BkI-1) preferably show the maximum absorption in the absorption spectrum measured by using water as a solvent at a wavelength (λmax) of from 590 to 620 nm.

As preferred specific examples of the compound represented by the foregoing general formula (BkI-1), there are illustrated the following illustrative compounds I-1 to I-12. Additionally, the compounds in accordance with the invention are not limited only to the following illustrative compounds, and compounds included in the structure of the foregoing general formula (BkI-1) are within the scope of the invention. In the invention, of the following illustrative compounds, illustrative compounds I-3, I-5, I-6, I-8, I-9, I-10, I-11, and I-12 are particularly preferred to use, with use of the illustrative compounds I-3, I-5, and I-10 being more preferred. M in the following specific examples is the same as Mo in the general formula (BkI-1), and preferred examples thereof are also the same as those of Mo.

Exemplified compound I-1

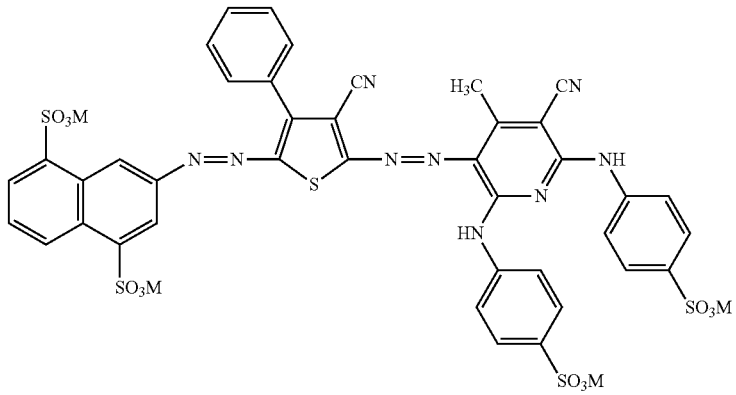

Exemplified compound I-2

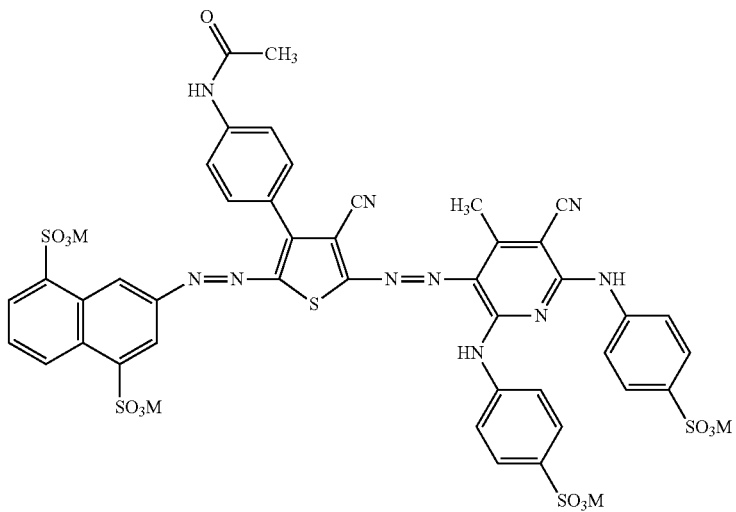

Exemplified compound I-3

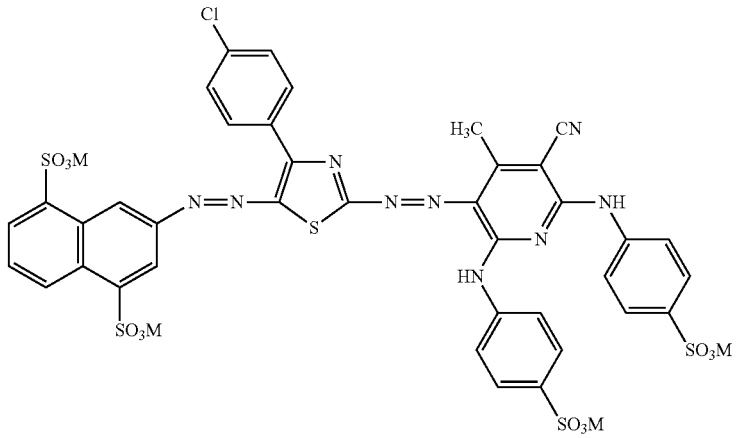

-continued
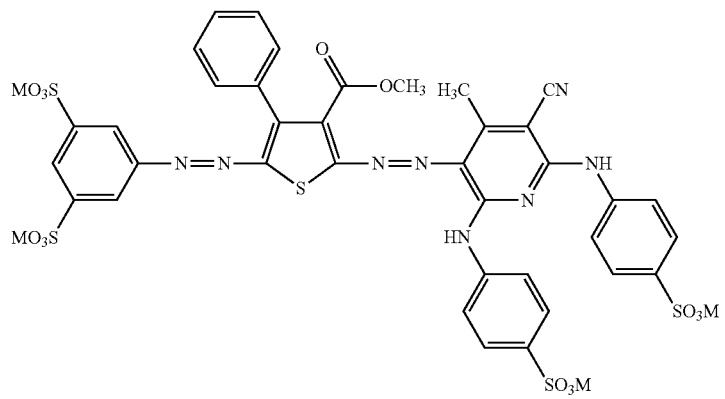
Exemplified compound I-4
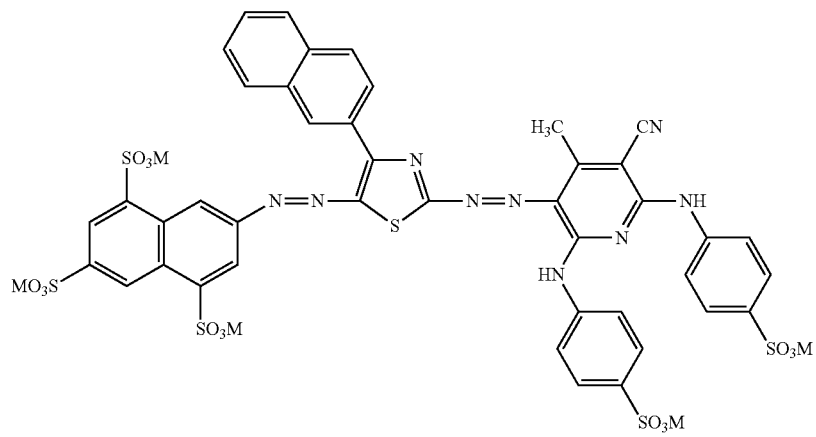
Exemplified compound I-5
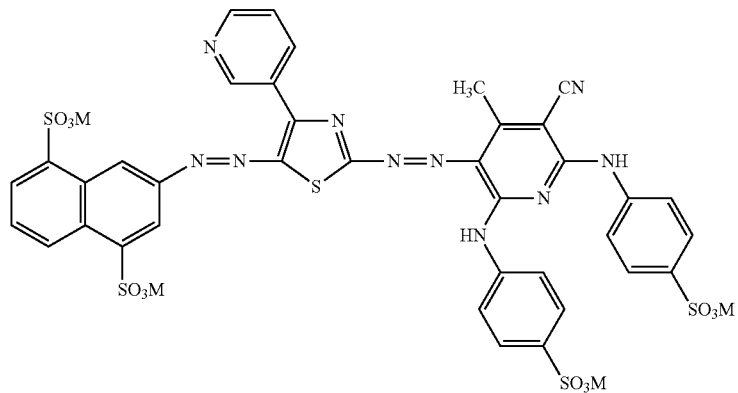
Exemplified compound I-6
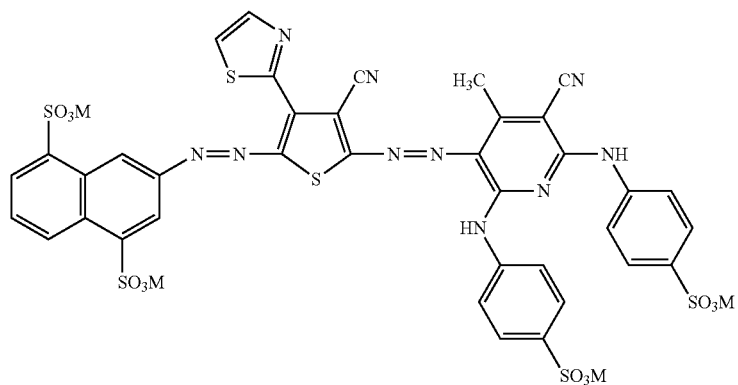
Exemplified compound I-7

-continued
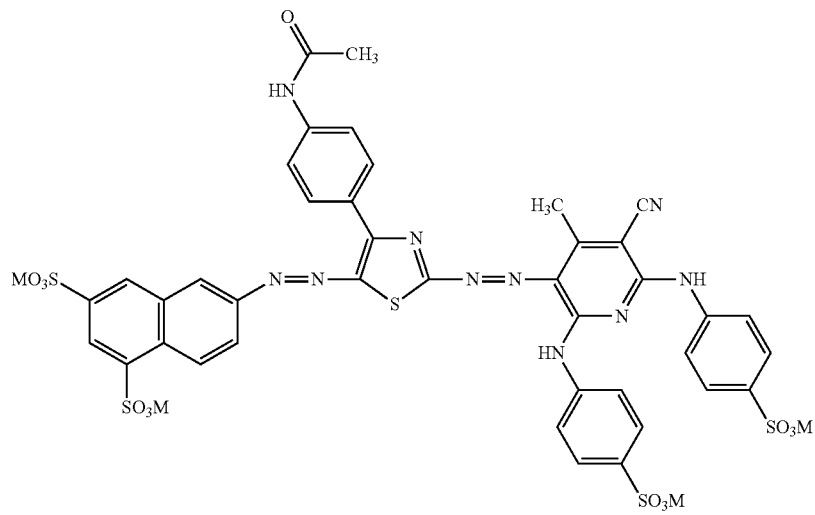
Exemplified compound I-8
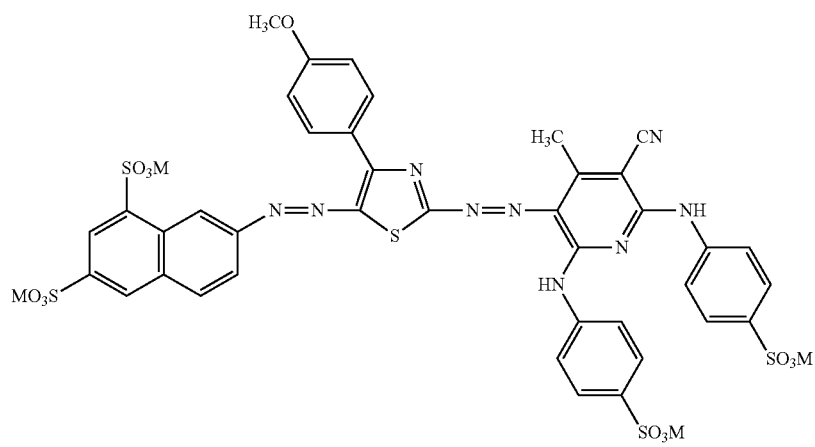
Exemplified compound I-9
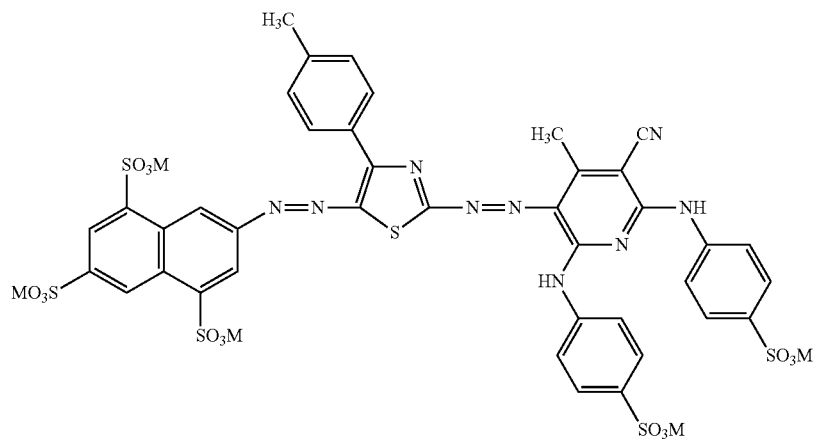
Exemplified compound I-10

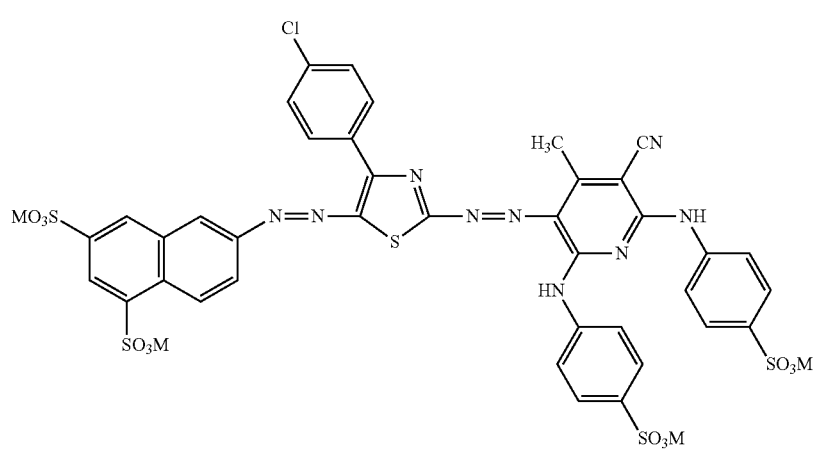

Exemplified compound I-11

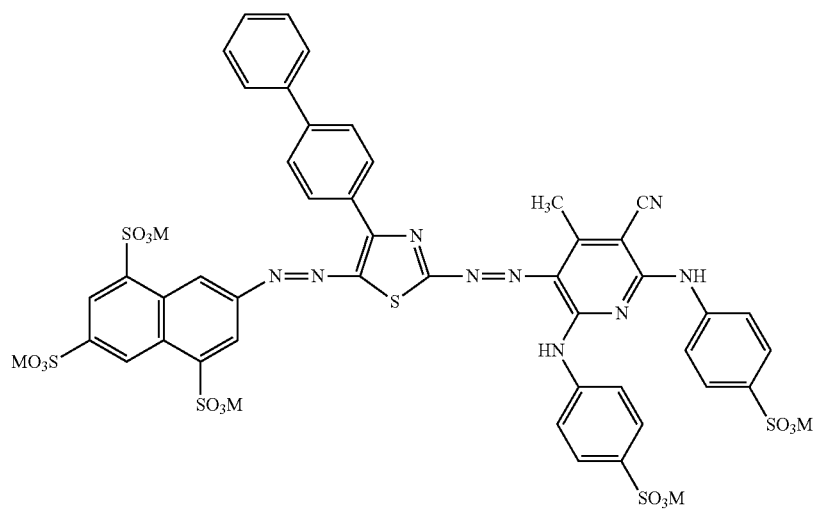

Exemplified compound I-12

[Second Coloring Material: Compound Represented by the General Formula (BkII-1) or Compound Represented by the General Formula (BkIII-1)]

It is necessary for the ink of the invention to contain the compound of the following general formula (BkII-1) or (BkIII-1) as the second coloring material.

[Compound Represented by the General Formula (BkII-1)]

The azo compounds represented by the general formula (BkII-1) (hereinafter also referred to as "compound represented by the general formula (BkII-1) in some cases) will be described.

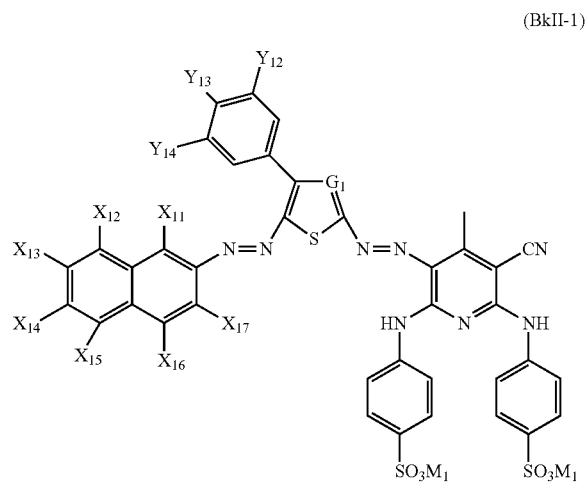

(BkII-1)

In the general formula (BkII-1), $G_1$ represents a nitrogen atom or $-C(R_{12})=$. $R_{12}$ represents a hydrogen atom, a sulfo group, a carboxyl group, a substituted or unsubstituted carbamoyl group, or a cyano group. $X_{11}, X_{12}, X_{13}, X_{14}, X_{15}, X_{16}$, and $X_{17}$ each independently represent a hydrogen atom or a monovalent substituent. $Y_{12}, Y_{13}$, and $Y_{14}$ each independently represent a hydrogen atom or a monovalent substituent. $Y_{12}$, $Y_{13}$, and $Y_{14}$ may be connected to each other to form a ring. $M_1$s each independently represent a hydrogen atom or a monovalent counter cation.

In the general formula (BkII-1), $Y_{12}$, $Y_{13}$, and $Y_{14}$ each independently represent preferably a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an alkylsulfonylamino group having an ionic hydrophilic group as a substituent, an arylsulfonylamino group having an ionic hydrophilic group as a substituent, or an acylamino group having an ionic hydrophilic group as a substituent, particularly preferably a hydrogen atom, an arylsulfonylamino group having an ionic hydrophilic group as a substituent, or an acylamino group having an ionic hydrophilic group as a substituent.

When the carbamoyl group, sulfamoyl group, alkylsulfonylamino group, arylsulfonylamino group, and acylamino group which $Y_{12}$, $Y_{13}$, and $Y_{14}$ represent have substituents, the substituents each independently are more preferably an ionic hydrophilic group (e.g., $-CO_2M_{11}$ or $-SO_3M_{11}$: $M_{11}$ being a monovalent counter cation).

$Y_{12}, Y_{13}$, and $Y_{14}$ may be connected to each other to form a ring and, as the ring formed by connecting $Y_{12}, Y_{13}$, and $Y_{14}$ to each other, there are illustrated, for example, a benzene ring and a naphthalene ring, with a benzene ring being preferred.

$Y_{12}, Y_{13}$, and $Y_{14}$ may further have a substituent and, as the substituent, there can be illustrated the foregoing substituent J, with a hydroxyl group, an aryl group which may have an ionic hydrophilic group, and a heterocyclic group being preferred.

As the ionic hydrophilic group in the general formula (BkII-1), $-SO_3M_{11}$ or $-CO_2M_1$ is preferred, $-SO_3M_{11}$ is more preferred, and $-SO_3Li$ is particularly preferred.

Foregoing $M_1$ and $M_{11}$ each independently represent a hydrogen atom or a monovalent counter cation, as the monovalent counter cation, there are illustrated, for example, an ammonium ion, an alkali metal ion (e.g., lithium ion, sodium ion, or potassium ion) and an organic cation (e.g., tetramethylammonium ion, tetramethylguadidium ion, or tetramethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

In the general formula (BkII-1), $X_{11}, X_{12}, X_{13}, X_{14}, X_{15}, X_{16}$, and $X_{17}$ each independently represent a hydrogen atom or a monovalent substituent. When $X_{11}, X_{12}, X_{13}, X_{14}, X_{15}, X_{16}$, and $X_{17}$ each represent a substituent, such substituent includes the foregoing substituent J.

$X_{11}, X_{12}, X_{13}, X_{14}, X_{15}, X_{16}$, and $X_{17}$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, particularly preferably a hydrogen atom, an ionic hydrophilic group, or a cyano group.

In the general formula (BkII-1), $X_{11}, X_{13}, X_{15}$, and $X_{17}$ each independently represents preferably a hydrogen atom or any one belonging to the substituent group J and, more preferably, at least one of $X_{12}, X_{14}$, and $X_{16}$ represents an electron-withdrawing group having a Hammett substituent cm value of 0.3 or more.

Particularly preferred combinations of the symbols in the compounds represented by the general formula (BkII-1) include the following (i) to (v).

(i) $G_1$ represents a nitrogen atom or $-C(R_{12})=$, with $-C(R_{12})=$ being preferred. $R_{12}$ represents a hydrogen atom, a sulfo group, a carboxyl group, a substituted or unsubstituted carbamoyl group, or a cyano group, preferably a carbamoyl group ($-CONH_2$ group), or a cyano group, more preferably a cyano group.

(ii) $Y_{12}, Y_{13}$, and $Y_{14}$ each independently represent a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an ionic hydrophilic group, a substituted or unsubstituted alkylsulfonylamino group, a substituted or unsubstituted arylsulfonylamino group, or an acylamino group, particularly preferably a hydrogen atom, an arylsulfonylamino group having an ionic hydrophilic group as a substituent, or an acylamino group having an ionic hydrophilic group as a substituent.

$Y_{12}$ and $Y_{14}$ each represent most preferably a hydrogen atom, and $Y_{13}$ represents most preferably an arylsulfonylamino group having an ionic hydrophilic group as a substituent, or an acylamino group having an ionic hydrophilic group as a substituent.

(iii) As the ionic hydrophilic group, $-SO_3M_{11}$ or $-CO_2M_{11}$ is preferred, $-SO_3M_{11}$ is more preferred, and $-SO_3Li$ is particularly preferred.

(iv) Foregoing $M_1$ and $M_{11}$ each independently represent a hydrogen atom or a monovalent counter cation and, as the monovalent counter cation, there are illustrated, for example, ammonium ion, an alkali metal ion (e.g., lithium ion, sodium ion, or potassium ion), and an organic cation (e.g., tetramethylammonium ion, tetramethylguanidium ion, or tetramethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

(v) $X_{11}$, $X_{12}$, $X_{13}$, $X_{14}$, $X_{15}$, $X_{16}$, and $X_{17}$ each independently represent more preferably a hydrogen atom, an ionic hydrophilic group, a cyano group, a methanesulfonyl group, a phenylsulfonyl group, a nitro group, a methoxycarbonyl group, or a carbamoyl group, and particularly preferably represents a hydrogen atom, an ionic hydrophilic group, or a cyano group. $X_{11}$, $X_{13}$, $X_{15}$, and $X_{17}$ each independently represent preferably a hydrogen atom or any one belonging to the substituent group J and, more preferably, at least one of $X_{12}$, $X_{14}$, and $X_{16}$ represents an electron-withdrawing group having a Hammett substituent σp value of 0.3 or more.

As the reason for preferableness of this structure, there is illustrated that it gives to the azo compound represented by the general formula (BkII-1) having an improved water solubility and can electronically and sterically impart to the azo compound an azo colorant structure which provides both good hue and tinctorial strength and high storage stability.

As a result, storage stability as an aqueous solution is improved, and light fastness, heat fastness, moist heat fastness, water fastness, gas fastness, and/or solvent fastness is remarkably improved, thus the above-described structure being the most preferred example.

The compounds represented by the above-described general formula (BkII-1) are preferably compounds represented by the following general formula (BkII-2).

The compounds represented by the general formula (BkII-2) or the salts thereof will be described in detail below.

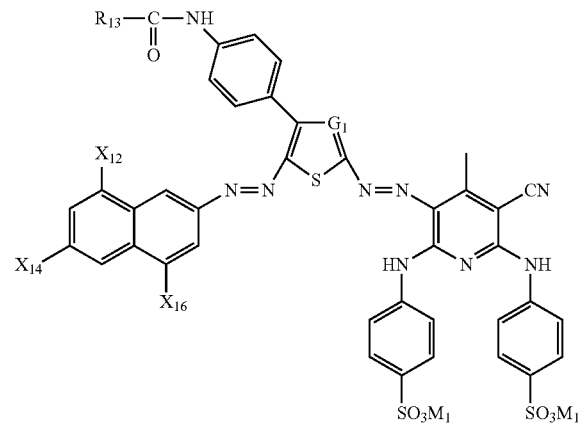

(BkII-2)

In the general formula (BkII-2), $G_1$ represents a nitrogen atom or —$C(R_{12})$=. $R_{12}$ represents a hydrogen atom, a sulfo group, a carboxyl group, a substituted or unsubstituted carbamoyl group, or a cyano group. $X_{12}$, $X_{14}$, and $X_{16}$ each independently represents a hydrogen atom or a monovalent substituent, provided that at least one of $X_{12}$, $X_{14}$, and $X_{16}$ represents an electron-withdrawing group having a Hammett σp value of 0.3 or more. $R_{13}$ represents a monovalent substituent. $M_1$s each independently represent a hydrogen atom or a monovalent counter cation.

Examples of $G_1$, $R_{12}$, and $M_1$ in the general formula (BkII-2) are independently the same as $G_1$, $R_{12}$, and $M_1$ in the above-described (BkII-1), and preferred examples thereof are also the same as described there.

In the general formula (BkII-2), $X_{12}$, $X_{14}$, and $X_{16}$ each independently represents a hydrogen atom or a monovalent substituent. When $X_{12}$, $X_{14}$, and $X_{16}$ each represents a substituent, such substituent includes the foregoing substituent J, provided that at least one of $X_{12}$, $X_{14}$, and $X_{16}$ represents an electron-withdrawing group having a Hammett σp value of 0.3 or more.

$X_{12}$, $X_{14}$, and $X_{16}$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, particularly preferably a hydrogen atom, an ionic hydrophilic group, or a cyano group.

Further, at least one of $X_{12}$, $X_{14}$, and $X_{16}$ represents an electron-withdrawing group having a Hammett σp value of 0.3 or more. The upper limit of the Hammett σp value of the electron-withdrawing group is 1.0.

When at least one of $X_{12}$, $X_{14}$, and $X_{16}$ is an electron-withdrawing group having a Hammett σp value within the above-described range, it is possible to adjust hue of the azo compound and improve light fastness and ozone gas fastness of the compound, which is effective in using the compound as a water-soluble dye for an inkjet recording black ink.

Specific examples of the electron-withdrawing group having a Hammett σp value of 0.3 or more include an acyl group, an acyloxy group, a carbamoyl group, an alkyloxycarbonyl group, an aryloxycarbonyl group, a cyano group, a nitro group, a dialkylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a Hammett σp value of 0.3 or more, a nitro group, a heterocyclic group, a halogen atom, an azo group, and a selenocyanato group. Preferred examples thereof are a cyano group, a methylsulfonyl group, a phenylsulfonyl group, a methoxycarbonyl group, a carbamoyl group, and a nitro group, with a cyano group, a methylsulfonyl group, and a nitro group being more preferred.

In view of hue, tinctorial strength, and storage stability of the aqueous solution, at least one of $X_{12}$, $X_{14}$, and $X_{16}$ is preferably an ionic hydrophilic group, at least one of $X_{12}$, $X_{14}$, and $X_{16}$ is preferably an electron-withdrawing group having a Hammett σp value of 0.3 or more. More preferably, $X_{14}$s is an electron-withdrawing group having a Hammett σp value of 0.3 or more, and $X_{12}$ and $X_{16}$ each is an ionic hydrophilic group. As the ionic hydrophilic group, —$SO_3M_{11}$ or —$CO_2M_{11}$ ($M_{11}$=Li, K, Ca, Mg, or Ba) is preferred, —$CO_2M_1$ is more preferred, and —$CO_2Li$ is particularly preferred.

As the monovalent substituent represented by $R_{13}$ in the general formula (BkII-2), there can be illustrated those groups which belong to the substituent group A', and a substituted or unsubstituted alkyl group, a substituted or unsubstituted aryl group, or a heterocyclic group is preferred, with an alkyl or aryl group substituted by an ionic hydrophilic group being more preferred.

The compounds represented by the foregoing general formula (BkII-2) are preferably compounds represented by the following general formula (BkII-3).

The compounds represented by the general formula (BkII-3) or the salts thereof will be described in detail below.

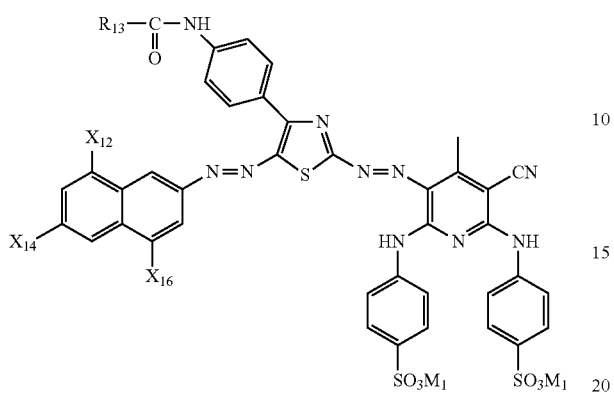

(BkII-3)

In the general formula (BkII-3), $R_{13}$ represents a monovalent substituent. $X_{12}$, $X_{14}$, and $X_{16}$ each independently represents a hydrogen atom or a monovalent substituent, provided that at least one of $X_{12}$, $X_{14}$, and $X_{16}$ represents an electron-withdrawing group having a Hammett σp value of 0.3 or more. $M_1$ represents a hydrogen atom or a monovalent counter cation.

Examples of $M_1$, $R_{12}$, $R_{13}$, $X_{12}$, $X_{14}$, and $X_{16}$ are independently the same as examples of $M_1$, $R_{12}$, $R_{13}$, $X_{12}$, $X_{14}$, and $X_{16}$ in the foregoing general formula (BkII-2), and preferred examples are also the same as described there.

Particularly preferred combinations of the symbols in the compounds represented by the general formulae (BkII-2) and (BkII-3) include the following (i) to (iv).

(i) As the monovalent substituent represented by $R_{13}$, there can be illustrated those belonging to the substituent group A', and the monovalent substituent is preferably a substituted or unsubstituted alkyl group, a substituted or unsubstituted aryl or a heterocyclic group, and is more preferably an alkyl or aryl group substituted by an ionic hydrophilic group.

(ii) The ionic hydrophilic group is preferably —$SO_3M_{11}$ or —$CO_2M_{11}$, more preferably —$SO_3M_{11}$, particularly preferably —$SO_3Li$.

(iii) The above-described $M_1$ and $M_{11}$ each independently represent a hydrogen atom or a monovalent counter cation. As the monovalent counter cation, there are illustrated, for example, ammonium ion, an alkali metal ion (e.g., lithium ion, sodium ion, or potassium ion), and an organic cation (e.g., tetramethylammonium ion, tetramethylguanidium ion, or tetramethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

(iv) At least one of $X_{12}$, $X_{14}$, and $X_{16}$ preferably represents an ionic hydrophilic group, at least one of $X_{12}$, $X_{14}$, and $X_{16}$ preferably represents an electron-withdrawing group having a Hammett σp value of 0.3 or more. More preferably, $X_{14}$ is an electron-withdrawing group having a Hammett σp value of 0.3 or more, and $X_{12}$ and $X_{16}$ each is an ionic hydrophilic group.

As the reason for preferableness of this structure, there is illustrated that it remarkably improves water solubility of the azo compounds represented by the general formulae (BkII-2) and (BkII-3) and remarkably improves associating properties of the azo colorants in an aqueous solution thereof and, particularly, that it improves the high storage stability in an aqueous solution.

As a result, long-term storage stability is improved, and light fastness, heat fastness, moist heat fastness, water fastness, gas fastness, and/or solvent fastness, which are performances required for an ink, is remarkably improved, thus the above-described structure being the most preferred example.

The compounds represented by the above-described general formula (BkII-1) or (BkII-2) are preferably compounds represented by the following general formula (BkII-4).

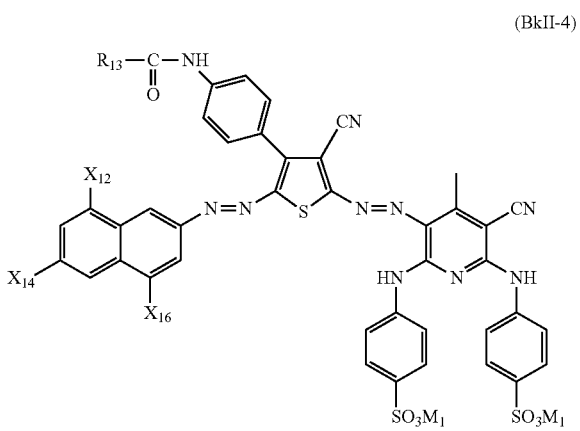

(BkII-4)

In the general formula (BkII-4), $R_{13}$ represents a monovalent substituent. $X_{12}$, $X_{14}$, and $X_{16}$ each independently represents a hydrogen atom or a monovalent substituent, provided that at least one of $X_{12}$, $X_{14}$, and $X_{16}$ represents an electron-withdrawing group having a Hammett σp value of 0.3 or more. $M_1$s each independently represent a hydrogen atom or a monovalent counter cation.

Examples of $R_{13}$, $X_{12}$, $X_{14}$, $X_{16}$, and $M_1$ in the general formula (BkII-4) are independently the same as examples of $R_{13}$, $X_{12}$, $X_{14}$, $X_{16}$, and $M_1$ in the foregoing general formula (BkII-3), and preferred examples are also the same as described there.

The compounds represented by the foregoing formulae (BkII-1) to (BkII-4) preferably show the maximum absorption in the absorption spectrum measured by using water as a solvent at a wavelength (λmax) of from 550 to 700 nm, particularly preferably from 580 nm to 650 nm.

Also, in the invention, the compounds represented by the foregoing general formulae (BkII-1) to (BkII-4) preferably have at least 3 ionic hydrophilic groups, more preferably from 3 to 6 ionic hydrophilic groups, still more preferably 4 or 5 ionic hydrophilic groups. Presence of such ionic hydrophilic groups exhibits the effect of improving water solubility and storage stability as an aqueous solution of the azo compounds of the invention, satisfying requirement as a water-soluble dye for inkjet recording black ink at a high level and, further, more improving image quality of inkjet print products when used as an ink for inkjet recording.

Also, in the invention, compounds represented by the general formulae (BkII-1) to (BkII-4) may be used even when they contain isotopes (e.g., 2H, 3H, 13C, and 15N).

Specific examples of the compounds represented by the foregoing general formulae (BkII-1) to (BkII-4) are shown below, but the compounds to be used in the invention are not limited only to the following illustrative compounds.

(BLACK-11):

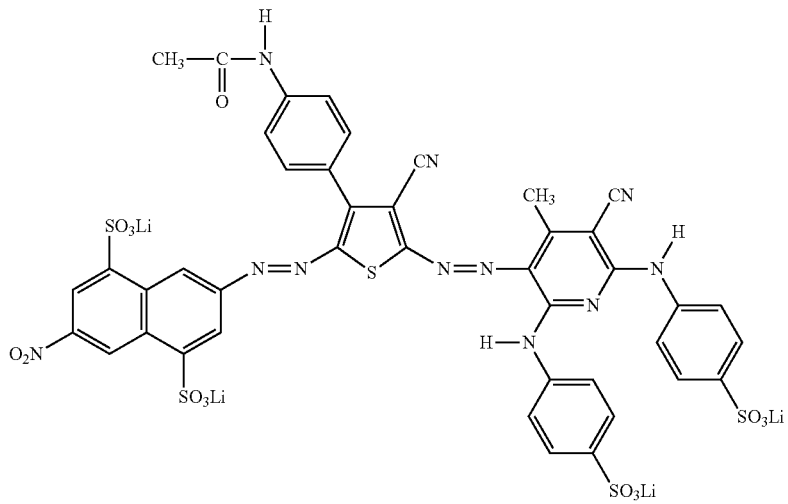

(BLACK-12):

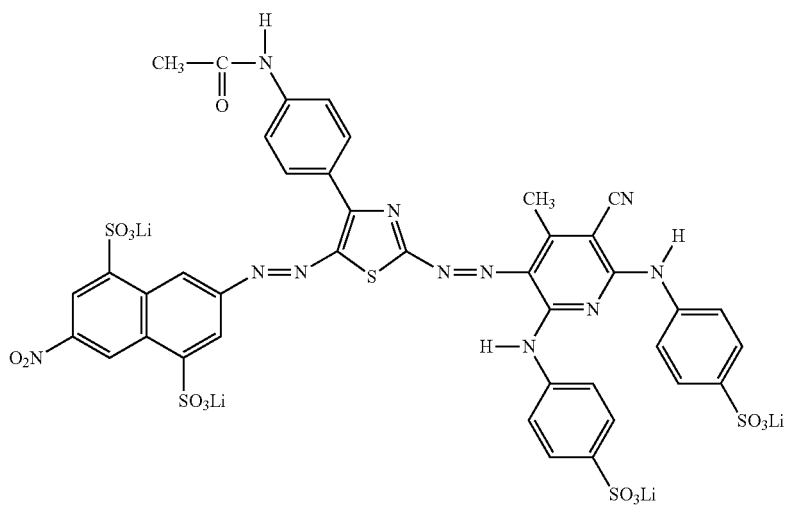

The azo compounds represented by the foregoing general formula (BkII-1) can be synthesized by coupling reaction between a diazo component and a coupler, and descriptions thereon are given in JP-A-2003-306623.

[Compounds Represented by the General Formula (BkIII-1)]

The compounds represented by the general formula (BkIII-1) will be described.

The azo compounds represented by the general formula (BkIII-1) (hereinafter also referred to as "compound represented by the general formula (BkIII-1) in some cases) will be described.

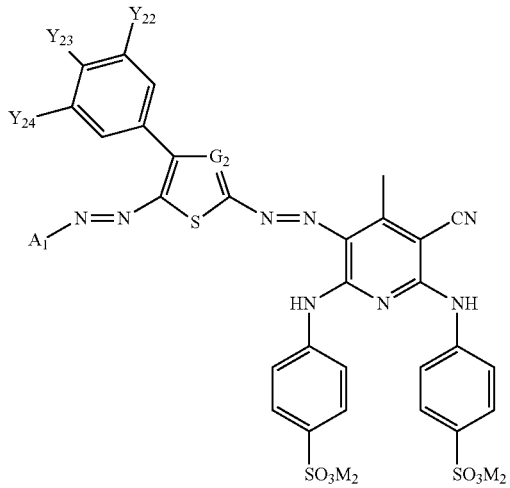

(BkIII-1)

In the general formula (BkIII-1), $A_1$ represents an aryl group or a nitrogen-containing 5-membered heterocyclic group. $G_2$ represents a nitrogen atom or —$C(R_{22})$=. $R_{22}$ represents a hydrogen atom, a sulfo group, a carboxyl group, a substituted or unsubstituted carbamoyl group, or a cyano group. $Y_{22}$, $Y_{23}$, and $Y_{24}$ each independently represent a hydrogen atom or a monovalent substituent. $Y_{22}$, $Y_{23}$, and $Y_{24}$ may be connected to each other to form a ring. $M_2$s each independently represent a hydrogen atom or a monovalent counter cation.

$G_2$ in the general formula (BkIII-1) represents a nitrogen atom or —$C(R_{22})$=. $R_{22}$ represents a hydrogen atom, a sulfo group, a carboxyl group, a substituted or unsubstituted carbamoyl group, or a cyano group. When the carbamoyl group has a substituent, examples of the substituent include an alkyl group (e.g., a methyl group or an ethyl group) and an aryl group (e.g., a phenyl group).

$Y_{22}$, $Y_{23}$, and $Y_{24}$ each independently represent a hydrogen atom or a monovalent substituent. When $Y_{22}$, $Y_{23}$, and $Y_{24}$ each represent a substituent, such substituent includes the foregoing substituent group J.

In the general formula (BkIII-1), $Y_{22}$, $Y_{23}$, and $Y_{24}$ each independently represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an alkylsulfonylamino group having an ionic hydrophilic group as a substituent, an arylsulfonylamino group having an ionic hydrophilic group as a substituent, or an acylamino group having an ionic hydrophilic group as a substituent, particularly preferably a hydrogen atom, an arylsulfonylamino group having an ionic hydrophilic group as a substituent, or an acylamino group having an ionic hydrophilic group as a substituent.

When the carbamoyl group, sulfamoyl group, alkylsulfonylamino group, arylsulfonylamino group, and acylamino group which $Y_{22}$, $Y_{23}$, and $Y_{24}$ represent have substituents, the substituents each independently are more preferably an ionic hydrophilic group (e.g., —$CO_2M_{11}$ or —$SO_3M_{11}$: $M_{11}$ being a monovalent counter cation).

$Y_{22}$, $Y_{23}$, and $Y_{24}$ may be connected to each other to form a ring and, as the ring formed by connecting $Y_{22}$, $Y_{23}$, and $Y_{24}$ to each other, there are illustrated, for example, a benzene ring and a naphthalene ring, with a benzene ring being preferred.

$Y_{22}$, $Y_{23}$, and $Y_{24}$ may further have a substituent and, as the substituent, there can be illustrated a hydroxyl group, an aryl group which may have an ionic hydrophilic group, and a heterocyclic group.

$A_1$ represents an aryl group or a monocyclic or a condensed heterocyclic group. The aryl group includes a substituted or unsubstituted aryl group. More specifically, there are illustrated aryl groups having a substituent group J.

The aryl group which $A_1$ represents is preferably a substituted or unsubstituted aryl group containing from 6 to 30 carbon atoms, more preferably a substituted or unsubstituted phenyl group. As examples of the substituent, there are illustrated those groups which are described in the foregoing paragraph on substituents, and the substituent is preferably an electron-withdrawing group having the foregoing Hammett substituent σp value of 0.3 or more.

The heterocyclic group which $A_1$ represents includes a substituted or unsubstituted heterocyclic group. As the heterocyclic group which $A_1$ represents, a monovalent group formed by removing one hydrogen atom from a 5- or 6-membered, substituted or unsubstituted, aromatic or non-aromatic heterocyclic compound is preferred, and a 5- or 6-membered aromatic heterocyclic group containing from 3 to 30 carbon atoms is more preferred. As examples of the substituent, there are illustrated groups which are described in the foregoing paragraph on the substituent group J. As examples of the foregoing 5-membered, nitrogen-containing heterocyclic group, there are illustrated, without limiting the substitution position, a pyrrole ring, a pyrazole ring, an imidazole ring, a triazole ring, a thiazole ring, an isothiazole ring, and a thiadiazole ring.

As examples of the foregoing 6-membered, nitrogen-containing heterocyclic group, there are illustrated, without limiting the substitution position, a pyridine ring, a pyrazine ring, a pyridazine ring, a pyrimidine ring, and a triazine ring.

$A_1$ is preferably an aryl group having a substituent, more preferably an aryl group having an ionic hydrophilic group or an electron-withdrawing group having a Hammett substituent σp value of 0.3 or more, still more preferably a phenyl group having an ionic hydrophilic group or an electron-withdrawing group having a Hammett substituent σp value of 0.3 or more.

The ionic hydrophilic group in the general formula (BkIII-1) is preferably —$SO_3M_{11}$ or —$CO_2M_{11}$, more preferably —$SO_3M_{111}$, particularly preferably —$SO_3Li$.

The foregoing $M_1$ and $M_{11}$ each independently represent a hydrogen atom or a monovalent counter cation. As the monovalent counter cation, there are illustrated, for example, ammonium ion, an alkali metal ion (e.g., lithium ion, sodium ion, or potassium ion), and an organic cation (e.g., tetramethylammonium ion, tetramethylguanidium ion, or tetraethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

Particularly preferred combinations of the symbols in the compounds represented by the general formula (BkIII-1) include the following (i) to (v).

(i) $G_2$ represents a nitrogen atom or $-C(R_{22})=$, with $-C(R_{22})=$ being preferred. $R_{22}$ represents a hydrogen atom, a sulfo group, a carboxyl group, a substituted or unsubstituted carbamoyl group, or a cyano group, preferably a carbamoyl group ($-CONH_2$ group), or a cyano group, more preferably a cyano group.

(ii) $A_1$ is preferably an aryl group having a substituent, more preferably an aryl group having an ionic hydrophilic group or an electron-withdrawing group having a Hammett substituent σp value of 0.3 or more, still more preferably a phenyl group having two ionic hydrophilic groups.

(iii) $Y_{22}$, $Y_{23}$, and $Y_{24}$ each independently represents a hydrogen atom, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, or an acylamino group, more preferably a hydrogen atom, an ionic hydrophilic group, a substituted or unsubstituted alkylsulfonylamino group, a substituted or unsubstituted arylsulfonylamino group, or an acylamino group, particularly preferably a hydrogen atom, an arylsulfonylamino group having an ionic hydrophilic group as a substituent, or an acylamino group having an ionic hydrophilic group as a substituent.

$Y_{22}$ and $Y_{24}$ each represent most preferably a hydrogen atom, and $Y_{23}$ represents most preferably an arylsulfonylamino group having an ionic hydrophilic group as a substituent, or an acylamino group having an ionic hydrophilic group as a substituent.

(iv) As the ionic hydrophilic group, $-SO_3M_{11}$ or $-CO_2M_{11}$ is preferred, $-SO_3M_{11}$ is more preferred, and $-SO_3Li$ is particularly preferred.

(v) Foregoing $M_1$ and $M_{11}$ each independently represent a hydrogen atom or a monovalent counter cation and, as the monovalent counter cation, there are illustrated, for example, ammonium ion, an alkali metal ion (e.g., lithium ion, sodium ion, or potassium ion), and an organic cation (e.g., tetramethylammonium ion, tetramethylguanidium ion, or tetramethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

As the reason for preferableness of this structure, there is illustrated that it gives to the azo compound represented by the general formula (BkIII-1) and having an improved water solubility and can electronically and sterically impart to the azo compound an azo colorant structure which provides both good hue and tinctorial strength and high storage stability.

As a result, storage stability as an aqueous solution is improved, and light fastness, heat fastness, moist heat fastness, water fastness, gas fastness, and/or solvent fastness, which are performances required for an ink, is remarkably improved, thus the above-described structure being the most preferred example.

The compounds represented by the above-described general formula (BkIII-1) are preferably compounds represented by the following general formula (BkIII-2).

The compounds represented by the general formula (BkIII-2) or the salts thereof will be described in detail below.

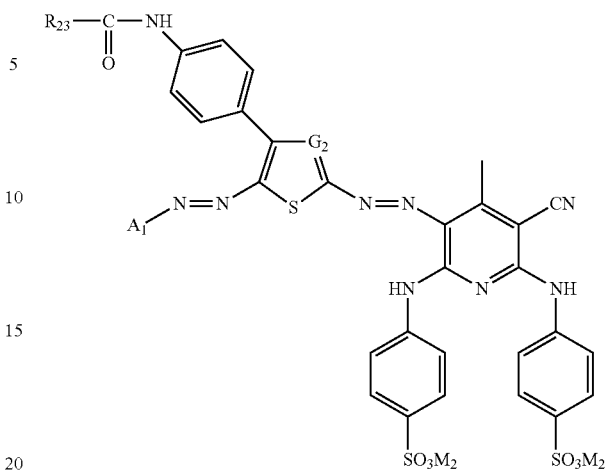

(BkIII-2)

In the general formula (BkIII-2), $G_2$ represents a nitrogen atom or $-C(R_{12})=$. $R_{22}$ represents a hydrogen atom, a sulfo group, a carboxyl group, a substituted or unsubstituted carbamoyl group, or a cyano group. $R_{23}$ represents a monovalent substituent. $A_1$ represents an aryl group or a 5-membered, nitrogen-containing heterocyclic group. $M_2$s each independently represents a hydrogen atom or a monovalent counter cation.

Examples of $G_2$, $R_{22}$, and $M_2$ in the general formula (BkIII-2) are independently the same as $G_2$, $R_{22}$, and $M_2$ in the above-described (BkIII-1), and preferred examples thereof are also the same as described there.

As the monovalent substituent represented by $R_{23}$ in the general formula (BkIII-2), there can be illustrated those which belong to the substituent group A', and the monovalent substituent is preferably a substituted or unsubstituted alkyl group, a substituted or unsubstituted aryl or a heterocyclic group, and is more preferably an alkyl or aryl group substituted by an ionic hydrophilic group.

The compounds represented by the above-described general formula (BkIII-2) are preferably compounds represented by the following general formula (BkIII-3).

The compounds represented by the general formula (BkIII-3) or the salts thereof will be described in detail below.

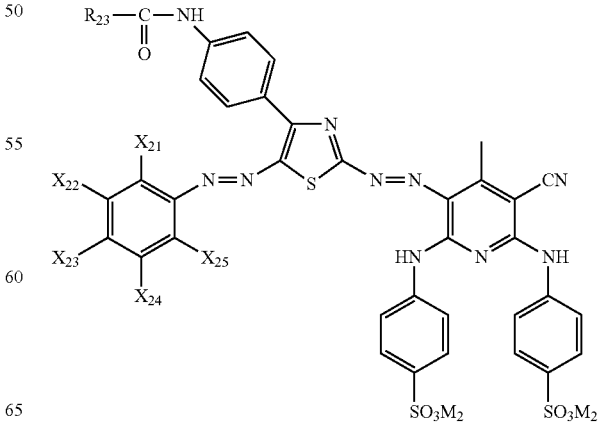

(BkIII-3)

In the general formula (BkIII-3), $R_{23}$ represents a monovalent substituent. $X_{21}$, $X_{22}$, $X_{23}$, $X_{24}$, and $X_{25}$ each independently represents a hydrogen atom or a monovalent substituent. $M_2$s each independently represents a hydrogen atom or a monovalent counter cation.

Examples of $M_2$ in the general formula (BkIII-3) are independently the same as $M_2$ in the above-described general formula (BkIII-2), and preferred examples thereof are also the same as described there.

As the monovalent substituent represented by $R_{23}$ in the general formula (BkIII-3), there can be illustrated those which belong to the substituent group A', and the monovalent substituent is preferably a substituted or unsubstituted alkyl group, a substituted or unsubstituted aryl or a heterocyclic group, and is more preferably an alkyl or aryl group substituted by an ionic hydrophilic group.

In the general formula (BkIII-3), $X_{21}$, $X_{22}$, $X_{23}$, $X_{24}$, and $X_{25}$ each independently represent a hydrogen atom or a monovalent substituent. When $X_{21}$, $X_{22}$, $X_{23}$, $X_{24}$, and $X_{25}$ each independently represent a substituent, such substituent includes the foregoing substituent J.

$X_{21}$, $X_{22}$, $X_{23}$, $X_{24}$, and $X_{25}$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, particularly preferably a hydrogen atom, an ionic hydrophilic group, or a cyano group.

In the general formula (BkIII-3), $X_{22}$ and $X_{24}$ each independently represent preferably a hydrogen atom or an ionic hydrophilic group. $X_{21}$, $X_{23}$, and $X_{25}$ each independently represents a hydrogen atom or any one belonging to the substituent group J and, more preferably, at least one of $X_{21}$, $X_{23}$, and $X_{25}$ represents an electron-withdrawing group having a Hammett substituent σp value of 0.3 or more. The upper limit of the Hammett σp value of the electron-withdrawing group is 1.0.

When at least one of $X_{21}$, $X_{23}$, and $X_{25}$ represents an electron-withdrawing group has a Hammett substituent σp value within the above-described range, it is possible to adjust hue of the azo compound and improve light fastness and ozone gas fastness of the compound, which is effective in using the compound as a water-soluble dye for an inkjet recording black ink.

Specific examples of the electron-withdrawing group having a Hammett σp value of 0.3 or more include an acyl group, an acyloxy group, a carbamoyl group, an alkyloxycarbonyl group, an aryloxycarbonyl group, a cyano group, a nitro group, a dialkylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a Hammett σp value of 0.3 or more, a nitro group, a heterocyclic group, a halogen atom, an azo group, and a selenocyanato group. Preferred examples thereof are a cyano group, a methylsulfonyl group, a phenylsulfonyl group, a methoxycarbonyl group, a carbamoyl group, and a nitro group, with a cyano group, a methylsulfonyl group, and a nitro group being more preferred.

In view of hue, tinctorial strength, and storage stability of the aqueous solution, at least one of $X_{22}$, $X_{23}$, and $X_{24}$ is preferably an ionic hydrophilic group, and $X_{21}$ and $X_{25}$ each preferably represent a hydrogen atom or an electron-withdrawing group having a Hammett σp value of 0.3 or more. More preferably, $X_{21}$, $X_{23}$, and $X_{25}$ each represents a hydrogen atom, and $X_{22}$ and $X_{24}$ each represent an ionic hydrophilic group. As the ionic hydrophilic group, —$SO_3M_{21}$ or —$CO_2M_{21}$ ($M_{21}$=Li, K, Ca, Mg, or Ba) is preferred, —$CO_2M_{21}$ is more preferred, and —$CO_2Li$ is particularly preferred.

Particularly preferred combinations of the symbols in the compounds represented by the general formula (BkIII-3) include the following (i) to (v).

(i) A is preferably an aryl group having a substituent, more preferably an aryl group having an ionic hydrophilic group or an electron-withdrawing group having a Hammett σp value of 0.3 or more, and still more preferably a phenyl group having 2 ionic hydrophilic groups.

(ii) G represents a nitrogen atom or —$C(R_{22})$=, with —$C(R_{22})$= being preferred. $R_{22}$ represents a hydrogen atom, a sulfo group, a carboxyl group, a substituted or unsubstituted carbamoyl group, or a cyano group, preferably a carbamoyl group (—$CONH_2$ group), or a cyano group, more preferably a cyano group.

(iii) As the monovalent substituent which $R_{23}$ represents, there can be illustrated those which belong to the substituent group A', and the monovalent substituent is preferably a substituted or unsubstituted alkyl group, a substituted or unsubstituted aryl group, or a heterocyclic group, more preferably an alkyl or aryl group substituted by an ionic hydrophilic substituent.

(iv) As the ionic hydrophilic group, —$SO_3M_{21}$ or —$CO_2M_{21}$ is preferred, —$SO_3M_{21}$ is more preferred, and —$SO_3Li$ is particularly preferred.

(v) Foregoing $M_2$ and $M_{21}$ each independently represents a hydrogen atom or a monovalent counter cation and, as the monovalent counter cation, there are illustrated, for example, ammonium ion, an alkali metal ion (e.g., lithium ion, sodium ion, or potassium ion), and an organic cation (e.g., tetramethylammonium ion, tetramethylguanidium ion, or tetramethylphosphonium ion). A lithium salt, a sodium salt, a potassium salt, or an ammonium salt is preferred, a lithium salt or a mixed salt wherein a lithium salt is a major component is more preferred, and a lithium salt is most preferred.

As the reason for preferableness of this structure, there is illustrated that it remarkably improves water solubility of the azo compounds represented by the general formula (BkIII-3) and remarkably improves associating properties of the azo colorants in an aqueous solution thereof and, particularly, that it improves the high storage stability in an aqueous solution.

As a result, long-term storage stability is improved, and light fastness, heat fastness, moist heat fastness, water fastness, gas fastness, and/or solvent fastness, which are performances required for an ink, is remarkably improved, thus the above-described structure being the most preferred example.

The compounds represented by the above-described general formula (BkIII-1) or (BkIII-2) are preferably compounds represented by the following general formula (BkIII-4).

The compounds represented by the general formula (BkIII-4) or the salts thereof will be described in detail below.

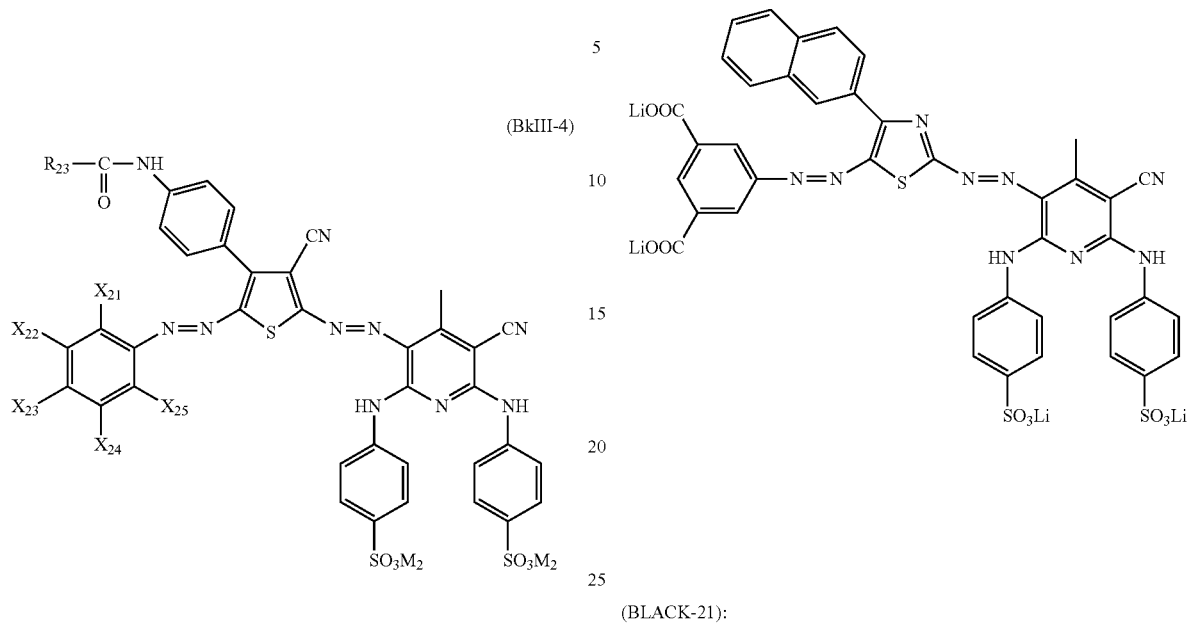

In the general formula (BkIII-4), $R_{23}$ represents a monovalent substituent. $X_{21}$, $X_{22}$, $X_{23}$, $X_{24}$, and $X_{25}$ each independently represent a hydrogen atom or a monovalent substituent. $M_2$s each represents a hydrogen atom or a monovalent counter cation.

Examples of $R_{23}$ and $M_2$ are independently the same as examples of $R_{23}$ and $M_2$ in the foregoing general formula (BkIII-3), and preferred examples are also the same as described there.

The compounds represented by the foregoing general formulae (BkIII-1) to (BkIII-4) preferably show the maximum absorption in the absorption spectrum measured by using water as a solvent at a wavelength (λmax) of from 550 to 700 nm, particularly preferably from 580 nm to 650 nm.

Also, in the invention, the compounds represented by the general formulae (BkIII-1) to (BkIII-4) preferably have at least 3 ionic hydrophilic groups, more preferably from 3 to 6 ionic hydrophilic groups, still more preferably 4 or 5 ionic hydrophilic groups. Presence of such ionic hydrophilic groups exhibits the effect of improving water solubility and storage stability as an aqueous solution of the azo compounds of the invention, satisfying requirement as a water-soluble dye for inkjet recording black ink at a high level and, further, more improving image quality of inkjet print products when used as an ink for inkjet recording.

Also, in the invention, compounds represented by the general formulae (BkIII-1) to (BkIII-4) may be used even when they contain isotopes (e.g., 2H, 3H, 13C, and 15N).

Specific examples of the compounds represented by the foregoing general formulae (BkIII-1) to (BkIII-4) are shown below, but the compounds to be used in the invention are not limited only to the following illustrative compounds.

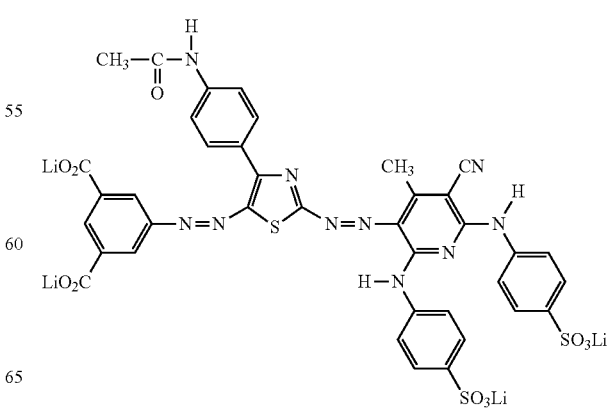

-continued (BLACK-23):

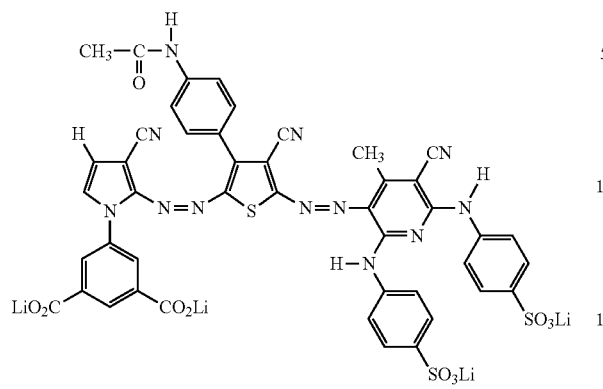

(BLACK-24):

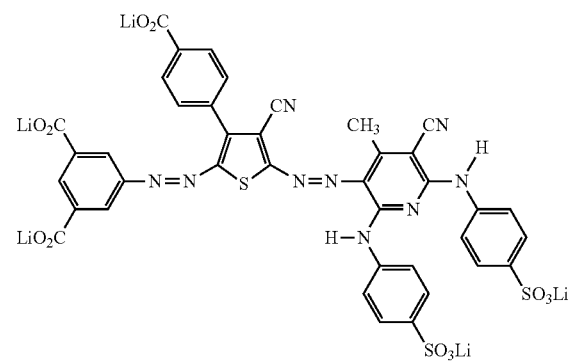

(BLACK-25):

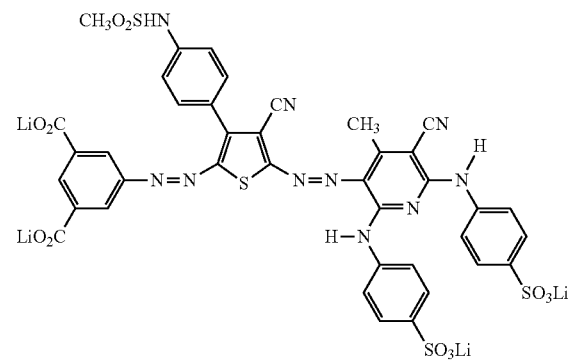

(BLACK-26)

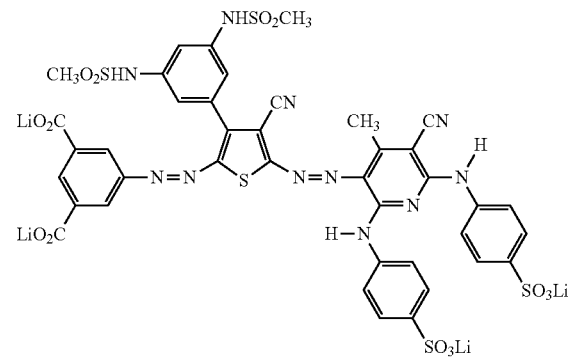

(BLACK-27)

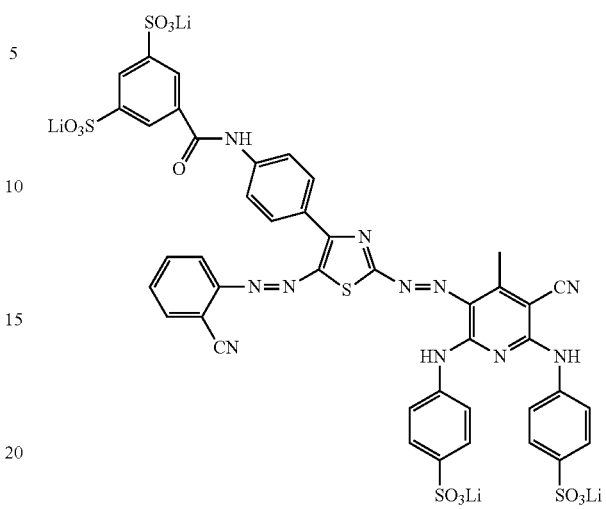

The azo compounds represented by the foregoing general formula (BkIII-1) can be synthesized by coupling reaction between a diazo component and a coupler, and descriptions thereon are given in JP-A-2003-306623 and JP-A-2005-169427.

[Third Coloring Material: General Formula (Y-1)]

Dyes represented by the general formula (Y-1) will be described below.

(Y-1)

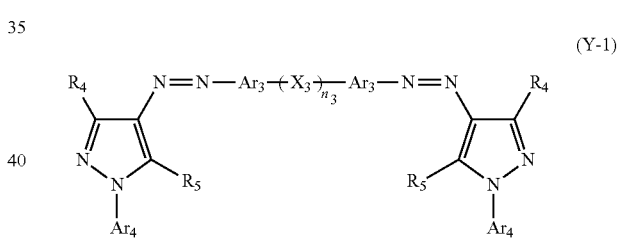

In the general formula (Y-1), $R_4$s each independently represent a monovalent group, $R_5$s each independently represents —$OR_6$ or —$NHR_7$, $R_6$ and $R_7$ each independently represent a hydrogen atom or a monovalent group, $X_3$ represents a divalent linking group, $n_3$ represents 0 or 1, $Ar_3$s each independently represent a divalent heterocyclic group, and $Ar_4$s each independently represent an alkyl group, an aryl group, or a monovalent triazine ring group.

The general formula (Y-1) will be described.

In the general formula (Y-1), $X_3$ represents a divalent linking group. As the divalent linking group represented by $X_3$, there are illustrated an alkylene group (e.g., methylene, ethylene, propylene, butylenes, or pentylene), an alkenylene group (e.g., ethenylene or propenylene), an alkynylene group (e.g., ethynylene or propynylene), an arylene group (e.g., phenylene or naphthylene), a divalent heterocyclic group (e.g., a 1,3,5-triazin-2,4-diyl group, a pyrimidine-2,4-diyl group, or a quinoxaline-2,3-diyl group), —O—, —CO—, —NR— (R being a hydrogen atom, an alkyl group, or an aryl group), —S—, —$SO_2$—, —SO—, and a combination thereof.

The alkylene group, alkenylene group, alkynylene group, arylene group, divalent heterocyclic group, or the alkyl or aryl group represented by R may have a substituent. As examples of the substituent, there are illustrated those groups which have been described hereinbefore in the paragraph on substituent group A, and the substituent is preferably a hydroxyl group, an alkoxy group, a cyano group, a halogen atom, an amino group (optionally in a salt form), or a carboxyl group (optionally in a salt form).

$X_3$ is preferably an alkylene group containing 10 or less carbon atoms, an alkenylene group containing 10 or less carbon atoms, an alkynylene group containing 10 or less carbon atoms, an arylene group containing from 6 to 10 carbon atoms, a divalent heterocyclic group, —O—, —S—, or a combination thereof.

The total number of carbon atoms in the divalent linking group represented by $X_3$ is preferably from 0 to 50, more preferably from 0 to 30, most preferably from 0 to 10.

$n_3$ is 0 or 1, preferably 1.

$Ar_3$ represents a divalent heterocyclic group. As the heterocyclic group, those which contain a 5- or 6-membered ring are preferred, with the ring being optionally further condensed with other ring. Also, the ring may be aromatic heterocyclic ring or non-aromatic heterocyclic ring. Specific examples of the ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, etc.

Of these, an aromatic heterocyclic group is preferred, pyridine, pyrazine, pyrimidine, pyridazine, triazine, pyrazole, imidazole, benzimidazole, triazole, thiazole, benzothiazole, isothiazole, benzisothiazole, and thiadiazole are preferred, and thiadiazole is most preferred.

The divalent heterocyclic group which $A_2$ represents may have a substituent, and examples of the substituent include those groups which belong to the substituent group J.

$Ar_4$ represents an alkyl group, an aryl group, or a monovalent triazine ring group. The alkyl or aryl group which $Ar_4$ represents is the same as the alkyl group and the aryl group of the substituent group J, and preferred examples thereof are also the same as them.

$Ar_4$ is preferably an aryl group or a monovalent triazine ring group, preferably an aryl group, more preferably a phenyl group.

The alkyl group, aryl group, or monovalent triazine ring group represented by $Ar_4$ may further have a substituent and, as examples of such substituent, there are illustrated those groups which belong to the aforesaid substituent group J, with a sulfo group or a carboxyl group being particularly preferred.

In the general formula (Y-1), each $R_4$, each $R_5$, each $Ar_4$, and each $Ar_3$ may be the same as or different from every other $R_4$, $R_5$, $Ar_4$, and $Ar_3$, respectively.

The compounds of the invention represented by the general formula (Y-1) are used as yellow dyes. Therefore, in view of increasing solubility, it is preferred for $R_4$, $R_6$, or $R_7$ to be an ionic hydrophilic group, or for $R_4$, $R_6$, $R_7$, $Ar_4$, or $Ar_3$ to have an ionic hydrophilic group as a substituent.

Here, the ionic hydrophilic group includes a sulfo group, a carboxyl group, a phosphono group, and a quaternary ammonium group. As the ionic hydrophilic group, a carboxyl group, a phosphono group, and a sulfo group are preferred, with a carboxyl group and a sulfo group being particularly preferred. The carboxyl group, phosphono group, and sulfo group may be in a salt form, and examples of the counter ion which forms such salt include ammonium ion, an alkali metal ion (e.g., lithium ion, sodium ion, or potassium ion) and an organic cation (e.g., tetramethylammonium ion, tetramethylguanidium ion, or tetramethylphosphonium ion). Of the counter ions, an alkali metal salt is preferred. Of the alkali metal salts, potassium ion, sodium ion, and lithium ion are preferred, with sodium ion and potassium ion being most preferred.

In the general formula (Y-1), $Ar_4$ particularly preferably has an ionic hydrophilic group.

Specific examples of the coloring material represented by the general formula (Y-1) will be shown below, but the invention is not limited only to them. In the specific examples, Et means ethyl, and Ph means phenyl.

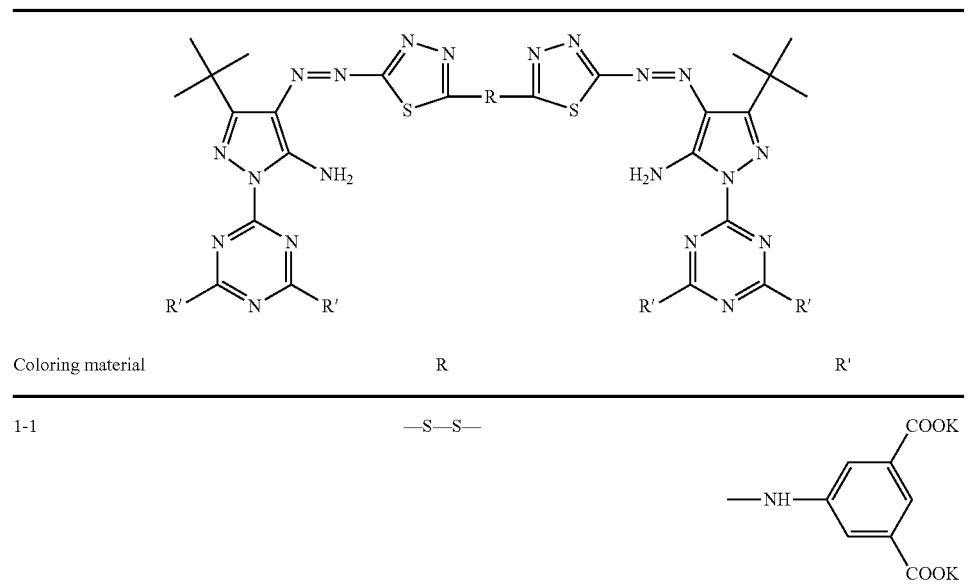

| Coloring material | R | R' |
|---|---|---|
| 1-1 | —S—S— | —NH—⌬(COOK)(COOK) |

-continued
| | | |
|---|---|---|
| 1-2 | —SCH₂—CH₂S— | 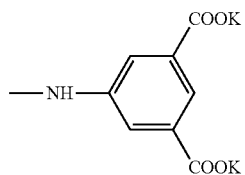 |
| 1-3 | —CH₂—CH₂— | 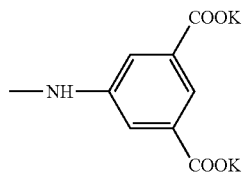 |
| 1-4 | —C₂H₄—C₂H₄— | 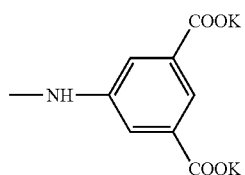 |
| 1-5 | —SCH₂—CH₂S— | —NHC₄H₉ |
| 1-6 | —SCH₂—CH₂S— | —N(C₄H₉)₂ |
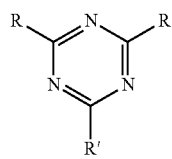
| Coloring material | R | R' |
|---|---|---|
| 1-7 | 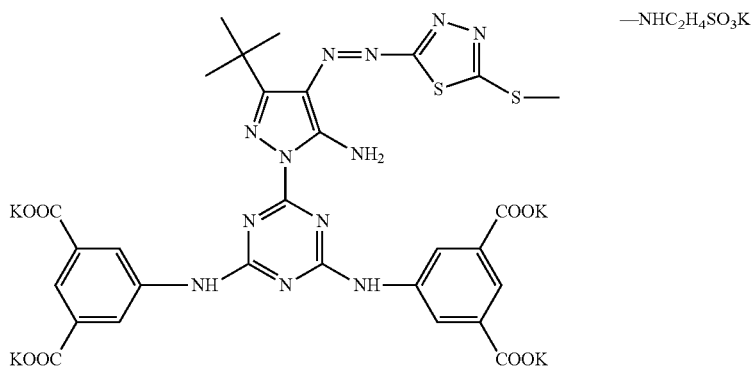 | —NHC₂H₄SO₃K |
| 1-8 | 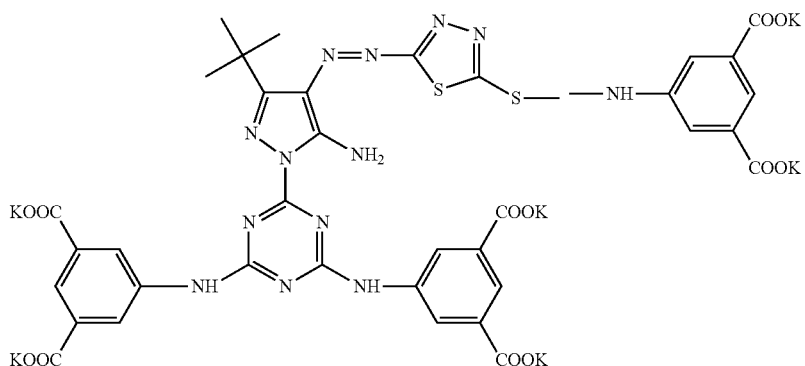 | |

-continued
1-9 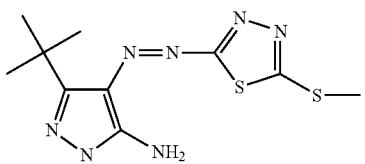 Cl
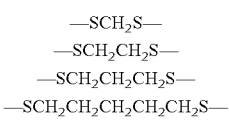
| Coloring material | R |
|---|---|
| 1-10 | —SCH₂S— |
| 1-11 | —SCH₂CH₂S— |
| 1-12 | —SCH₂CH₂CH₂S— |
| 1-13 | —SCH₂CH₂CH₂CH₂CH₂S— |
| 1-14 |  |
| 1-15 | 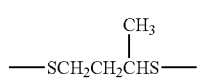 |
| 1-16 | —SC₂H₄OC₂H₄S— |
| 1-17 | —SC₂H₄OC₂H₄OC₂H₄S— |
| 1-18 | 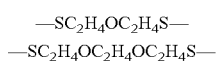 |
| 1-19 |  |
| 1-20 | 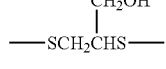 |
| 1-21 |  |
| 1-22 | 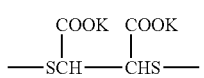 |

-continued
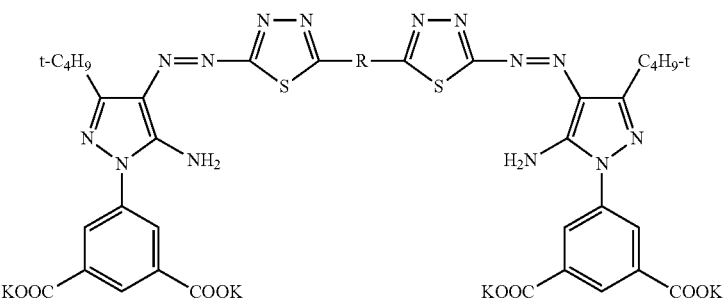
| Coloring material | R |
|---|---|
| 1-23 | 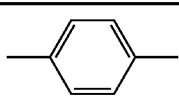 |
| 1-24 | 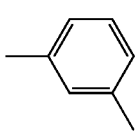 |
| 1-25 |  |
| 1-26 | 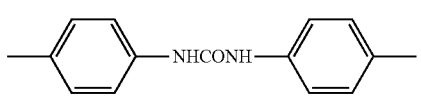 |
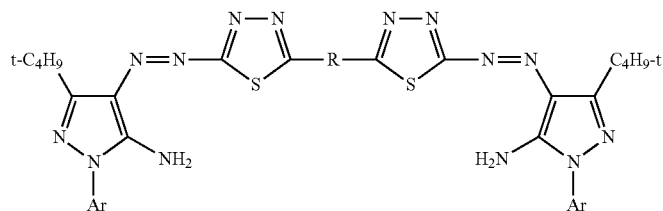
| Coloring material | Ar | R |
|---|---|---|
| 1-27 | 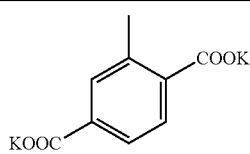 | —SC$_3$H$_6$S— |
| 1-28 | 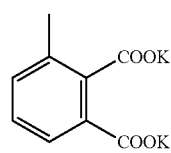 | —SC$_3$H$_6$S— |
| 1-29 | 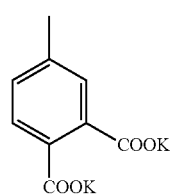 | —SC$_3$H$_6$S— |

-continued
| | | |
|---|---|---|
| 1-30 | 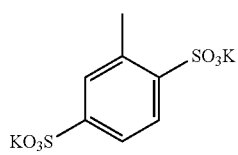 | —SC₃H₆S— |
| 1-31 | 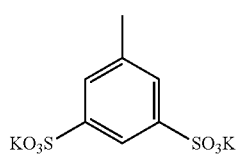 | —SC₃H₆S— |
| 1-32 | 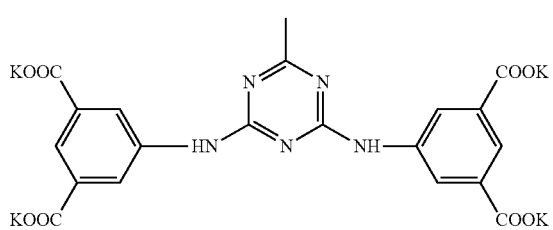 | —SC₃H₆S— |
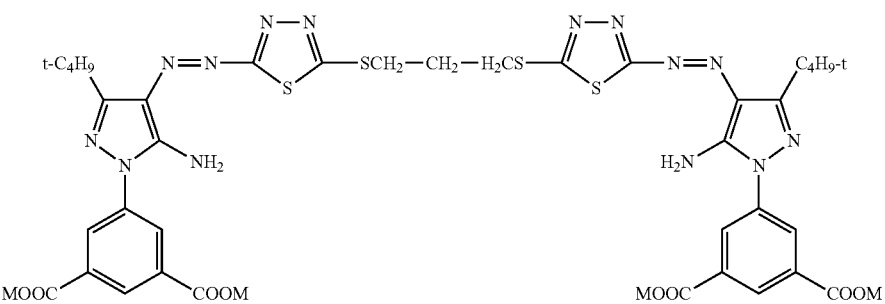
| Coloring material | M |
|---|---|
| 1-33 | Na |
| 1-34 | Li |
| 1-35 | NH₄ |
| 1-36 | HN(Et)₃ |
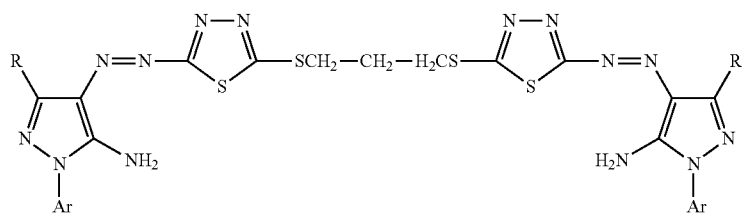
| Coloring material | R | Ar |
|---|---|---|
| 1-37 | OEt | 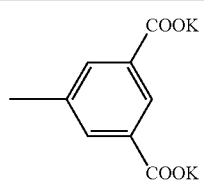 |

-continued
| | | |
|---|---|---|
| 1-38 | Ph | 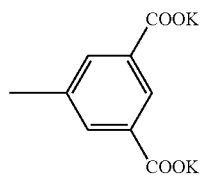 |
| 1-39 | t-C$_4$H$_9$ | C$_3$H$_6$SO$_3$K |
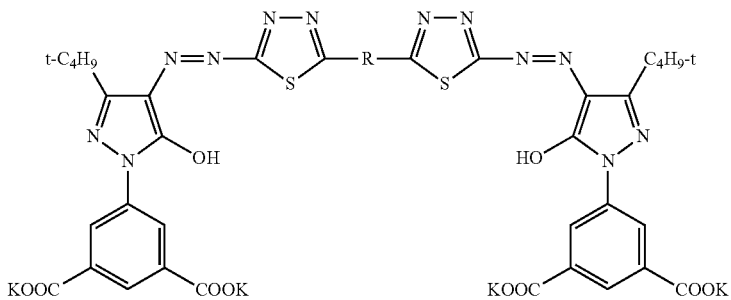
| Coloring material | R |
|---|---|
| 1-40 | —SCH$_2$CH$_2$S— |
| 1-41 | —SCH$_2$CH$_2$CH$_2$S— |
| 1-42 | —SCH$_2$CH$_2$CH$_2$CH$_2$CH$_2$S— |
| 1-43 | 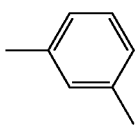 |
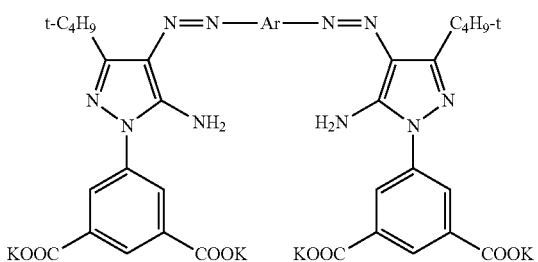
| Coloring material | Ar |
|---|---|
| 1-44 |  |
| 1-45 | 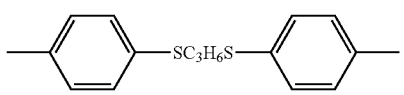 |
| 1-46 | 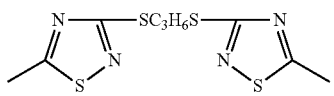 |

-continued

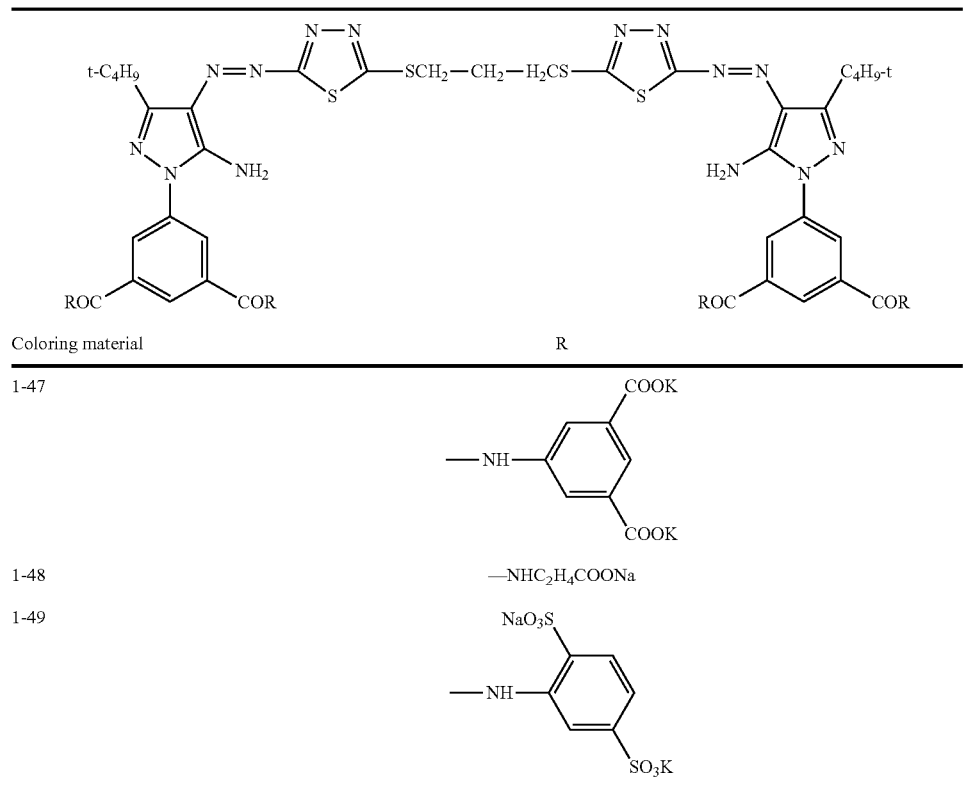

| Coloring material | R |
|---|---|
| 1-47 | —NH—⟨benzene with two COOK groups⟩ |
| 1-48 | —NHC$_2$H$_4$COONa |
| 1-49 | —NH—⟨benzene with NaO$_3$S and SO$_3$K groups⟩ |

The compounds of the invention represented by the general formula (Y-1) can be synthesized according to the process described in JP-A-2004-83903.

In view of color reproducibility, the compounds represented by the general formula (Y-1) preferably show the maximum absorption in the absorption spectrum measured by using water as a solvent at a wavelength (λmax) of from 380 to 490 nm, more preferably from 400 to 480 nm, particularly preferably from 420 to 460 nm

[Verification Method of Coloring Material]

In order to verify whether the coloring materials used in the present invention are contained in an ink or not, the following items (1) to (3) are used for the verification using high performance liquid chromatography (HPLC).

(1) Retention time of peak;
(2) Maximum absorption wavelength on the peak of (1);
(3) M/Z (posi) and M/Z (nega) of mass spectrum on the peak of (1).

Analytic conditions of the high performance liquid chromatography are as follows. First, a liquid (ink) diluted to about 1/1,000 with pure water is prepared and uses as a sample for measurement. Analysis by the high performance liquid chromatography is conducted under the following conditions to measure the retention time and maximum absorption wavelength of a peak.

Column: SunFire C18 (manufactured by Nihon Waters Co.), 2.1 mm×150 mm
Column temperature: 40° C.
Flow rate. 0.2 mL/min
PDA: 200 nm to 700 nm
Mobile phase and gradient conditions: Table 1

TABLE 1

Mobile phase and gradient conditions

| | 0 to 5 min | 5 to 24 min | 24 to 31 min | 31 to 45 min |
|---|---|---|---|---|
| A: Pure water | 85% | 85→45% | 45→0% | 0% |
| B: Methanol | 10% | 10→59% | 50→95% | 95% |
| C: 0.2 mol/L aqueous solution of ammonium acetate | 5% | 5% | 5% | 5% |

[Content of Coloring Material]

The content of the first coloring material (compound of the general formula (BkI-1)), the content of the second coloring material (compound of the general formula (BkII-1) or (BkIII-1)), and the content of the third coloring material (compound of the general formula (Y-1)) in the ink are preferably set as described below in view of color tone and light fastness.

The content (% by weight) of the second coloring material in the ink with respect to the total content (% by weight) of all the coloring materials in the ink, i.e., [second coloring material/all coloring materials in the ink]×100, is preferably from 45% by weight to 75% by weight. When the value [first coloring material/all coloring materials in the ink]×100 is within the above-described range, such an ink provides an image (initial image) having a gradation property with color tone preferable for black ink.

The content (% by weight) of the third coloring material in the ink with respect to the total content (% by weight) of all the coloring materials in the ink, i.e., [third coloring material/all coloring materials in the ink]×100, is preferably from 20% by weight to 45% by weight. Such an ink provides a gradation image which show more favorable color tone as a black ink initially and after light fastness test, with more suppressing the bronzing phenomenon.

The content (% by weight) of the first coloring material in the ink with respect to the total content (% by weight) of all the coloring materials in the ink, i.e., [first coloring material/ all coloring materials in the ink]×100, is preferably 20% by weight or less. When the value [first coloring material/all coloring materials in the ink]×100 is within the above-described range, such an ink provides an image (initial image and after the light fastness test) having a gradation property with color tone favorable for black ink. Further, the value [first coloring material/all coloring materials in the ink]×100 is preferably 10% by weight or less.

In the present invention, an ink satisfying the following conditions as to the contents of the respective coloring materials is particularly preferred. First, the content (% by weight) of the second coloring material in the ink is preferably 60% by weight or more based on the total content (by weight) of all the coloring materials in the ink. Second, the content (% by weight) of the third coloring material is preferably 1 time, more preferably from 1.5 times to 2.5 times, in terms of weight ratio to the content (% by weight) of the first coloring material.

The total content (% by weight) of the first, second and third coloring materials in the ink is preferably form 0.1% by weight to 15.0% by weight based on the total weight of the ink. The total content (% by weight) of these coloring materials is more preferably from 0.5% by weight to 10.0% by weight. When the total content is within the above-described range, the resulting ink can provide sufficient color formation and sufficient ink jet properties such as sticking resistance.

Additionally, the color tone preferable for black ink, i.e., the color tone that is neutral and provides a preferable image, in the invention specifically means the following. With respect to an image having a gradation property formed with a black ink by gradually lowering the recording duty from 100%, $a^*$ and $b^*$ in the $L^*a^*b^*$ color space prescribed by CIE (International Commission on Illumination) are measured. When the values of $a^*$ and $b^*$ in at least a portion where the recording duty is 100% are $-5 \leq a^* \leq 5$ and $-5 \leq b^* \leq 5$, respectively, such an ink is defined as an ink having a color tone preferable for black ink in the invention. Further, an ink satisfying the following provisions is defined as an ink having a color tone more preferable for black ink. Namely, it is preferable that the values of $a^*$ and $b^*$ in the portion where the recording duty is 100% are and $-5 \leq b^* \leq 5$, respectively, and the values of $a^*$ and $b^*$ for each gradation formed by lowering the recording duty are $-10 \leq a^* \leq 10$ and $-10 \leq b^* \leq 10$, respectively. Additionally, values of $a^*$ and $b^*$ can be measured by means of, for example, a spectrophotometer (trade name: Spectrolino; manufactured by Gretag Macbeth Co.). Needless to say, the present invention is not limited thereto.

(Aqueous Medium)

An aqueous solvent that is water or a mixed solvent of water and a water-soluble organic solvent may be used in the ink of the invention. Deionized water (ion-exchanged water) is preferably used as the water. The content (% by weight) of water in the ink is preferably from 10.0% by weight to 90.0% by weight based on the total weight of the ink.

No particular limitation is imposed on the water-soluble organic solvent so far as the solvent is soluble in water, and alcohols, polyhydric alcohols, polyglycols, glycol ethers, nitrogen-containing polar solvents, and sulfur-containing polar solvents may be used. The content (% by weight) of the water-soluble organic solvent in the ink is preferably from 5.0% by weight to 90.0% by weight, more favorably from 10.0% by weight to 50.0% by weight based on the total weight of the ink. If the content of the water-soluble organic solvent is less than the above-described range, reliability such as ejection stability may not be achieved in some cases when the resulting ink is used in an ink jet recording apparatus. Also, if the content of the water-soluble organic solvent is more than the above-described range, the viscosity of the resulting ink may increase in some cases to cause feeding failure of the ink.

Specific examples of usable water-soluble organic solvents include: alkyl alcohols having 1 to 4 carbon atoms, such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol, and thiodiglycol; alkylene glycols the alkylene group of which has 2 to 6 carbon atoms, such as 1,5-pentanediol, 1,6-hexanediol, 2-methyl-1,3-propanediol, 3-methyl-1,5-pentanediol, and 1,2,6-hexanetriol; bis(2-hydroxyethyl)-sulfone; lower alkyl ether acetates such as polyethylene glycol monomethyl ether acetate; alkyl ethers of polyhydric alcohols, such as ethylene glycol monomethyl (or ethyl)ether, diethylene glycol methyl (or ethyl)ether, and triethylene glycol monomethyl (or ethyl)ether; N-methyl-2-pyrrolidone; 2-pyrrolidone; and 1,3-dimethyl-2-imidazolidinone. Needless to say, the invention is not limited to these solvents. One or more of these water-soluble organic solvents may be used as needed.

(Other Additives)

The ink of the invention may contain water-soluble organic compounds being solid at ordinary temperature, such as polyhydric alcohols such as trimethylolpropane and trimethylolethane, and urea derivatives such as ethyleneurea in addition to the above-described components as needed. In addition, the ink of the invention may contain various additives such as surfactants (e.g., Surfynol), pH-adjusting agents, rust preventives, preservatives, antifungal agents, antioxidants, anti-reducing agents, evaporation accelerators, chelating agents, and water-soluble polymers as needed.

(Other Inks)

In order to form a full-color image, the ink of the invention may be used in combination with inks having other color tone than the ink of the invention. The ink of the invention is preferably used in combination with at least one ink selected from, for example, black, cyan, magenta, yellow, red, green, and blue inks. Also, the so-called light color inks respectively having substantially the same color tones as those inks may also be further used in combination. Coloring materials used in these inks or light color inks may be publicly known dyes or newly synthesized coloring materials.

EXAMPLES

The invention will be described in more detail by reference to Examples and Comparative Examples, but the invention is not limited only to the following Examples as long as the gist of the invention is not exceeded. Additionally, in the following descriptions, "parts" and "%" are based on weight, unless otherwise specified.

Structures of the compounds used in Examples and Comparative Examples are shown below.

[Ka 39]
(Coloring material 1)
Dye 6
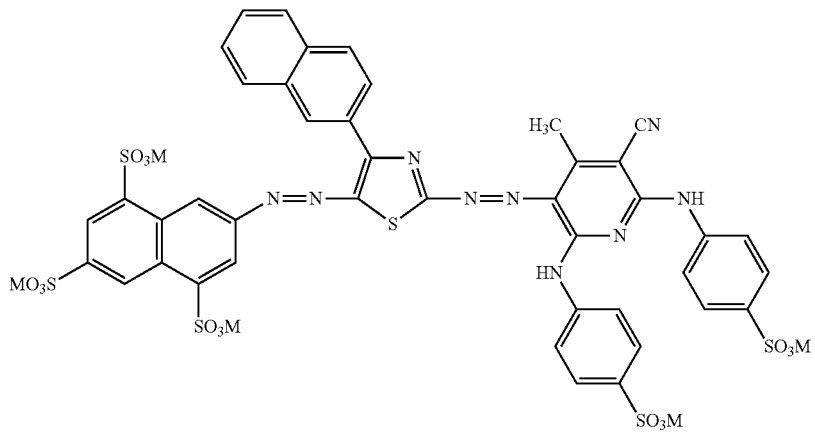
(Illustrative compound I-5 described in JP-A-2009-30023)
(Comparative coloring material)
Dye 7
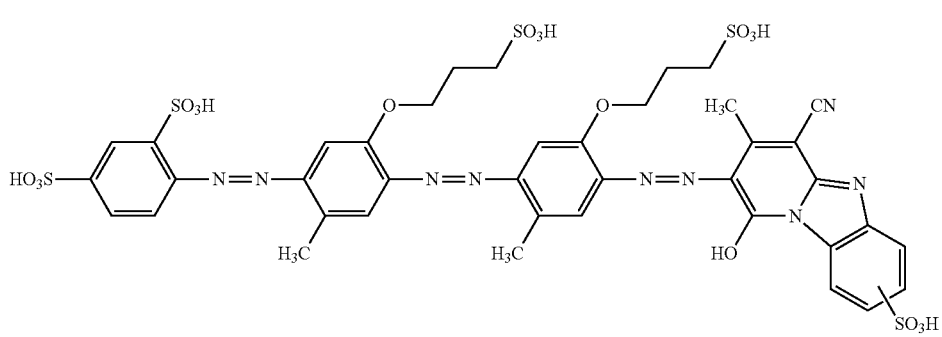
(Illustrative compound III-17 described in JP-A-2009-30023)
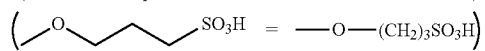
Dye 8
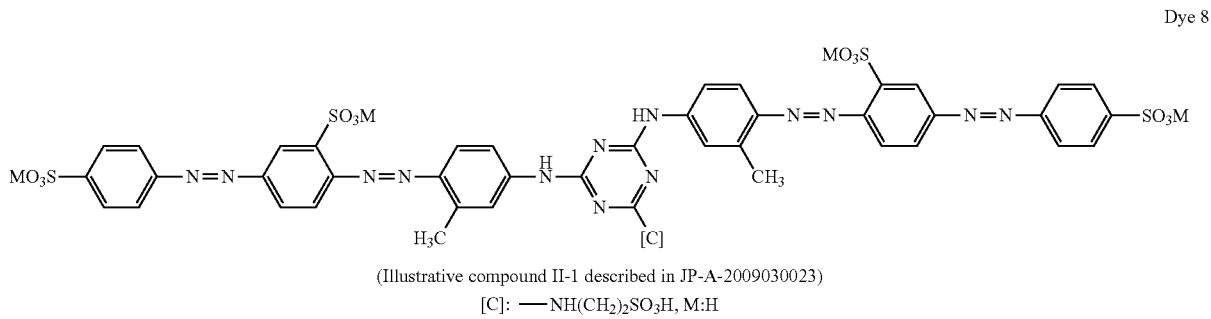
(Illustrative compound II-1 described in JP-A-2009030023)
[C]: —NH(CH$_2$)$_2$SO$_3$H, M:H
Dye 9
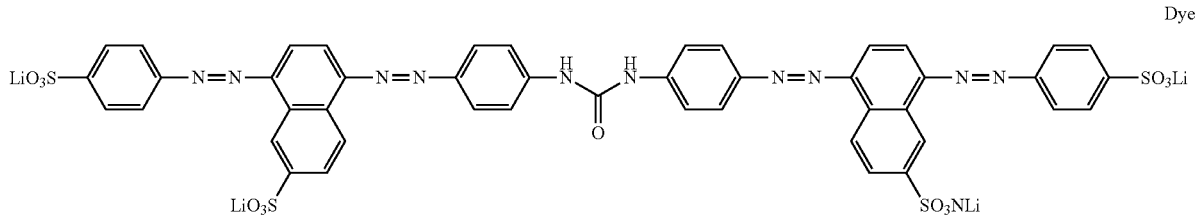

F
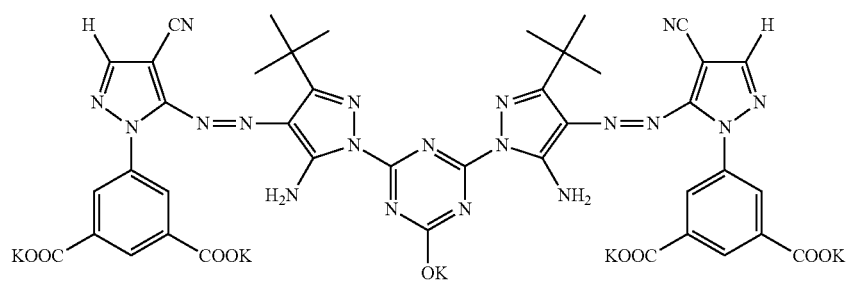
(Coloring material 2)
B1
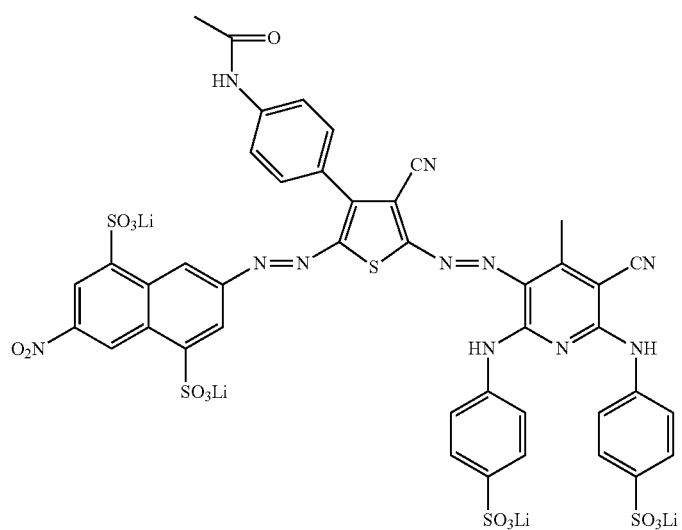
B2
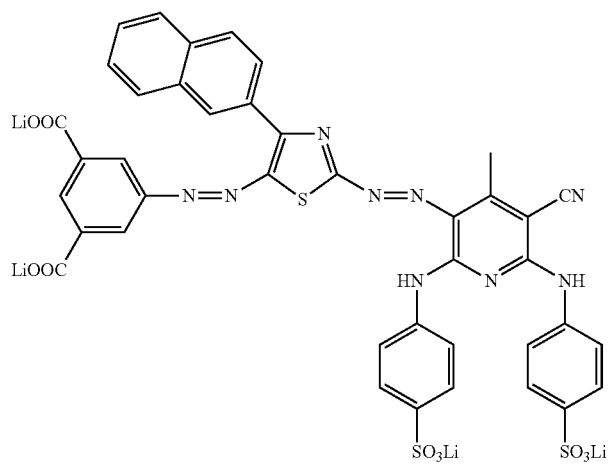

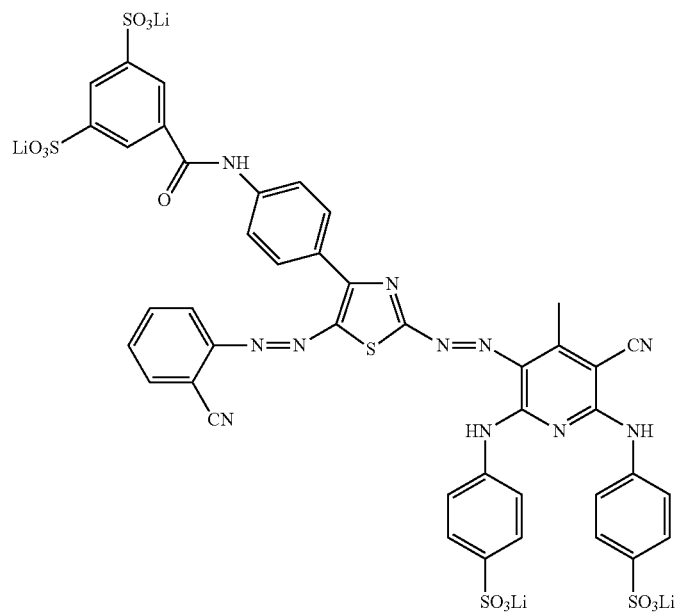
B3
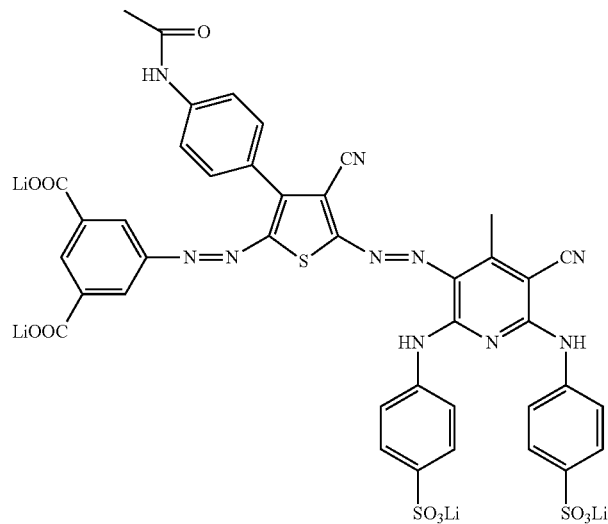
B4
(Coloring material 3)
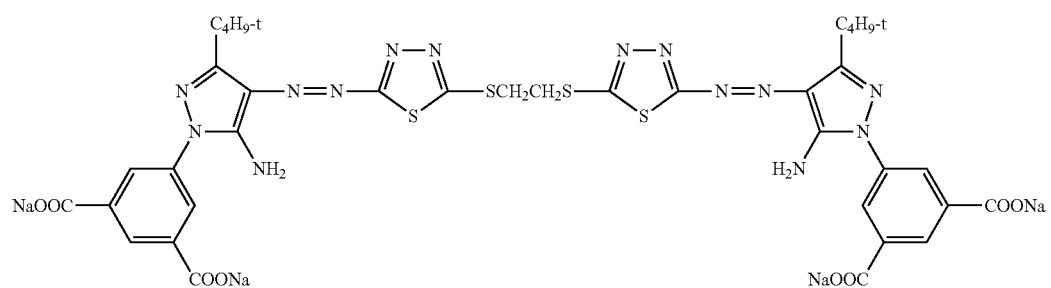
Y1

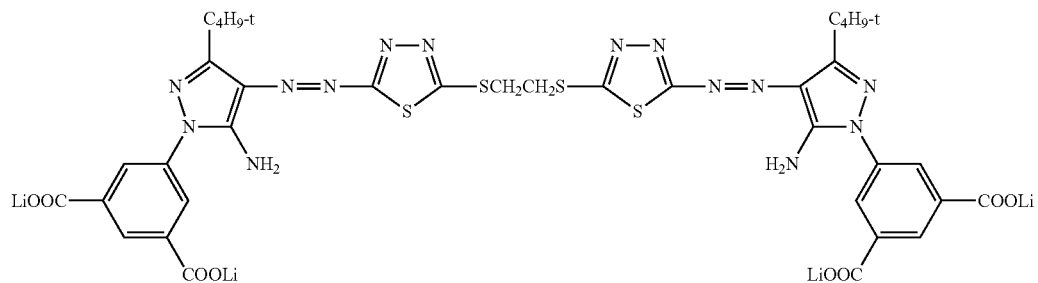

Y2

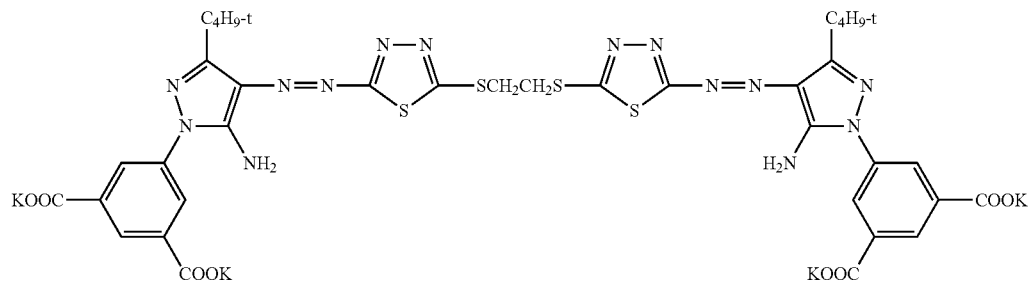

Y3

Additionally, dyes 6 to 8, which are specific examples of the first coloring materials, are synthesized according to the process described in JP-A-2009-30023. Incidentally, M shown in the dye 6 is Li.

$Y_1$ to $Y_3$, which are specific examples of the third coloring materials, are synthesized according to the process described in JP-A-2004-83903.

[Synthesis of B1 to B4 which are Specific Examples of the Second Coloring Materials]

Synthesis Example 1

Synthesis scheme of B1 (BLACK-11) is shown below.

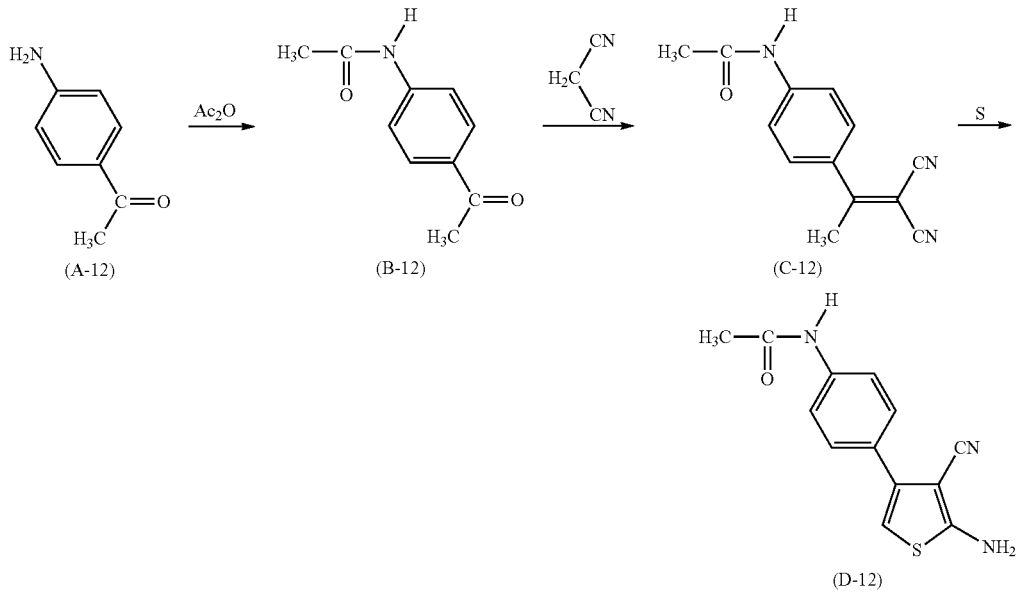

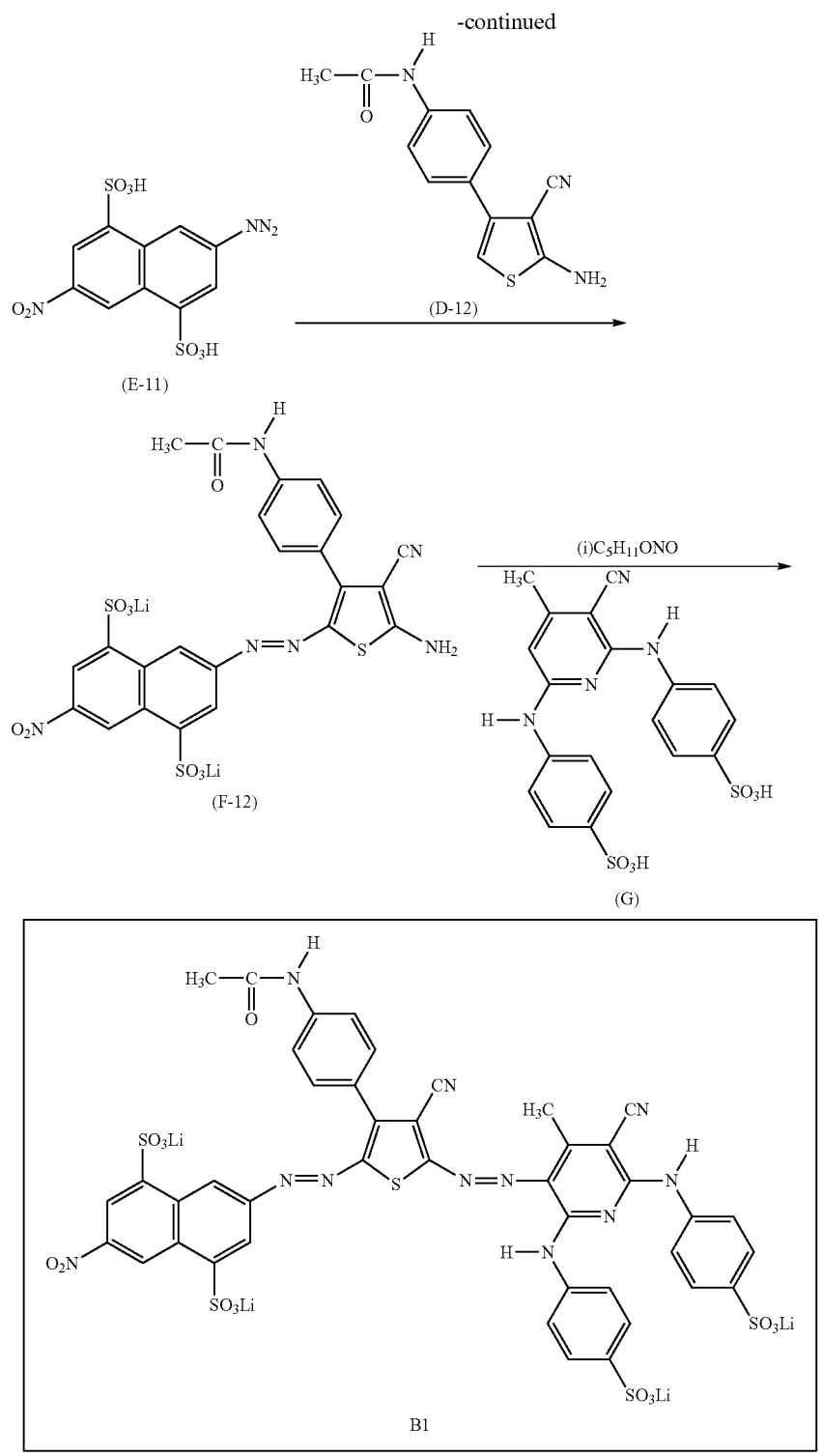

(1) Synthesis of Intermediate (B-12):

20.3 g of p-aminoacetophenone (A-12; product of Tokyo Chemical Industry Co., Ltd.) is added to 150 mL of acetonitrile, and the mixture is stirred at room temperature to completely dissolve. Subsequently, 13.4 mL of pyridine is added thereto, and the internal temperature is kept at 4° C. in an ice bath. 11.8 g of acetic anhydride is dropwise added thereto, and the mixture is stirred for 15 minutes at an internal temperature of 4° C. 300 mL of water is added to the reaction solution, and then 5 mL of 12N hydrochloric acid is added thereto, followed by collecting formed crystals by filtration. The crystals are washed with 100 mL of water, and then dried at 80° C. to obtain 18.6 g of white crystals of an intermediate (B-12).

(2) Synthesis of Intermediate (C-12):

17.7 g of the intermediate (B-12), 7.3 g of malononitrile, 4.6 mL of acetic acid, 1.5 g of ammonium acetate, and 20 mL of toluene are placed in a 100-mL 3-neck flask equipped with a Dean-Stark trap, and the mixture is refluxed in a 125° C. oil bath. After stirring for 1 hour, 4.6 mL of acetic acid and 1.5 g of ammonium acetate are additionally added thereto, followed by stirring for 2 hours under reflux condition. After allowing the mixture to cool, 30 mL of methanol is added thereto, and the resulting mixture is stirred for 30 minutes in an ice bath. Crystals formed are collected by filtration, washed with 20 mL of cold methanol, and then dried. Thus, 12.1 g of white crystals of an intermediate (C-12) are obtained.

(3) Synthesis of Intermediate (D-12):

1.5 g of sulfur is added to a solution of 11.3 g of the intermediate (C-12) in 20 mL of ethanol, and then 6.6 mL of triethylamine is dropwise added thereto. After stirring the mixture for 30 minutes at an internal temperature of 50° C., 500 mL of ethyl acetate and 300 mL of water are added thereto and, after shaking the mixture, liquid-liquid separation is conducted. 200 mL of an aqueous solution of sodium chloride is added to the organic layer and, after shaking, liquid-liquid separation is conducted. Magnesium sulfate is added to the organic layer to dry. After distilling off the organic solvent, 50 mL of isopropanol is added thereto, and the resulting suspension is stirred, followed by collecting crystals. Drying of the crystals at 80° C. gives 8.1 g of white crystals of an intermediate (D-12).

(4) Synthesis of Intermediate (F-12):

6.0 g of an intermediate (E-11) is added to 60 mL of water, and the mixture is stirred at room temperature. After dropwise adding thereto 5.6 mL of 12N hydrochloric acid, the mixture is cooled to an internal temperature of 4° C. 4 mL of an aqueous solution containing 1.3 g of sodium nitrite is dropwise added to the mixture at an internal temperature of 5° C. or less. After stirring the mixture for 2 hours at an internal temperature of 5° C. or less, 0.1 g of urea is added thereto, followed by stirring for 15 minutes to obtain a diazoium solution.

Separately, 3.4 g of the intermediate (D-12) and 12.0 g of lithium acetate are dissolved in a mixture of 90 mL of methanol and 10 mL of dimethylacetamide and, after cooling the mixture to an internal temperature of 4° C., the aforesaid diazonium solution is dropwise added thereto for 15 minutes with keeping the internal temperature at 5° C. or less. After stirring the resulting mixture for 1.5 hours at an internal temperature of 4° C. or less, 20.0 g of lithium chloride is added thereto, and 75 mL of acetonitrile is dropwise added thereto. Crystals thus formed are collected by filtration, and washed with acetonitrile. The isolated crystals are washed in a suspension state using 75 mL of isopropyl alcohol at an internal temperature of 50° C. Crystals thus washed are collected by filtration, and washed with isopropyl alcohol. Drying of the crystals at 80° C. gives 6.4 g of brown crystals of an intermediate (F-12).

(5) Synthesis of B1:

A solution composed of 5.0 g of the intermediate (F-12), 3.7 g of (G), and 50 mL of water is adjusted to a pH of 2 or less with a 12N hydrochloric acid aqueous solution, and 1.2 g of isoamyl nitrite is dropwise added thereto at an internal temperature of 35 to 40° C. After stirring the resulting mixture for 3 hours at an internal temperature of 40° C., 50.0 g of lithium chloride is added thereto, followed by cooling to an internal temperature of 25° C. Crystals thus formed are collected by filtration, and washed with 150 mL of isopropyl alcohol. The isolated crystals are added to 200 mL of methanol and, after increasing the internal temperature to 40° C., 800 mL of acetonitrile is dropwise added thereto. After the dropwise addition, the mixture is stirred for 15 minutes, and then cooled to an internal temperature of 25° C. Crystals thus formed are collected by filtration, and then added to 150 mL of water, followed by dropwise adding thereto 450 mL of isopropyl alcohol at room temperature. Crystals formed are collected by filtration, and then added to 50 mL of water. A 4M lithium hydroxide aqueous solution is added thereto till pH of the mixture becomes 8.3. 150 mL of isopropyl alcohol is dropwise added to this solution, and crystals precipitated are collected by filtration. The crystals are washed with 50 mL of isoprpyl alcohol, and then dried at 80° C. to obtain 4.3 g of black crystals of B1.

Synthesis Example 2

Synthesis scheme of B2 (BLACK-13) is shown below.

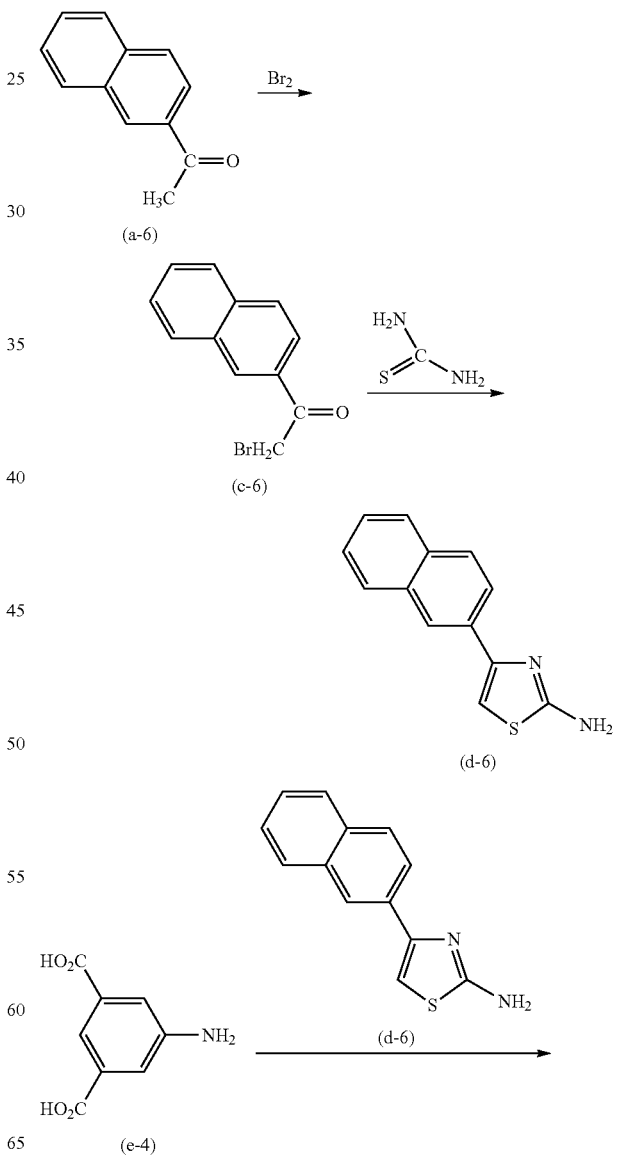

-continued

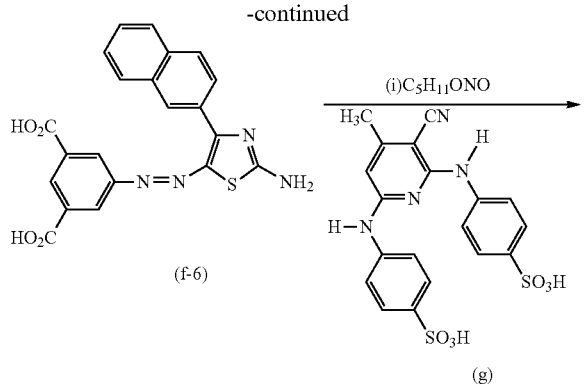
(f-6)

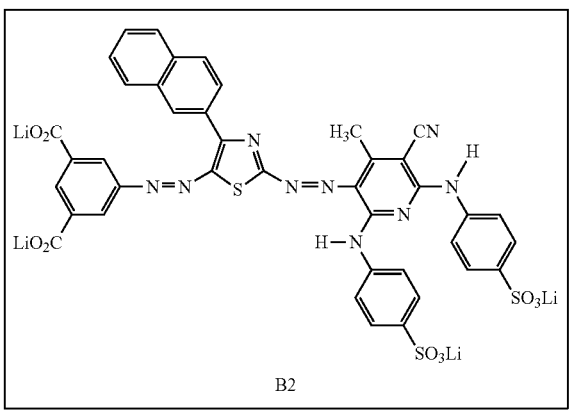
B2

(1) Synthesis of Intermediate (c-6):

A solution of 12.7 g of acetonaphthone and 50 mL of acetic acid are stirred at an internal temperature of 15° C., and 4.2 mL of bromine is dropwise added thereto. After increasing the temperature to room temperature, the mixture is stirred for 1 hour. The reaction mixture is poured onto 200 g of ice water, and crystals formed are collected by filtration. The crystals are washed with 50 mL of water to obtain 22.5 g of a wet cake of an intermediate (c-6).

(2) Synthesis of Intermediate (d-6):

22.5 g of the wet cake of the intermediate (c-6) is suspended in 110 mL of water, and 5.7 g of thiourea is added thereto. After stirring for 2 hours at an internal temperature of 95° C., the mixture is cooled to room temperature. After neutralizing the reaction solution with 25% aqueous ammonia, crystals formed are collected by filtration, and washed with 50 mL of water. The crystals are suspended in a mixture of 10 mL of methanol and 10 mL of ethanol, and the resulting mixture is stirred for 30 minutes under reflux. After cooling to an internal temperature of 15° C., the crystals formed are collected by filtration to obtain 5.4 g of white crystals of an intermediate (d-6).

(3) Synthesis of Intermediate (f-6)

4.2 g of 5-aminoisophthalic acid (e-4) is suspended in 23 mL of water, and 6.5 mL of 12N hydrochloric acid is dropwise added thereto at room temperature. After cooling the mixture to an internal temperature of 4° C. in an ice bath, 5.4 mL of an aqueous solution containing 1.8 g of sodium nitrite is dropwise added thereto with keeping the internal temperature at 0 to 4° C., followed by stirring for 2 hours at an internal temperature of 5° C. or less. Subsequently, 0.1 g of urea is added thereto and, successively, the resulting mixture is stirred for 15 minutes at an internal temperature of 5° C. to obtain a diazonium solution.

Separately, 4.5 g of the intermediate (d-6) and 10.0 g of lithium acetate are dissolved in a mixture of 50 mL of methanol and 14 mL of dimethylacetamide and, after cooling the mixture to an internal temperature of 4° C., the diazonium solution is dropwise added thereto in 15 minutes at an internal temperature of 5° C. or less. After stirring the mixture for 1.5 hours with keeping the internal temperature at 5° C. or less, 60 mL of isopropyl alcohol is dropwise added thereto. Crystals thus formed are collected by filtration, and washed with 100 mL of isopropyl alcohol. The crystals are dissolved in 20 mL of water, and 60 mL of isopropyl alcohol is dropwise added thereto at an internal temperature of 50° C. Crystals formed are collected by filtration, washed with 50 mL of isopropyl alcohol, and then dried to obtain 7.8 g of brown crystals of an intermediate (f-6).

(5) Synthesis of B2

7.0 g of the intermediate (f-6) and 7.7 g of an intermediate (g) are added to 32 mL of dimethylacetamide at an internal temperature of 40° C., and 3.0 g of isoamyl nitrite is dropwise added thereto. After stirring the mixture for 4 hours at an internal temperature of 40° C., 32 mL of isopropyl alcohol is added thereto to cool the mixture to an internal temperature of 25° C. Crystals precipitated are collected by filtration, and washed with 50 mL of isopropyl alcohol. The thus-obtained crystals are added to 56 mL of water at an internal temperature of 40° C. and, after dropwise adding thereto 224 mL of isopropyl alcohol in 20 minutes, the resulting mixture is stirred for 15 minutes. After cooling the mixture to an internal temperature of 25° C., crystals formed are collected by filtration, and the thus-obtained crystals are added to 19 mL of water, followed by stirring. A 4M lithium hydroxide aqueous solution is added to the mixture till the pH thereof becomes 8.3. Then, 80 mL of isopropyl alcohol is dropwise added thereto. Crystals precipitated are collected by filtration, and washed with 30 mL of isopropyl alcohol. The crystals are dried at 80° C. to isolate 1.1 g of black crystals of (B2).

Synthesis Example 3

Synthesis scheme of B3 (BLACK-27) is shown below.

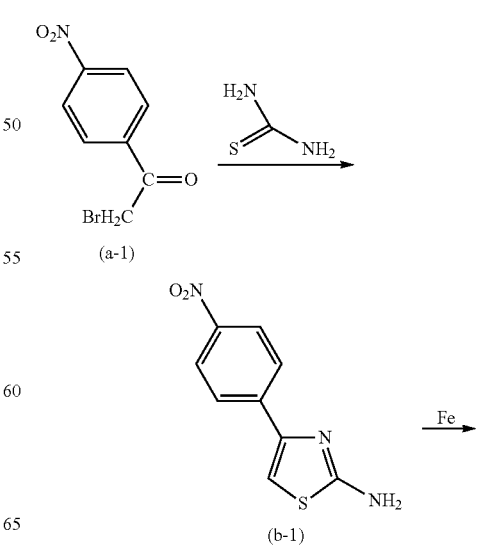

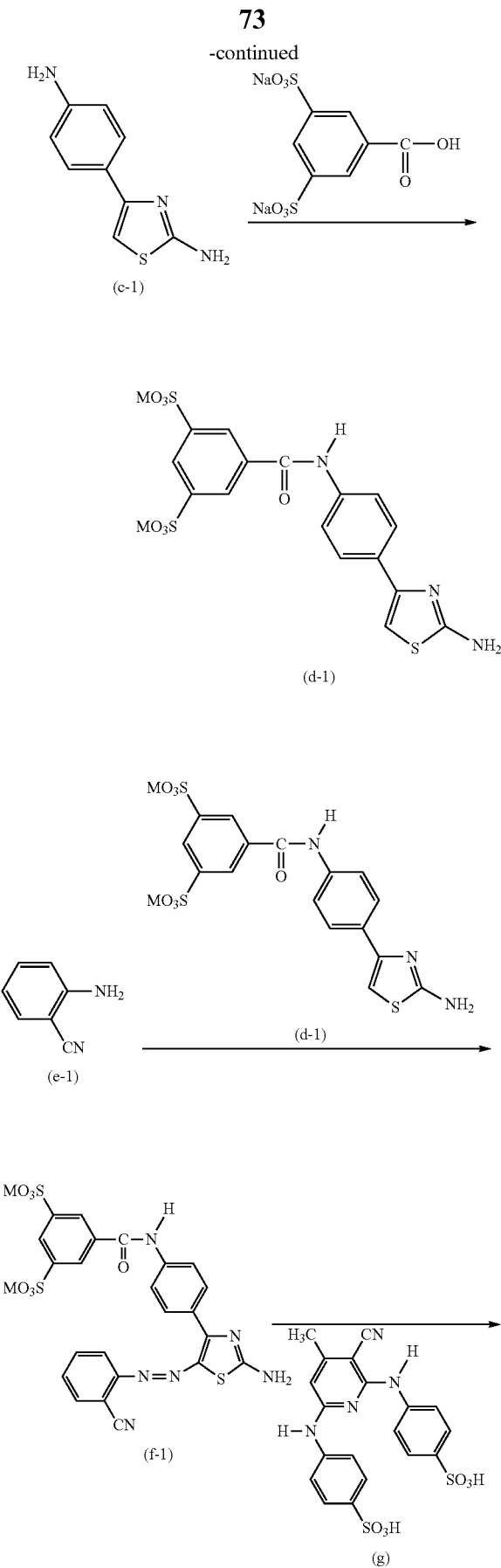

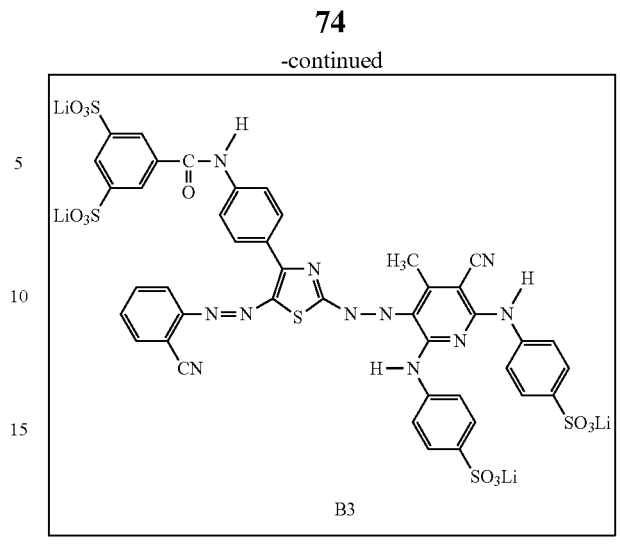

(1) Synthesis of Intermediate (b-1):

40.0 g of 2-bromo-4'-nitroacetophenone (a-1; product of Wako Pure Chemical Industries, Ltd.) is added to 120 ml of an aqueous solution of 12.5 g of thiourea, and the mixture is stirred for 5 hours at 70° C. Crystals thus formed are collected by filtration, and 400 ml of a 5% sodium hydroxide aqueous solution is added thereto. After stirring the mixture for 3 hours at room temperature, crystals formed are collected by filtration. Drying of the crystals at 50° C. gives 35.5 g of yellow crystals of an intermediate (b-1).

(2) Synthesis of Intermediate (c-1):

A mixture of 57.0 g of reduced iron, 5.0 g of ammonium chloride, 35 ml of water, and 250 ml of isopropyl alcohol is refluxed for 30 minutes, and 22.0 g of the intermediate (b-1) is added thereto, followed by stirring for 1 hour under reflux. After filtration, the filtrate is concentrated to dryness to obtain 15.0 g of yellow crystals of an intermediate (c-1).

(3) Synthesis of Intermediate (d-1):

12.0 g of 1-ethyl-3-(3-dimethylaminopropyl)-carbodiimide hydrochloride (product of Tokyo Chemical Industry Co., Ltd.) is added to a mixture composed of 9.6 g of the intermediate (c-1), 19.5 g of 3,5-disulfobenzoic acid, 100 ml of water, and 90 ml of acetonitrile, followed by stirring the resulting mixture for 4 hours at room temperature. 30.0 g of lithium chloride is added thereto, and crystals precipitated are collected by filtration to obtain 20.0 g of yellow crystals of an intermediate (d-1).

(4) Synthesis of Intermediate (f-1):

2.6 ml of concentrated hydrochloric acid is added to a mixture of 1.2 g of 2-aminoenzonitrile (e-1; product of Tokyo Chemical Industry Co., Ltd.) and 10 ml of water, and 3 ml of an aqueous solution containing 0.7 g of sodium nitrite is added thereto at 5° C. or less. The resulting mixture is stirred as such for 30 minutes, and is added to a solution prepared by dissolving 4.7 g of the intermediate (d-1) in a mixture of 50 ml of water and 25 ml of methanol, at a temperature of 20° C. or less. The mixture is stirred as such for 2 hours, and crystals precipitated are collected by filtration to obtain 4.9 g of brown crystals of an intermediate (f-1). The isolation yield is 73%.

(5) Synthesis of B3:

A solution composed of 4.9 g of the intermediate (f-1), 3.7 g of an intermediate (g), and 30 ml of water is adjusted to a pH of 2.0 or less with hydrochloric acid, and 3.3 ml of isoamyl nitrite is added thereto, followed by stirring the mixture for 2 hours at 40° C. After completion of the reaction, the pH of the solution is adjusted to 8.4 with lithium hydroxide, and 200 ml of isopropyl alcohol is added thereto. Crystals precipitated are collected by filtration to obtain 6.7 g of black crystals (B3).
Synthesis Example 4A
Synthesis scheme of B4 (BLACK-21) is shown below.
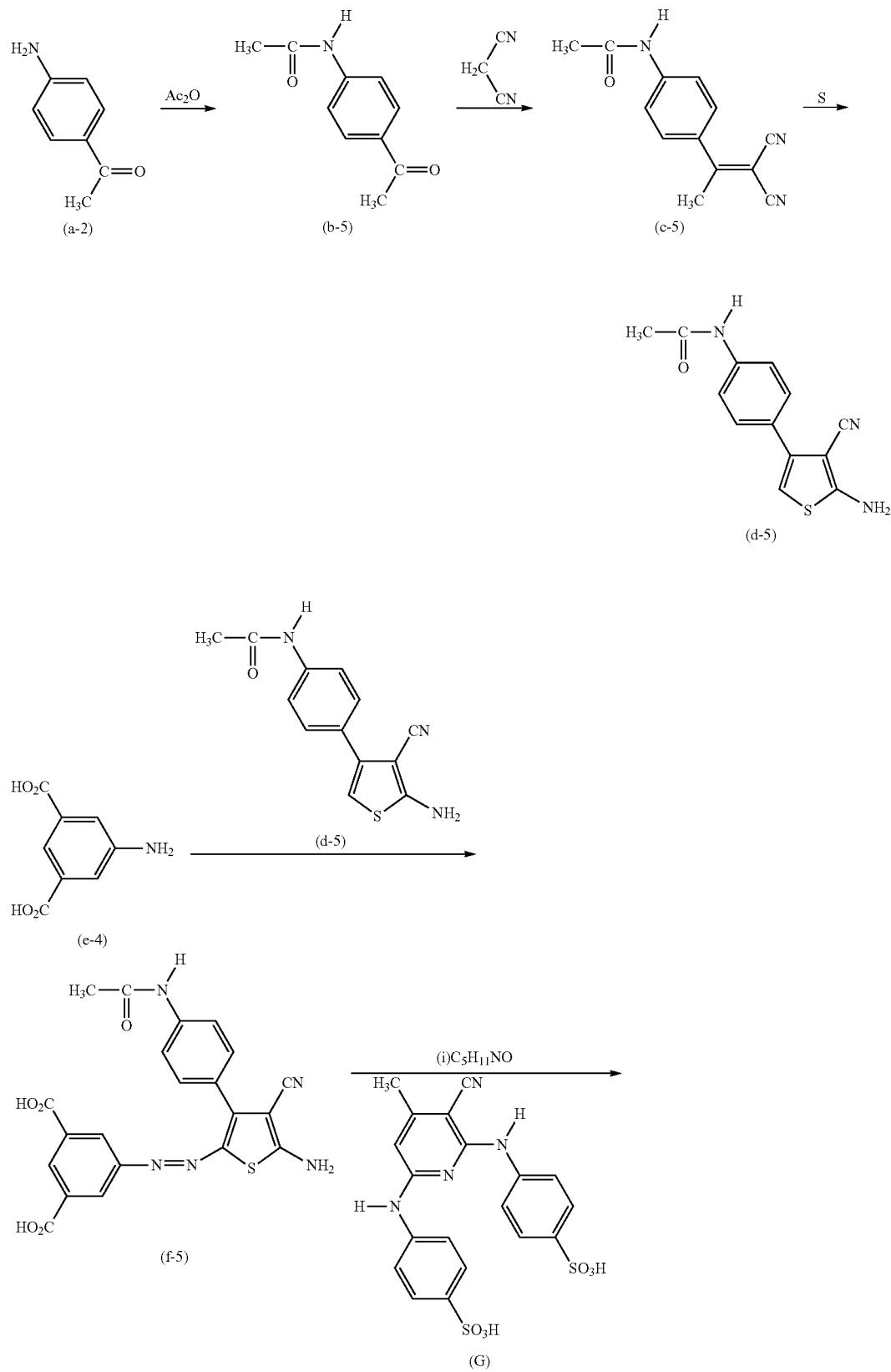

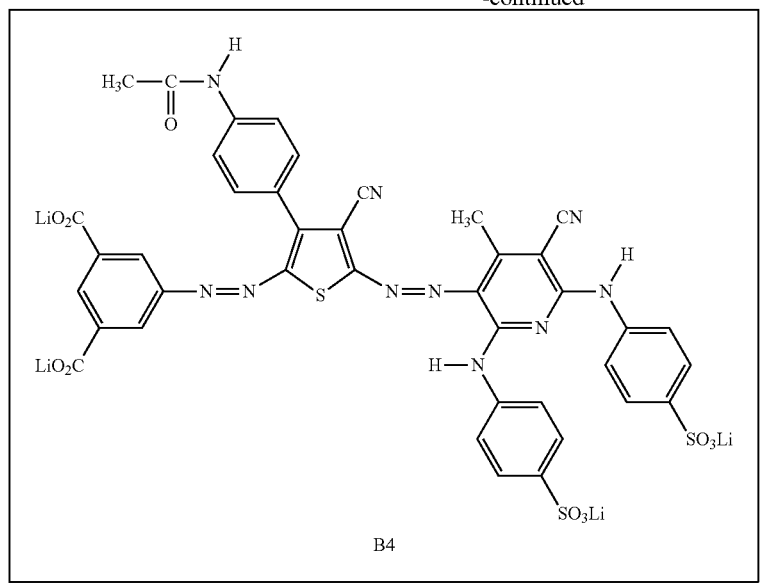

B4

(1) Synthesis of Intermediate (b-5):

20.3 g of p-aminoacetophenone (a-2; product of Tokyo Chemical Industry Co., Ltd.) is added to 150 mL of acetonitrile, followed by stirring at room temperature to completely dissolve. Subsequently, 13.4 mL of pyridine is added thereto, and the internal temperature is kept at 4° C. in an ice bath. 11.8 g of acetic anhydride is dropwise added thereto, and the mixture is stirred for 15 minutes at an internal temperature of 4° C. 300 mL of water is added to the reaction solution, and then 5 mL of 12N hydrochloric acid is added thereto, followed by collecting formed crystals by filtration. The crystals are washed with 100 mL of water, and then dried at 80° C. to obtain 18.6 g of white crystals of an intermediate (b-5).

(2) Synthesis of Intermediate (c-5):

17.7 g of the intermediate (b-5), 7.3 g of malononitrile, 4.6 mL of acetic acid, 1.5 g of ammonium acetate, and 20 mL of toluene are placed in a 100-mL 3-neck flask equipped with a Dean-Stark trap, and the mixture is refluxed in a 125° C. oil bath. After stirring for 1 hour, 4.6 mL of acetic acid and 1.5 g of ammonium acetate are additionally added thereto, followed by stirring for 2 hours under reflux condition. After allowing the mixture to cool, 30 mL of methanol is added thereto, and the resulting mixture is stirred for 30 minutes in an ice bath. Crystals thus formed are collected by filtration, washed with 20 mL of cold methanol, and then dried. Thus, 12.1 g of white crystals of an intermediate (c-5) are obtained.

(3) Synthesis of Intermediate (d-5):

1.5 g of sulfur is added to a solution of 11.3 g of the intermediate (c-5) in 20 mL of ethanol, and then 6.6 mL of triethylamine is dropwise added thereto. After stirring the mixture for 30 minutes at an internal temperature of 50° C., 500 mL of ethyl acetate and 300 mL of water are added thereto and, after shaking the mixture, liquid-liquid separation is conducted. 200 mL of an aqueous solution of sodium chloride is added to the organic layer and, after shaking, liquid-liquid separation is conducted. Magnesium sulfate is added to the organic layer to dry. After distilling off the organic solvent, 50 mL of isopropanol is added to the residue, and the resulting suspension is stirred, followed by collecting crystals. Drying of the crystals at 80° C. gives 8.1 g of white crystals of an intermediate (d-5).

(4) Synthesis of Intermediate (f-5):

18.1 g of an intermediate (e-4) is added to 100 mL of water, and the mixture is stirred at room temperature. Then, 5.7 mL of a 12N hydrochloric acid aqueous solution is dropwise added thereto. 21 mL of an aqueous solution containing 6.9 g of sodium nitrite is dropwise added thereto at an internal temperature of 5° C. or less, followed by stirring for 2 hours. 0.7 g of urea is added thereto, and the mixture is further stirred for 15 minutes at an internal temperature of 5° C. to obtain a diazonium solution. Separately, 25.7 g of the intermediate (d-5) and 30.0 g of lithium acetate are dissolved in a mixture of 200 mL of methanol and 70 mL of dimethylacetamide, and the aforesaid diazonium solution is dropwise added thereto in 25 minutes with keeping the internal temperature at 5° C. or less. After stirring the resulting mixture for 2 hours, 200 mL of isopropyl alcohol is dropwise added thereto, and crystals formed are collected by filtration. After washing with 100 mL of isopropyl alcohol, the crystals are added to 150 mL of water, and the mixture is stirred for 30 minutes at an internal temperature of 50° C. After dropwise adding thereto 400 mL of isopropyl alcohol, crystals formed are collected by filtration and washed with isopropyl alcohol. Drying of the crystals at 80° C. gives 35.0 g of brown crystals of an intermediate (f-5).

(5) Synthesis of B4:

A solution composed of 23.0 g of the intermediate (f-5), 27.6 g of an intermediate (g), and 460 mL of water is adjusted to a pH of 2 or less with 12N hydrochloric acid, and 17.6 g of isoamyl nitrite is dropwise added thereto at an internal temperature of 25° C. Subsequently, the resulting mixture is stirred for 6 hours at an internal temperature of 25° C. 69.0 g of lithium chloride is added to this mixed liquid. Crystals thus formed are collected by filtration and are washed with 100 mL of isopropyl alcohol. The isolated crystals are added to 400 mL of water, and the mixture is stirred at an internal temperature of 40° C. 700 mL of isopropyl alcohol is dropwise added thereto in 30 minutes. After stirring for 15 minutes, the mixture is cooled to an internal temperature of 25° C., and crystals thus formed are collected by filtration. The thus-obtained crystals are added to 100 mL of water, and the mixture is stirred at an internal temperature of 40° C., followed by dropwise adding thereto 300 mL of isopropyl alcohol. After cooling the mixture to an internal temperature of 25° C., crystals formed are collected. The isolated crystals are dissolved in a mixed solvent of 80 mL of water and 80 mL of methanol at an internal temperature of 40° C., and then 300 mL of isopropyl alcohol is added thereto. Crystals precipitated are collected by filtration, and added to 50 mL of water. A 4M lithium hydroxide aqueous solution is added thereto till the pH of the mixture becomes 8.3. 200 mL of isopropyl alcohol is then dropwise added thereto. Crystals precipitated are collected by filtration, and are washed with 100 mL of isopropyl alcohol. Drying of the crystals at 80° C. gives 2.0 g of black crystals of (B4).

Synthesis Example 4B

Another synthesis scheme of B4 is shown below.

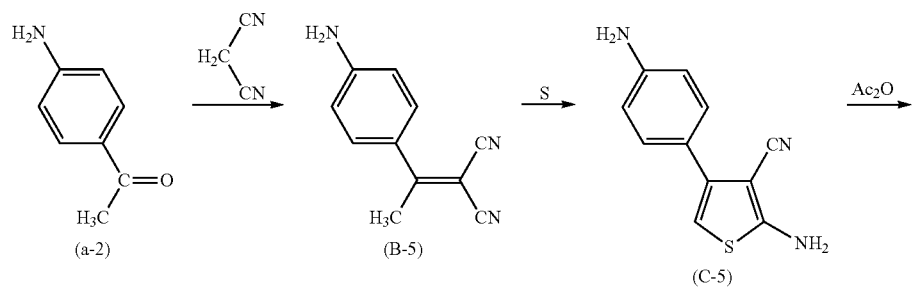

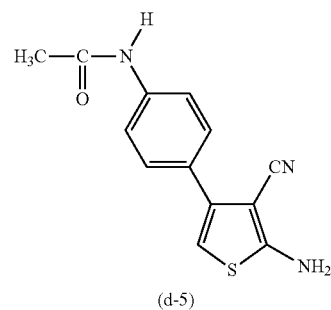

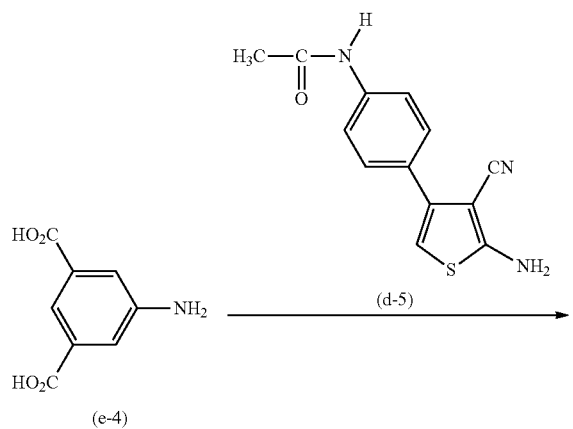

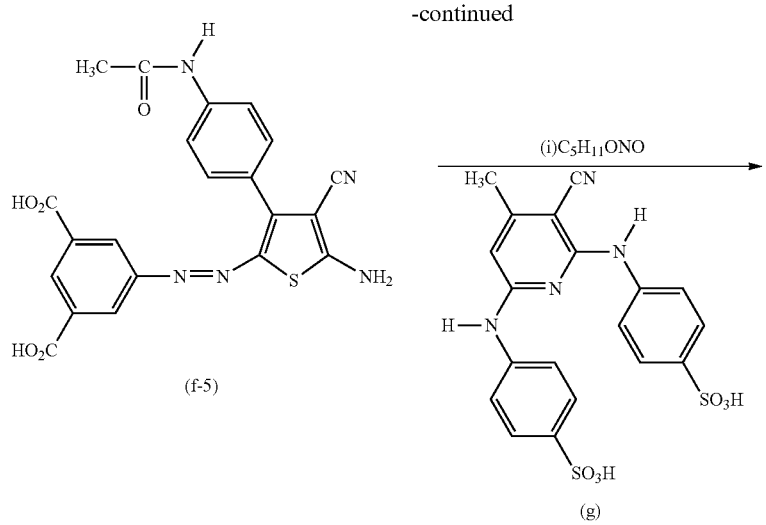

(f-5)

(g)

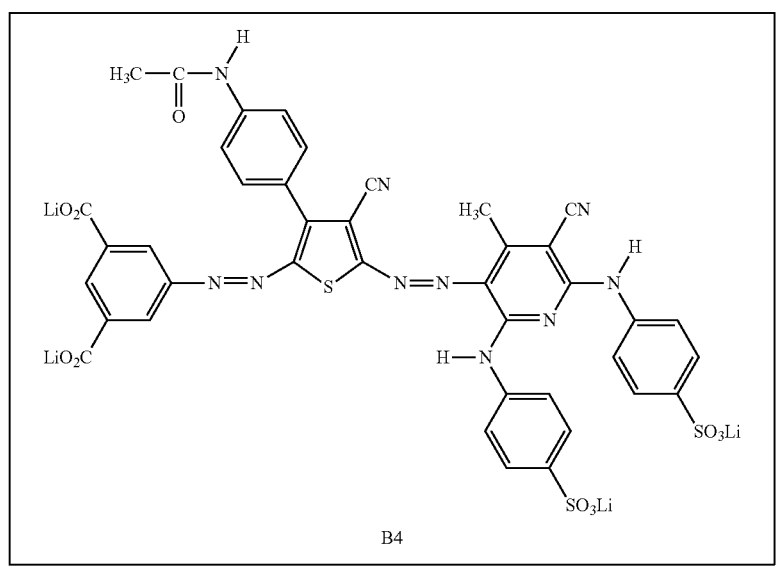

B4

(1) Synthesis of Intermediate (B-5):

14.1 g of aminoacetophenone (a-2), 8.3 g of malononitrile, 8.4 g ammonium acetate, 9.8 g of acetic acid, and 50 mL of toluene are placed in a 100-mL 3-neck flask equipped with a Dean-Stark trap, and the mixture is heated to an internal temperature of 100° C. After stirring for 2 hours, the mixture is cooled to an internal temperature of 25° C., and crystals precipitated are collected by filtration. The crystals are washed twice, each time with 100 mL of isopropanol, and dried at 80° C. to obtain 18.4 g of yellow crystals of an intermediate B-5.

(2) Synthesis of Intermediate (C-5):

13.3 g of the intermediate (B-5) and 4.6 g of sulfur are suspended in a mixture of 270 mL of dimethylacetamide, 130 mL of acetonitrile, and 130 mL of water, and the mixture is stirred at room temperature. 12.3 g of sodium hydrogen carbonate is added thereto, and the temperature of the mixture is increased to 40° C. After stirring for 1 hour, the mixture is allowed to cool to room temperature, and is filtered to remove dusts, thus 509.8 g of a 3.1 wt % brown solution of an intermediate (C-5) being obtained.

(3) Synthesis of Intermediate (d-5):

192.7 g of the 3.1 wt % brown solution of the intermediate (C-5) is stirred at room temperature, and 2.8 g of acetic anhydride is added thereto. After stirring for 30 minutes, 0.2 g of acetic anhydride is further added thereto. After stirring for 70 minutes, 5.5 g of lithium acetate is added thereto to obtain 199.6 g of a 5.1 wt % brown solution of an intermediate (d-5).

(4) Synthesis of Intermediate (f-5):

7.4 g of 5-aminoisophthalic acid (e-4) is suspended in 75 mL of water, and 10.0 mL of 12N hydrochloric acid is dropwise added thereto at room temperature. After cooling the mixture to an internal temperature of 4° C. in an ice bath, 5.7 mL of an aqueous solution containing 2.8 g of sodium nitrite is dropwise added thereto at an internal temperature of 5° C. or less, followed by stirring for 2 hours. Subsequently, 0.5 g of amidosulfuric acid is added thereto and, successively, the mixture is stirred for 15 minutes at an internal temperature of 5° C. to obtain a diazonium solution. Separately, 199.6 g of the intermediate (d-5) is cooled to an internal temperature of 4° C., and then the aforesaid diazonium solution is dropwise added thereto in 25 minutes at an internal temperature of 6° C. or less. After stirring the mixture for 2 hours at an internal temperature of 5° C. or less, the temperature of the mixture is increased to 40° C. in terms of internal temperature. After stirring for 1.5 hours, crystals thus formed are collected by filtration, and washed twice, each time with 50 mL of isopropyl alcohol. Drying of the crystals at 80° C. gives 14.1 g of brown crystals of an intermediate (f-5).

(5) Synthesis of B4:

A solution composed of 14.0 g of the intermediate (f-5), 16.8 g of an intermediate (g), and 280 mL of water is adjusted to a pH of 2 or less with 12N hydrochloric acid, and 10.7 g of isoamyl nitrite is dropwise added thereto at an internal temperature of 25° C. After stirring for 6 hours at an internal temperature of 25° C., a 4M lithium hydroxide aqueous solution is dropwise added thereto till the pH of the mixture becomes 8.3. Subsequently, 840 mL of isopropyl alcohol is dropwise added thereto, and crystals formed are collected by filtration, and washed twice, each time with 200 mL of isopropanol. The isolated crystals are added to 500 mL of water, and the mixture is stirred at an internal temperature of 40° C. 1000 mL of isopropyl alcohol is dropwise added thereto in 30 minutes. After stirring for 15 minutes, the mixture is cooled to an internal temperature of 25° C., and crystals thus formed are collected by filtration. The thus-obtained crystals are added to 400 mL of water, and the mixture is stirred at an internal temperature of 40° C., followed by dropwise adding thereto 800 mL of isopropyl alcohol. After cooling the mixture to an internal temperature of 25° C., crystals formed are collected. The crystals are washed twice, each time with 200 mL of isopropyl alcohol. Drying of the crystals at 80° C. gives 17.6 g of black crystals of (B4).

<Preparation of Ink>

Inks are prepared in the following manner by using, respectively, the coloring materials obtained above. First, 1000 ml of water is added to each combination of the coloring materials shown in the following Tables 2 and 3, and each of the resulting solutions is sufficiently mixed. Thereafter, each of the solutions is subjected to press filtration through a filter of 0.2 μm in pore size to prepare black inks of examples 1 to 9 and Comparative Examples 1 to 9. Additionally, unit of numerals in Tables 2 and 3 is g.

<Evaluation>

(Evaluation of Fastness)

Each ink is placed in a cartridge for an yellow ink liquid PX-V630 manufactured by Seiko Epson Corporation, and is printed on an image-receiving paper of an inkjet photogloss paper "Gasai" manufactured by Fuji Film Co., Ltd.

<Light Fastness>

Image density Ci of the sample just after printing is measured by X-rite 310 (manufactured by X-rite Co.). The sample is irradiated with xenon light (100,000 lux) using a weather meter (manufactured by Atlas Co., Ltd.) for 10 days and then image density Cf of the sample is again measured to determine an image remaining ratio, Cf/Ci×100, whereby the light fastness is evaluated.

The image remaining ratio is determined at 3 points having reflection density of 1, 1.5, and 2 respectively, and light fastness is evaluated according to the following criteria:

A: case wherein the image remaining ratio is 80% or more at all three densities;
B: case wherein the image remaining ratio is less than 80% at two densities; and
C: case wherein the image remaining ratio is less than 80% at all three densities.

A larger value of the image remaining ratio means a more excellent light fastness.

<Ozone Fastness>

The printed sample is left for 10 days in a box wherein the ozone gas concentration is adjusted to 5 ppm (25° C., 50%), and the image density is measured after leaving the paper in the ozone gas atmosphere using X-rite 310.

The image remaining ratio is evaluated at three points where the densities are 1, 1.5 and 2.0, respectively, according to the following criteria.

The remaining ratio of Ci/Cf is measured with respect to images having a Ci density of 1, 1.5, and 2, respectively.

A: case wherein the image remaining ratio is 80% or more at all three densities;
B: case wherein the image remaining ratio is less than 80% at two densities; and
C: case wherein the image remaining ratio is less than 80% at all three densities.

A larger value of the image remaining ratio means a more excellent zone fastness.

<Bronzing Phenomenon>

Each of the aforesaid photo gloss papers on which an image is formed is dried for 24 hours, and degree of generation of bronzing phenomenon is visually evaluated according to the following criteria: a sample with which bronzing phenomenon is not observed at all is ranked A, a sample with which bronzing phenomenon is slightly observed is ranked B, and a sample with which bronzing is observed is ranked C. Additionally, bronzing phenomenon can also be confirmed by the fact that, when bronzing phenomenon generates, printing density becomes lower than that of the case where no bronzing phenomenon generates.

TABLE 2

| | | Example | | | | |
|---|---|---|---|---|---|---|
| | | 1 | 2 | 3 | 4 | 5 |
| Coloring material 1 | Dye 6 | 0.5 | 0.5 | 1 | 1 | 1 |
| Coloring material 2 | B1 | 3.5 | | | 3 | |
| | B2 | | | 3 | | 3 |
| | B3 | | 3.5 | | | |
| | B4 | | | | | |
| Coloring material 3 | Y1 | | | | 1 | |
| | Y2 | | | | | |
| | Y3 | 1 | 1 | | 1 | 1 |
| Comparative coloring material | Dye 7 | | | | | |
| | Dye 8 | | | | | |
| | Dye 9 | | | | | |
| Solvent | Diethylene glycol | 20 | 20 | 20 | 20 | 20 |
| | Glycerin | 120 | 120 | 120 | 120 | 120 |
| | Diethylene glycol monobutyl ether | 230 | 230 | 230 | 230 | 230 |
| | 2-Pyrrolidone | 80 | 80 | 80 | 80 | 80 |
| Additive | Triethanolamine | 17.9 | 17.9 | 17.9 | 17.9 | 17.9 |
| | Surfynol (trade name) | 8.5 | 8.5 | 8.5 | 8.5 | 8.5 |
| | Proxel XL2 (trade name) | 1.8 | 1.8 | 1.8 | 1.8 | 1.8 |
| Evaluation | Fastness (light) | B | A | A | B | A |
| | Fastness (ozone) | A | A | A | A | A |
| | Bronzing phenomenon | B | A | A | B | A |

| | | Example | | | |
|---|---|---|---|---|---|
| | | 6 | 7 | 8 | 9 |
| Coloring material 1 | Dye 6 | 0.3 | 0.5 | 0.8 | 0.8 |
| Coloring material 2 | B1 | | | | |
| | B2 | | | | |
| | B3 | 3.7 | | 2.5 | 2 |
| | B4 | | 3.5 | | |
| Coloring material 3 | Y1 | | | | |
| | Y2 | | | | |
| | Y3 | 1 | 1 | 2.2 | 2.2 |
| Comparative coloring material | Dye 7 | | | | |
| | Dye 8 | | | | |
| | Dye 9 | | | | |

TABLE 2-continued

| | | | | | |
|---|---|---|---|---|---|
| Solvent | Diethylene glycol | 20 | 20 | 20 | 20 |
| | Glycerin | 120 | 120 | 120 | 120 |
| | Diethylene glycol monobutyl ether | 230 | 230 | 230 | 230 |
| | 2-Pyrrolidone | 80 | 80 | 80 | 80 |
| Additive | Triethanolamine | 17.9 | 17.9 | 17.9 | 17.9 |
| | Surfynol (trade name) | 8.5 | 8.5 | 8.5 | 8.5 |
| | Proxel XL2 (trade name) | 1.8 | 1.8 | 1.8 | 1.8 |
| Evaluation | Fastness (light) | A | A | A | A |
| | Fastness (ozone) | A | A | A | A |
| | Bronzing phenomenon | B | A | A | B |

TABLE 3

| | | Example | | | | | |
|---|---|---|---|---|---|---|---|
| | | 1 | 2 | 3 | 4 | 5 | 6 |
| Coloring material 1 | Dye 6 | | | 1 | 2.5 | 3.5 | 3.5 |
| Coloring material 2 | B1 | | 2 | | | | |
| | B2 | | | | | | |
| | B3 | 3.5 | | 3 | 2 | | |
| | B4 | | | | | | |
| Coloring material 3 | Y1 | | | | | 1 | |
| | Y2 | | | | | | 1 |
| | Y3 | 1 | | | | | |
| Comparative coloring material | Dye 7 | 0.5 | 2.5 | | | | |
| | Dye 8 | | 0.5 | | | 0.5 | 0.5 |
| | Dye 9 | | | 1 | 0.5 | | |
| | F | | | | | | |
| Solvent | Diethylene glycol | 20 | 20 | 20 | 20 | 20 | 20 |
| | Glycerin | 120 | 120 | 120 | 120 | 120 | 120 |
| | Diethylene glycol monobutyl ether | 230 | 230 | 230 | 230 | 230 | 230 |
| | 2-Pyrrolidone | 80 | 80 | 80 | 80 | 80 | 80 |
| Additive | Triethanolamine | 17.9 | 17.9 | 17.9 | 17.9 | 17.9 | 17.9 |
| | Surfynol (trade name) | 8.5 | 8.5 | 8.5 | 8.5 | 8.5 | 8.5 |
| | Proxel XL2 (trade name) | 1.8 | 1.8 | 1.8 | 1.8 | 1.8 | 1.8 |
| Evaluation | Fastness (light) | A | C | A | B | B | A |
| | Fastness (ozone) | A | C | B | B | B | B |
| | Bronzing phenomenon | B | B | B | B | B | B |

| | | Example | | |
|---|---|---|---|---|
| | | 7 | 8 | 9 |
| Coloring material 1 | Dye 6 | 3.5 | | |
| Coloring material 2 | B1 | | | |
| | B2 | | | 3 |
| | B3 | | | |
| | B4 | | | |
| Coloring material 3 | Y1 | | | |
| | Y2 | | | |
| | Y3 | 1 | | |
| Comparative coloring material | Dye 7 | | 4 | |
| | Dye 8 | 0.5 | 1 | |
| | Dye 9 | | | |
| | F | | | 2 |
| Solvent | Diethylene glycol | 20 | 20 | 20 |
| | Glycerin | 120 | 120 | 120 |
| | Diethylene glycol monobutyl ether | 230 | 230 | 230 |
| | 2-Pyrrolidone | 80 | 80 | 80 |
| Additive | Triethanolamine | 17.9 | 17.9 | 17.9 |
| | Surfynol (trade name) | 8.5 | 8.5 | 8.5 |
| | Proxel XL2 (trade name) | 1.8 | 1.8 | 1.8 |
| Evaluation | Fastness (light) | B | C | A |
| | Fastness (ozone) | B | C | A |
| | Bronzing phenomenon | B | B | B |

Compounds used in the respective inks are described in detail below.

Surfynol: manufactured by Air Products Japan; surfactant
Proxel XL2: manufactured by Arch; Antiseptic While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An ink comprising:
a first coloring material;
a second coloring material; and
a third coloring material,
wherein
the first coloring material is a compound represented by the following general formula (BkI-1),
the second coloring material is a compound different from the first coloring material and is represented by the following general formula (BkII-1) or (BkIII-1), and
the third coloring material is a compound represented by the following general formula (Y-1):

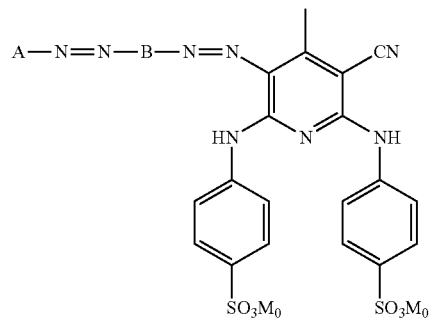

(BkI-1)

wherein
A represents an aromatic or heterocyclic group which may be substituted,
$M_0$ each independently represents a hydrogen atom, an alkali metal, ammonium, or an organic ammonium; and
B represents any one of the groups represented by the following general formulae (1) to (5):

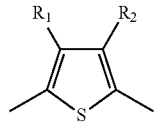

general formula (1)

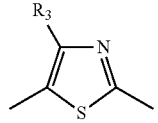

general formula (2)

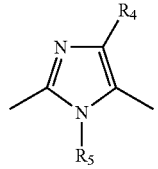

general formula (3)

general formula (4)

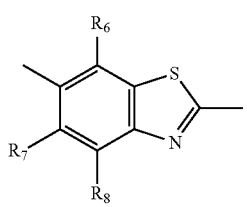

general formula (5)

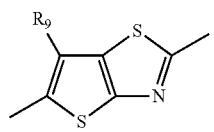

wherein $R_1$ to $R_9$ each independently represent a hydrogen atom, a halogen atom, an aliphatic group, an aromatic group, a heterocyclic group, a carboxylic group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group including an anilino group and a heterocyclic amino group, an acylamino group, a ureido group, a sulfamoylamino group, an alkoxycarbonylamino group, an aryloxycarbonylamino group, an alkyl- or aryl-sulfonylamino group, a heterocyclic sulfonylamino group, a cyano group, a nitro group, an alkyl- or aryl-thio group, a heterocyclic thio group, an alkyl- or aryl-sulfonyl group, a heterocyclic sulfonyl group, an alkyl- or aryl-sulfinyl group, a heterocyclic sulfinyl group, a sulfamoyl group, or a sulfonic acid group, each group optionally further having a substituent;

(BkII-1)

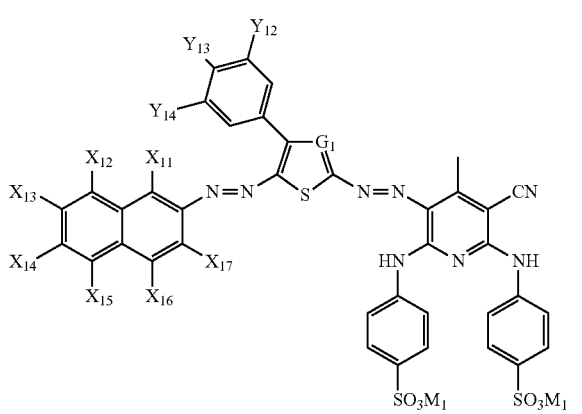

wherein $G_1$ represents a nitrogen atom or $-C(R_{12})=$, $R_{12}$ represents a hydrogen atom, a sulfo group, a carboxyl group, a substituted or unsubstituted carbamoyl group, or a cyano group, $X_{11}, X_{12}, X_{13}, X_{14}, X_{15}, X_{16}$, and $X_{17}$ each independently represent a hydrogen atom or a monovalent substituent, $Y_{12}, Y_{13}$, and $Y_{14}$ each independently represent a hydrogen atom or a monovalent substituent, $Y_{12}, Y_{13}$, and $Y_{14}$ may be connected to each other to form a ring, and $M_1$ each independently represents a hydrogen atom or a monovalent counter cation;

(BkIII-1)

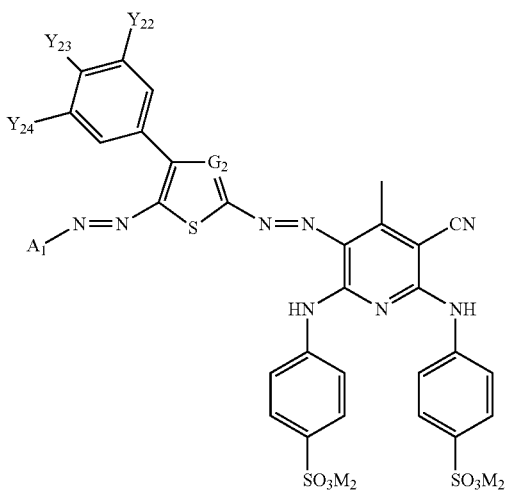

wherein $A_1$ represents an aryl group or a nitrogen-containing 5-membered heterocyclic group, $G_2$ represents a nitrogen atom or $-C(R_{22})=$, $R_{22}$ represents a hydrogen atom, a sulfo group, a carboxyl group, a substituted or unsubstituted carbamoyl group, or a cyano group, $Y_{22}, Y_{23}$, and $Y_{24}$ each independently represent a hydrogen atom or a monovalent substituent, $Y_{22}, Y_{23}$, and $Y_{24}$ may be connected to each other to form a ring, and $M_2$ each independently represents a hydrogen atom or a monovalent counter cation;

(Y-1)

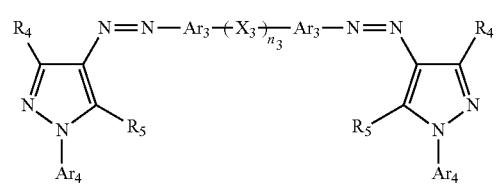

wherein $R_4$ each independently represents a monovalent group, $R_5$ each independently represents $-OR_6$ or $-NHR_7$, $R_6$ and $R_7$ each independently represent a hydrogen atom or a monovalent group, $X_3$ represents a divalent linking group, $n_3$ represents 0 or 1, Ar₃ each independently represents a divalent heterocyclic group, and
Ar₄ each independently represents an alkyl group, an aryl group, or a monovalent triazine ring group.

2. The ink according to claim 1,
wherein
A in the compound represented by the general formula (BkI-1) is a naphthyl group which may be substituted, and
B is a group represented by the general formula (2).

3. The ink according to claim 1,
wherein
the compound represented by the general formula (BkII-1) is a compound represented by the following general formula (BkII-2):

(BkII-2)

[Chemical structure showing R₁₃—C(=O)—NH attached to phenyl, connected to thiazole ring with G₁, N=N linkages, with X₁₂, X₁₄, X₁₆ substituents on naphthyl, and pyridine ring with CN, methyl, HN-phenyl-SO₃M₁ groups]

wherein
G₁ represents a nitrogen atom or —C($R_{12}$)=,
$R_{12}$ represents a hydrogen atom, a sulfo group, a carboxyl group, a substituted or unsubstituted carbamoyl group, or a cyano group,
$X_{12}$, $X_{14}$, and $X_{16}$ each independently represent a hydrogen atom or a monovalent substituent, provided that at least one of $X_{12}$, $X_{14}$, and $X_{16}$ represents an electron-withdrawing group having a Hammett σp value of 0.3 or more,
$R_{13}$ represents a monovalent substituent, and
$M_1$ each independently represents a hydrogen atom or a monovalent counter cation.

4. The ink according to claim 1,
wherein
the compound represented by the general formula (BkIII-1) is a compound represented by the general formula (BkIII-2):

(BkIII-2)

[Chemical structure showing R₂₃—C(=O)—NH attached to phenyl, connected to thiazole ring with G₂, N=N linkages, with A₁ group, and pyridine ring with CN, methyl, HN-phenyl-SO₃M₂ groups]

wherein
G₂ represents a nitrogen atom or —C($R_{12}$)=,
$R_{22}$ represents a hydrogen atom, a sulfo group, a carboxyl group, a substituted or unsubstituted carbamoyl group, or a cyano group,
$R_{23}$ represents a monovalent substituent,
$A_1$ represents an aryl group or a 5-membered, nitrogen-containing heterocyclic group, and
$M_2$ each independently represents a hydrogen atom or a monovalent counter cation.

5. The ink according to claim 1,
wherein
the content of the second coloring material is from 45% by weight to 75% by weight based on the total weight of all of the coloring materials in the ink.

6. The ink according to claim 1,
wherein
the content of the third coloring material is from 20% by weight to 45% by weight based on the total weight of all of the coloring materials in the ink.

7. The ink according to claim 1,
wherein
the content of the second coloring material is 60% by weight or more based on the total weight of all of the coloring materials in the ink, and
the content of the third coloring material is 1 time or more in terms of weight ratio to the content of the first coloring material in the ink.

* * * * *